(12) United States Patent
Tang

(10) Patent No.: US 10,247,914 B2
(45) Date of Patent: Apr. 2, 2019

(54) MOBILE DEVICE AND OPTICAL IMAGING LENS THEREOF

(71) Applicant: GENIUS ELECTRONIC OPTICAL CO., LTD., Taichung (TW)

(72) Inventor: Tzu Chien Tang, Taichung (TW)

(73) Assignee: GENIUS ELECTRONIC OPTICAL CO., LTD., Taichung (TW)

( * ) Notice: Subject to any disclaimer, the term of this patent is extended or adjusted under 35 U.S.C. 154(b) by 337 days.

(21) Appl. No.: 15/249,048

(22) Filed: Aug. 26, 2016

(65) Prior Publication Data

US 2018/0017766 A1 Jan. 18, 2018

(30) Foreign Application Priority Data

Jul. 14, 2016 (CN) .................. 2016 1 05525306

(51) Int. Cl.
 *G02B 13/00* (2006.01)
 *G02B 9/60* (2006.01)
 *G02B 27/00* (2006.01)
 *G02B 7/02* (2006.01)

(52) U.S. Cl.
 CPC ......... *G02B 13/0045* (2013.01); *G02B 7/021* (2013.01); *G02B 9/60* (2013.01); *G02B 27/0025* (2013.01); *G02B 7/026* (2013.01)

(58) Field of Classification Search
 CPC .............................. G02B 13/0045; G02B 9/60
 USPC .................................................. 359/763, 714
 See application file for complete search history.

(56) References Cited

U.S. PATENT DOCUMENTS

| | | | | |
|---|---|---|---|---|
| 7,414,665 B2* | 8/2008 | Watanabe | ............ | G02B 15/177 348/240.3 |
| 8,941,929 B2* | 1/2015 | Chen | .................... | H04N 5/2253 348/345 |
| 2012/0092778 A1* | 4/2012 | Tsai | .................... | G02B 13/0045 359/714 |
| 2013/0050846 A1* | 2/2013 | Huang | ............... | G02B 13/0045 359/713 |

* cited by examiner

*Primary Examiner* — Kristina M Deherrera
(74) *Attorney, Agent, or Firm* — Baker & McKenzie LLP

(57) ABSTRACT

Present embodiments provide for mobile devices and optical imaging lenses thereof. An optical imaging lens may include five lens elements positioned sequentially from an object side to an image side. By controlling the convex or concave shape of the surfaces of the lens elements and designing parameters satisfying at least one inequality, the optical imaging lens may exhibit better optical characteristics and the total length of the optical imaging lens may be shortened.

20 Claims, 53 Drawing Sheets

| | EFL (Effective focus length) = 1.0299 mm, HFOV (Half angular field of view) = 64.2906 deg., TTL (System length) = 12.4186mm, Image height = 1.8mm, Fno = 2.2 |
|---|---|---|---|---|---|---|---|
| Surface # | | Radius (mm) | Thickness (mm) | Refractive index | Abbe number | Focus (mm) | Material |
| - | Object | 3000.0000 | 300.0000 | | | | |
| 111 | 1st lens element | 13.8248 | 1.3000_T1 | 1.591_n1 | 61.242_v1 | -6.965_f1 | glass |
| 112 | | 3.0610 | 1.8109_G12 | | | | |
| 121 | 2nd lens element | 54.1234 | 0.9782_T2 | 1.514_n2 | 56.264_v2 | -2.283_f2 | plastic |
| 122 | | 1.1407 | 0.9560_G23 | | | | |
| 131 | 3rd lens element | -6.8012 | 1.8226_T3 | 1.586_n3 | 30.181_v3 | 2.268_f3 | plastic |
| 132 | | -1.2217 | -0.1656_G34-TA | | | | |
| 100 | Aperture stop | 1.00E+18 | 0.3542_TA | | | | |
| 141 | 4th lens element | 4.0044 | 0.7000_T4 | 1.640_n4 | 23.899_v4 | -21.337_f4 | plastic |
| 142 | | 0.4298 | 0_G45 | | | | |
| 151 | 5th lens element | 0.4298 | 2.5334_T5 | 1.533_n5 | 55.904_v5 | 5.257_f5 | plastic |
| 152 | | -1.7133 | 0.9289_G5F | | | | |
| 161 | IR cut filter | 1.00E+18 | 0.7000_TF | 1.518 | 64.166 | | |
| 162 | | 1.00E+18 | 0.5000_GFP | | | | |
| 170 | Image plane | 1.00E+18 | 0.0000 | | | | |

FIG. 8

| Aspherical parameters | | | | | |
|---|---|---|---|---|---|
| Surface# | 111 | 112 | 121 | 122 | 131 |
| K | 0.000000E+00 | 0.000000E+00 | 0.000000E+00 | 0.000000E+00 | 0.000000E+00 |
| $a_4$ | 0.000000E+00 | 0.000000E+00 | -6.152923E-03 | -6.299424E-02 | -8.327580E-02 |
| $a_6$ | 0.000000E+00 | 0.000000E+00 | 1.843616E-03 | -2.752931E-02 | 1.764224E-02 |
| $a_8$ | 0.000000E+00 | 0.000000E+00 | -9.047702E-05 | -4.307112E-03 | -4.429621E-02 |
| $a_{10}$ | 0.000000E+00 | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |
| Surface# | 132 | 141 | 142 | 151 | 152 |
| K | 0.000000E+00 | 0.000000E+00 | -1.000000E+00 | -1.000000E+00 | 5.009715E-02 |
| $a_4$ | 1.587354E-01 | 5.889424E-03 | -6.822327E-01 | -6.822327E-01 | 6.429259E-03 |
| $a_6$ | -9.610434E-02 | 9.793186E-03 | 6.913563E-01 | 6.913563E-01 | -7.451766E-03 |
| $a_8$ | 7.496092E-02 | -2.847825E-02 | -4.473772E-01 | -4.473772E-01 | 4.209596E-03 |
| $a_{10}$ | 0.000000E+00 | 1.876718E-02 | 1.229644E-01 | 1.229644E-01 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |

FIG. 9

| EFL (Effective focus length) = 1.0037 mm, HFOV (Half angular field of view) = 65.0799 deg., TTL (System length) = 11.7296mm, Image height = 1.8mm, Fno = 2.2 ||||||||
|---|---|---|---|---|---|---|---|
| Surface # | | Radius (mm) | Thickness (mm) | Refractive index | Abbe number | Focus (mm) | Material |
| - | Object | 3000.0000 | 300.0000 | | | | |
| 211 | 1st lens element | 14.9481 | 1.3175_T1 | 1.591_n1 | 61.242_v1 | -7.593_f1 | glass |
| 212 | | 3.3382 | 1.3797_G12 | | | | |
| 221 | 2nd lens lement | 9.4336 | 0.8838_T2 | 1.514_n2 | 56.264_v2 | -2.832_f2 | plastic |
| 222 | | 1.2203 | 1.0213_G23 | | | | |
| 231 | 3rd lens element | -4.2858 | 2.1956_T3 | 1.586_n3 | 30.181_v3 | 2.533_f3 | plastic |
| 232 | | -1.3112 | -0.1192_G34-TA | | | | |
| 200 | Aperture stop | 1.00E+18 | 0.2192_TA | | | | |
| 241 | 4th lens element | 3.4950 | 1.0714_T4 | 1.640_n4 | 23.899_v4 | -53.646_f4 | plastic |
| 242 | | 0.4444 | 0_G45 | | | | |
| 251 | 5th lens element | 0.4444 | 1.9300_T5 | 1.533_n5 | 55.904_v5 | 5.400_f5 | plastic |
| 252 | | -1.6312 | 0.6302_G5F | | | | |
| 261 | IR cut filter | 1.00E+18 | 0.7000_TF | 1.518 | 64.166 | | |
| 262 | | 1.00E+18 | 0.5000_GFP | | | | |
| 270 | Image plane | 1.00E+18 | 0.0000 | | | | |

FIG. 12

| Aspherical parameters | | | | | |
|---|---|---|---|---|---|
| Surface# | 211 | 212 | 221 | 222 | 231 |
| K | 0.000000E+00 | 0.000000E+00 | 0.000000E+00 | 0.000000E+00 | 0.000000E+00 |
| $a_4$ | 0.000000E+00 | 0.000000E+00 | -1.628621E-03 | -8.597029E-02 | -6.066695E-02 |
| $a_6$ | 0.000000E+00 | 0.000000E+00 | -2.226888E-05 | 4.617301E-02 | 1.101381E-02 |
| $a_8$ | 0.000000E+00 | 0.000000E+00 | 8.143672E-05 | -4.255915E-02 | -1.270039E-02 |
| $a_{10}$ | 0.000000E+00 | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |
| Surface# | 232 | 241 | 242 | 251 | 252 |
| K | 0.000000E+00 | 0.000000E+00 | -1.000000E+00 | -1.000000E+00 | 8.000633E-02 |
| $a_4$ | 1.362854E-01 | 2.139475E-02 | -6.768601E-01 | -6.768601E-01 | 9.446504E-03 |
| $a_6$ | -5.980547E-02 | -2.167780E-03 | 6.700678E-01 | 6.700678E-01 | -1.042404E-02 |
| $a_8$ | 4.268912E-02 | -1.921152E-02 | -4.285863E-01 | -4.285863E-01 | 6.956680E-03 |
| $a_{10}$ | 0.000000E+00 | 2.014671E-02 | 1.214563E-01 | 1.214563E-01 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |

FIG. 13

| \multicolumn{8}{c}{EFL (Effective focus length) = 1.0006 mm, HFOV (Half angular field of view) = 65.1609 deg., TTL (System length) = 11.1721mm, Image height = 1.8mm, Fno = 2.2} |
|---|---|---|---|---|---|---|---|
| Surface # | | Radius (mm) | Thickness (mm) | Refractive index | Abbe number | Focus (mm) | Material |
| - | Object | 3000.0000 | 300.0000 | | | | |
| 311 | 1st lens element | 11.8985 | 1.3000_T1 | 1.591_n1 | 61.242_v1 | -7.248_f1 | glass |
| 312 | | 3.0216 | 1.7529_G12 | | | | |
| 321 | 2nd lens lement | 17.3222 | 0.7811_T2 | 1.514_n2 | 56.264_v2 | -2.326_f2 | plastic |
| 322 | | 1.1006 | 0.8790_G23 | | | | |
| 331 | 3rd lens element | -4.9278 | 1.6734_T3 | 1.586_n3 | 30.181_v3 | 2.313_f3 | plastic |
| 332 | | -1.1964 | -0.1308_G34-TA | | | | |
| 300 | Aperture stop | 1.00E+18 | 0.2890_TA | | | | |
| 341 | 4th lens element | 3.1438 | 0.7606_T4 | 1.640_n4 | 23.899_v4 | -147.310_f4 | plastic |
| 342 | | 0.4523 | 0_G45 | | | | |
| 351 | 5th lens element | 0.4523 | 2.0063_T5 | 1.533_n5 | 55.904_v5 | 5.800_f5 | plastic |
| 352 | | -1.7073 | 0.6604_G5F | | | | |
| 361 | IR cut filter | 1.00E+18 | 0.7000_TF | 1.518 | 64.166 | | |
| 362 | | 1.00E+18 | 0.5000_GFP | | | | |
| 370 | Image plane | 1.00E+18 | 0.0000 | | | | |

FIG. 16

| | Aspherical parameters | | | | |
|---|---|---|---|---|---|
| Surface# | 311 | 312 | 321 | 322 | 331 |
| K | 0.000000E+00 | 0.000000E+00 | 0.000000E+00 | 0.000000E+00 | 0.000000E+00 |
| $a_4$ | 0.000000E+00 | 0.000000E+00 | -2.559459E-03 | -6.115226E-02 | -9.132386E-02 |
| $a_6$ | 0.000000E+00 | 0.000000E+00 | 8.727770E-04 | 4.501437E-03 | 2.520666E-02 |
| $a_8$ | 0.000000E+00 | 0.000000E+00 | -2.253128E-05 | -2.235212E-02 | -5.341109E-02 |
| $a_{10}$ | 0.000000E+00 | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |
| Surface# | 332 | 341 | 342 | 351 | 352 |
| K | 0.000000E+00 | 0.000000E+00 | -1.000000E+00 | -1.000000E+00 | 2.218599E-01 |
| $a_4$ | 1.629264E-01 | 1.436055E-02 | -8.921335E-01 | -8.921335E-01 | 7.702022E-02 |
| $a_6$ | -9.855757E-02 | 4.761568E-03 | 1.117494E+00 | 1.117494E+00 | -3.733228E-02 |
| $a_8$ | 8.428788E-02 | -1.458673E-02 | -8.017173E-01 | -8.017173E-01 | 3.493365E-02 |
| $a_{10}$ | 0.000000E+00 | 7.852728E-03 | 2.604944E-01 | 2.604944E-01 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |

FIG. 17

| \multicolumn{7}{c|}{EFL (Effective focus length) =0.9792 mm, HFOV (Half angular field of view) = 97.1489 deg., TTL (System length) = 11.0778mm, Image height = 1.8mm, Fno = 2.2} |||||||
|---|---|---|---|---|---|---|
| Surface # | | Radius (mm) | Thickness (mm) | Refractive index | Abbe number | Focus (mm) | Material |
| - | Object | 3000.0000 | 300.0000 | | | | |
| 411 | 1st lens element | 12.4194 | 1.3000_T1 | 1.591_n1 | 61.242_v1 | -7.090_f1 | glass |
| 412 | | 3.0112 | 1.6599_G12 | | | | |
| 421 | 2nd lens element | 15.9367 | 0.7295_T2 | 1.514_n2 | 56.264_v2 | -2.491_f2 | plastic |
| 422 | | 1.1661 | 1.0816_G23 | | | | |
| 431 | 3rd lens element | -3.9389 | 1.5236_T3 | 1.586_n3 | 30.181_v3 | 2.410_f3 | plastic |
| 432 | | -1.1883 | -0.0647_G34-TA | | | | |
| 400 | Aperture stop | 1.00E+18 | 0.2930_TA | | | | |
| 441 | 4th lens element | 3.2854 | 0.7000_T4 | 1.640_n4 | 23.899_v4 | -70.389_f4 | plastic |
| 442 | | 0.4524 | 0_G45 | | | | |
| 451 | 5th lens element | 0.4524 | 1.8894_T5 | 1.533_n5 | 55.904_v5 | 5.535_f5 | plastic |
| 452 | | -1.6506 | 0.7655_G5F | | | | |
| 461 | IR cut filter | 1.00E+18 | 0.7000_TF | 1.518 | 64.166 | | |
| 462 | | 1.00E+18 | 0.5000_GFP | | | | |
| 470 | Image plane | 1.00E+18 | 0.0000 | | | | |

FIG. 20

| Aspherical parameters | | | | | |
|---|---|---|---|---|---|
| Surface# | 411 | 412 | 421 | 422 | 431 |
| K | 0.000000E+00 | 0.000000E+00 | 0.000000E+00 | 0.000000E+00 | 0.000000E+00 |
| $a_4$ | 0.000000E+00 | 0.000000E+00 | -9.301880E-04 | -6.286256E-02 | -9.587688E-02 |
| $a_6$ | 0.000000E+00 | 0.000000E+00 | 6.701471E-04 | 1.280978E-02 | 3.324951E-02 |
| $a_8$ | 0.000000E+00 | 0.000000E+00 | -1.919297E-05 | -2.043169E-02 | -4.889179E-02 |
| $a_{10}$ | 0.000000E+00 | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |
| Surface# | 432 | 441 | 442 | 451 | 452 |
| K | 0.000000E+00 | 0.000000E+00 | -1.000000E+00 | -1.000000E+00 | 2.292366E-01 |
| $a_4$ | 1.634960E-01 | 1.350072E-02 | -9.057923E-01 | -9.057923E-01 | 7.433381E-02 |
| $a_6$ | -9.114966E-02 | 5.708832E-03 | 1.096944E+00 | 1.096944E+00 | -1.057541E-02 |
| $a_8$ | 7.883732E-02 | -1.354951E-02 | -7.966517E-01 | -7.966517E-01 | 3.387056E-02 |
| $a_{10}$ | 0.000000E+00 | 8.013712E-03 | 2.693699E-01 | 2.693699E-01 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |

FIG. 21

| EFL (Effective focus length) = 1.0264 mm, HFOV (Half angular field of view) = 96.3562 deg., TTL (System length) = 11.3037mm, Image height = 1.8mm, Fno = 2.2 |||||||
|---|---|---|---|---|---|---|---|
| Surface # | | Radius (mm) | Thickness (mm) | Refractive index | Abbe number | Focus (mm) | Material |
| - | Object | 3000.0000 | 300.0000 | | | | |
| 511 | 1st lens element | 11.8752 | 1.3000_T1 | 1.591_n1 | 61.242_v1 | -7.136_f1 | glass |
| 512 | | 2.9854 | 1.6701_G12 | | | | |
| 521 | 2nd lens lement | 16.5068 | 0.8205_T2 | 1.514_n2 | 56.264_v2 | -2.414_f2 | plastic |
| 522 | | 1.1338 | 0.9127_G23 | | | | |
| 531 | 3rd lens element | -4.7467 | 1.7238_T3 | 1.586_n3 | 30.181_v3 | 2.376_f3 | plastic |
| 532 | | -1.2208 | -0.1285_G34-TA | | | | |
| 500 | Aperture stop | 1.00E+18 | 0.2285_TA | | | | |
| 541 | 4th lens element | 3.4673 | 0.8647_T4 | 1.640_n4 | 23.899_v4 | -57.521_f4 | plastic |
| 542 | | 0.4567 | 0_G45 | | | | |
| 551 | 5th lens element | 0.4567 | 1.8965_T5 | 1.533_n5 | 55.904_v5 | 6.186_f5 | plastic |
| 552 | | -1.7370 | 0.8153_G5F | | | | |
| 561 | IR cut filter | 1.00E+18 | 0.7000_TF | 1.518 | 64.166 | | |
| 562 | | 1.00E+18 | 0.5000_GFP | | | | |
| 570 | Image plane | 1.00E+18 | 0.0000 | | | | |

FIG. 24

| | Aspherical parameters | | | | |
|---|---|---|---|---|---|
| Surface# | 511 | 512 | 521 | 522 | 531 |
| K | 0.000000E+00 | 0.000000E+00 | 0.000000E+00 | 0.000000E+00 | 0.000000E+00 |
| $a_4$ | 0.000000E+00 | 0.000000E+00 | -4.301579E-03 | -6.901699E-02 | -8.955446E-02 |
| $a_6$ | 0.000000E+00 | 0.000000E+00 | 1.072625E-03 | 1.154262E-02 | 1.603156E-02 |
| $a_8$ | 0.000000E+00 | 0.000000E+00 | -3.173416E-05 | -3.151472E-02 | -3.346752E-02 |
| $a_{10}$ | 0.000000E+00 | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |
| Surface# | 532 | 541 | 542 | 551 | 552 |
| K | 0.000000E+00 | 0.000000E+00 | -1.000000E+00 | -1.000000E+00 | 6.044988E-02 |
| $a_4$ | 1.611569E-01 | 2.273446E-02 | -7.010196E-01 | -7.010196E-01 | 8.818093E-03 |
| $a_6$ | -9.270671E-02 | 7.891265E-03 | 7.391004E-01 | 7.391004E-01 | -3.120779E-03 |
| $a_8$ | 7.285897E-02 | -3.329560E-02 | -4.577564E-01 | -4.577564E-01 | 2.241034E-03 |
| $a_{10}$ | 0.000000E+00 | 2.402064E-02 | 1.262999E-01 | 1.262999E-01 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |

FIG. 25

| EFL (Effective focus length) = 1.0466 mm, HFOV (Half angular field of view) = 95.5634 deg., TTL (System length) = 11.7676mm, Image height = 1.8mm, Fno = 2.2 |||||||
|---|---|---|---|---|---|---|---|
| Surface # | | Radius (mm) | Thickness (mm) | Refractive index | Abbe number | Focus (mm) | Material |
| - | Object | 3000.0000 | 300.0000 | | | | |
| 611 | 1st lens element | 12.6572 | 1.3006_T1 | 1.591_n1 | 61.242_v1 | -7.478_f1 | glass |
| 612 | | 3.1503 | 1.7600_G12 | | | | |
| 621 | 2nd lens lement | 20.1390 | 0.8797_T2 | 1.514_n2 | 56.264_v2 | -2.425_f2 | plastic |
| 622 | | 1.1557 | 0.9739_G23 | | | | |
| 631 | 3rd lens element | -5.5197 | 1.9157_T3 | 1.586_n3 | 30.181_v3 | 2.502_f3 | plastic |
| 632 | | -1.3070 | -0.1426_G34-TA | | | | |
| 600 | Aperture stop | 1.00E+18 | 0.2439_TA | | | | |
| 641 | 4th lens element | 2.6435 | 0.7000_T4 | 1.640_n4 | 23.899_v4 | 67.530_f4 | plastic |
| 642 | | 0.4368 | 0_G45 | | | | |
| 651 | 5th lens element | 0.4368 | 2.2476_T5 | 1.533_n5 | 55.904_v5 | 11.212_f5 | plastic |
| 652 | | -2.1692 | 0.6887_G5F | | | | |
| 661 | IR cut filter | 1.00E+18 | 0.7000_TF | 1.518 | 64.166 | | |
| 662 | | 1.00E+18 | 0.5000_GFP | | | | |
| 670 | Image plane | 1.00E+18 | 0.0000 | | | | |

FIG. 28

| Aspherical parameters | | | | | |
|---|---|---|---|---|---|
| Surface# | 611 | 612 | 621 | 622 | 631 |
| K | 0.000000E+00 | 0.000000E+00 | 0.000000E+00 | 0.000000E+00 | 0.000000E+00 |
| $a_4$ | 0.000000E+00 | 0.000000E+00 | -3.762577E-04 | -3.652024E-02 | -6.083399E-02 |
| $a_6$ | 0.000000E+00 | 0.000000E+00 | 3.368570E-04 | 1.075271E-02 | 1.227830E-02 |
| $a_8$ | 0.000000E+00 | 0.000000E+00 | 2.804222E-06 | -1.476548E-02 | -3.359361E-02 |
| $a_{10}$ | 0.000000E+00 | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |
| Surface# | 632 | 641 | 642 | 651 | 652 |
| K | 0.000000E+00 | 0.000000E+00 | -1.000000E+00 | -1.000000E+00 | 1.664826E-01 |
| $a_4$ | 1.451223E-01 | 3.380178E-03 | -9.223286E-01 | -9.223286E-01 | -2.186691E-03 |
| $a_6$ | -9.399301E-02 | 5.847847E-03 | 1.233118E+00 | 1.233118E+00 | 8.694823E-03 |
| $a_8$ | 6.017655E-02 | -1.009283E-02 | -9.072528E-01 | -9.072528E-01 | 1.091331E-02 |
| $a_{10}$ | 0.000000E+00 | 4.135390E-03 | 2.882826E-01 | 2.882826E-01 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |

FIG. 29

| EFL (Effective focus length) = 1.0424 mm, HFOV (Half angular field of view) = 93.1133 deg., TTL (System length) = 12.3299mm, Image height = 1.8mm, Fno = 2.2 ||||||||
|---|---|---|---|---|---|---|---|
| Surface # | | Radius (mm) | Thickness (mm) | Refractive index | Abbe number | Focus (mm) | Material |
| - | Object | 3000.0000 | 300.0000 | | | | |
| 711 | 1st lens element | 14.8466 | 1.3000_T1 | 1.591_n1 | 61.242_v1 | -7.197_f1 | glass |
| 712 | | 3.1984 | 1.7601_G12 | | | | |
| 721 | 2nd lens element | 11.2119 | 1.2188_T2 | 1.514_n2 | 56.264_v2 | -2.843_f2 | plastic |
| 722 | | 1.2444 | 0.9492_G23 | | | | |
| 731 | 3rd lens element | -4.3906 | 1.8100_T3 | 1.586_n3 | 30.181_v3 | 2.880_f3 | plastic |
| 732 | | -1.4048 | 0.0379_G34-TA | | | | |
| 700 | Aperture stop | 1.00E+18 | 0.6421_TA | | | | |
| 741 | 4th lens element | 2.9329 | 0.7000_T4 | 1.640_n4 | 23.899_v4 | 26.849_f4 | plastic |
| 742 | | 0.6016 | 0_G45 | | | | |
| 751 | 5th lens element | 0.6016 | 2.0255_T5 | 1.533_n5 | 55.904_v5 | 5.478_f5 | plastic |
| 752 | | -1.8270 | 0.6863_G5F | | | | |
| 761 | IR cut filter | 1.00E+18 | 0.7000_TF | 1.518 | 64.166 | | |
| 762 | | 1.00E+18 | 0.5000_GFP | | | | |
| 770 | Image plane | 1.00E+18 | 0.0000 | | | | |

FIG. 32

| | Aspherical parameters | | | | |
|---|---|---|---|---|---|
| Surface# | 711 | 712 | 721 | 722 | 731 |
| K | 0.000000E+00 | 0.000000E+00 | 0.000000E+00 | 0.000000E+00 | 0.000000E+00 |
| $a_4$ | 0.000000E+00 | 0.000000E+00 | -7.327427E-03 | -6.709821E-02 | -7.159200E-02 |
| $a_6$ | 0.000000E+00 | 0.000000E+00 | 9.635227E-04 | 1.493078E-02 | 1.275726E-02 |
| $a_8$ | 0.000000E+00 | 0.000000E+00 | -1.221541E-05 | -1.942972E-02 | -3.331107E-02 |
| $a_{10}$ | 0.000000E+00 | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |
| Surface# | 732 | 741 | 742 | 751 | 752 |
| K | 0.000000E+00 | 0.000000E+00 | -1.000000E+00 | -1.000000E+00 | 7.768269E-02 |
| $a_4$ | 6.111444E-02 | 1.436658E-02 | -1.058419E-01 | -1.058419E-01 | -3.943282E-02 |
| $a_6$ | -1.954469E-02 | -4.663701E-03 | 7.107314E-02 | 7.107314E-02 | 5.444860E-02 |
| $a_8$ | 1.934839E-02 | -2.591237E-03 | -2.811173E-02 | -2.811173E-02 | -3.311028E-02 |
| $a_{10}$ | 0.000000E+00 | 1.850869E-03 | 4.603489E-03 | 4.603489E-03 | 8.453157E-03 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |

FIG. 33

| EFL (Effective focus length) = 0.9858 mm, HFOV (Half angular field of view) = 95.2489 deg., TTL (System length) = 13.1979mm, Image height = 1.8mm, Fno = 2.2 ||||||||
|---|---|---|---|---|---|---|---|
| Surface # | | Radius (mm) | Thickness (mm) | Refractive index | Abbe number | Focus (mm) | Material |
| - | Object | 3000.0000 | 300.0000 | | | | |
| 811 | 1st lens element | 16.9085 | 1.4287_T1 | 1.591_n1 | 61.242_v1 | -8.224_f1 | glass |
| 812 | | 3.6564 | 1.3394_G12 | | | | |
| 821 | 2nd lens element | 9.9102 | 0.7235_T2 | 1.514_n2 | 56.264_v2 | -3.477_f2 | plastic |
| 822 | | 1.4756 | 1.2419_G23 | | | | |
| 831 | 3rd lens element | -3.9538 | 3.0040_T3 | 1.586_n3 | 30.181_v3 | 3.481_f3 | plastic |
| 832 | | -1.7235 | 0.0690_G34-TA | | | | |
| 800 | Aperture stop | 1.00E+18 | 0.4749_TA | | | | |
| 841 | 4th lens element | 3.1694 | 1.2921_T4 | 1.640_n4 | 23.899_v4 | 27.967_f4 | plastic |
| 842 | | 0.6110 | 0_G45 | | | | |
| 851 | 5th lens element | 0.6110 | 1.8738_T5 | 1.533_n5 | 55.904_v5 | 5.060_f5 | plastic |
| 852 | | -1.7365 | 0.5506_G5F | | | | |
| 861 | IR cut filter | 1.00E+18 | 0.7000_TF | 1.518 | 64.166 | | |
| 862 | | 1.00E+18 | 0.5000_GFP | | | | |
| 870 | Image plane | 1.00E+18 | 0.0000 | | | | |

FIG. 36

| Aspherical parameters | | | | | |
|---|---|---|---|---|---|
| Surface# | 811 | 812 | 821 | 822 | 831 |
| K | 0.000000E+00 | 0.000000E+00 | 0.000000E+00 | 0.000000E+00 | 0.000000E+00 |
| $a_4$ | 0.000000E+00 | 0.000000E+00 | -2.505755E-03 | -5.381430E-02 | -1.747595E-02 |
| $a_6$ | 0.000000E+00 | 0.000000E+00 | 9.398137E-05 | 2.283017E-02 | -1.300256E-04 |
| $a_8$ | 0.000000E+00 | 0.000000E+00 | 4.568557E-05 | -1.197395E-02 | -1.476776E-03 |
| $a_{10}$ | 0.000000E+00 | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |
| Surface# | 832 | 841 | 842 | 851 | 852 |
| K | 0.000000E+00 | 0.000000E+00 | -1.000000E+00 | -1.000000E+00 | 6.319097E-02 |
| $a_4$ | 5.690172E-02 | 2.506016E-02 | -6.118082E-02 | -6.118082E-02 | 3.728316E-02 |
| $a_6$ | -1.642724E-02 | -2.210494E-02 | -2.325345E-02 | -2.325345E-02 | -3.629816E-02 |
| $a_8$ | 8.500813E-03 | 1.615453E-02 | 1.070946E-02 | 1.070946E-02 | 1.701860E-02 |
| $a_{10}$ | 0.000000E+00 | -3.677162E-03 | 2.062203E-03 | 2.062203E-03 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |

FIG. 37

| EFL (Effective focus length) = 1.0627 mm, HFOV (Half angular field of view) = 95.4559 deg., TTL (System length) = 11.7538mm, Image height = 1.8mm, Fno = 2.2 ||||||||
|---|---|---|---|---|---|---|---|
| Surface # | | Radius (mm) | Thickness (mm) | Refractive index | Abbe number | Focus (mm) | Material |
| - | Object | 3000.0000 | 300.0000 | | | | |
| 911 | 1st lens element | 14.7405 | 1.3000_T1 | 1.591_n1 | 61.242_v1 | -7.243_f1 | glass |
| 912 | | 3.2084 | 1.6313_G12 | | | | |
| 921 | 2nd lens element | 8.6719 | 0.8969_T2 | 1.514_n2 | 56.264_v2 | -3.235_f2 | plastic |
| 922 | | 1.3455 | 1.4692_G23 | | | | |
| 931 | 3rd lens element | -3.6923 | 1.5088_T3 | 1.586_n3 | 30.181_v3 | 2.613_f3 | plastic |
| 932 | | -1.2457 | -0.1642_G34-TA | | | | |
| 900 | Aperture stop | 1.00E+18 | 0.2642_TA | | | | |
| 941 | 4th lens element | 3.2414 | 1.1354_T4 | 1.640_n4 | 23.899_v4 | -243.962_f4 | plastic |
| 942 | | 0.4529 | 0_G45 | | | | |
| 951 | 5th lens element | 0.4529 | 2.0171_T5 | 1.533_n5 | 55.904_v5 | 6.698_f5 | plastic |
| 952 | | -1.8129 | 0.4951_G5F | | | | |
| 961 | IR cut filter | 1.00E+18 | 0.7000_TF | 1.518 | 64.166 | | |
| 962 | | 1.00E+18 | 0.5000_GFP | | | | |
| 970 | Image plane | 1.00E+18 | 0.0000 | | | | |

FIG. 40

| Aspherical parameters | | | | | |
|---|---|---|---|---|---|
| Surface# | 911 | 912 | 921 | 922 | 931 |
| K | 0.000000E+00 | 0.000000E+00 | 0.000000E+00 | 0.000000E+00 | 0.000000E+00 |
| $a_4$ | 0.000000E+00 | 0.000000E+00 | -4.949957E-03 | -2.265420E-02 | -6.694913E-02 |
| $a_6$ | 0.000000E+00 | 0.000000E+00 | 5.196898E-04 | 1.250886E-02 | 6.449240E-03 |
| $a_8$ | 0.000000E+00 | 0.000000E+00 | 4.268572E-06 | -6.259667E-03 | -6.072020E-02 |
| $a_{10}$ | 0.000000E+00 | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |
| Surface# | 932 | 941 | 942 | 951 | 952 |
| K | 0.000000E+00 | 0.000000E+00 | -1.000000E+00 | -1.000000E+00 | 9.259369E-02 |
| $a_4$ | 1.161602E-01 | 2.130391E-02 | -4.539323E-01 | -4.539323E-01 | 1.962319E-01 |
| $a_6$ | -7.257312E-02 | -4.505048E-02 | 3.428020E-01 | 3.428020E-01 | -2.883082E-01 |
| $a_8$ | 6.216991E-02 | 3.920303E-02 | -1.887540E-01 | -1.887540E-01 | 1.807662E-01 |
| $a_{10}$ | 0.000000E+00 | -8.752014E-03 | 4.703901E-02 | 4.703901E-02 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |

FIG. 41

| \multicolumn{7}{c}{EFL (Effective focus length) = 1.0543 mm, HFOV (Half angular field of view) = 95.7313 deg., TTL (System length) = 11.1571mm, Image height = 1.8mm, Fno = 2.2} |
|---|---|---|---|---|---|---|---|
| Surface # | | Radius (mm) | Thickness (mm) | Refractive index | Abbe number | Focus (mm) | Material |
| - | Object | 3000.0000 | 300.0000 | | | | |
| 1011 | 1st lens element | 14.9183 | 1.8227_T1 | 1.591_n1 | 61.242_v1 | -7.042_f1 | glass |
| 1012 | | 3.1062 | 1.2941_G12 | | | | |
| 1021 | 2nd lens lement | 11.1067 | 0.7000_T2 | 1.514_n2 | 56.264_v2 | -2.430_f2 | plastic |
| 1022 | | 1.0979 | 0.9200_G23 | | | | |
| 1031 | 3rd lens element | -4.9521 | 1.6901_T3 | 1.586_n3 | 30.181_v3 | 2.280_f3 | plastic |
| 1032 | | -1.1850 | -0.1336_G34-TA | | | | |
| 1000 | Aperture stop | 1.00E+18 | 0.3843_TA | | | | |
| 1041 | 4th lens element | 3.6241 | 0.7059_T4 | 1.640_n4 | 23.899_v4 | -48.875_f4 | plastic |
| 1042 | | 0.4748 | 0_G45 | | | | |
| 1051 | 5th lens element | 0.4748 | 1.8105_T5 | 1.533_n5 | 55.904_v5 | 5.942_f5 | plastic |
| 1052 | | -1.7150 | 0.7631_G5F | | | | |
| 1061 | IR cut filter | 1.00E+18 | 0.7000_TF | 1.518 | 64.166 | | |
| 1062 | | 1.00E+18 | 0.5000_GFP | | | | |
| 1070 | Image plane | 1.00E+18 | 0.0000 | | | | |

FIG. 44

| | Aspherical parameters | | | | |
|---|---|---|---|---|---|
| Surface# | 1011 | 1012 | 1021 | 1022 | 1031 |
| K | 0.000000E+00 | 0.000000E+00 | 0.000000E+00 | 0.000000E+00 | 0.000000E+00 |
| $a_4$ | 0.000000E+00 | 0.000000E+00 | -4.398328E-03 | -7.079384E-02 | -8.363285E-02 |
| $a_6$ | 0.000000E+00 | 0.000000E+00 | 9.394667E-04 | 3.969002E-02 | 2.560053E-03 |
| $a_8$ | 0.000000E+00 | 0.000000E+00 | 5.712566E-05 | -5.846092E-02 | -4.464786E-02 |
| $a_{10}$ | 0.000000E+00 | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |
| Surface# | 1032 | 1041 | 1042 | 1051 | 1052 |
| K | 0.000000E+00 | 0.000000E+00 | -1.000000E+00 | -1.000000E+00 | 9.615865E-02 |
| $a_4$ | 1.580953E-01 | 2.721739E-02 | -5.861205E-01 | -5.861205E-01 | 1.793911E-01 |
| $a_6$ | -9.167831E-02 | -1.651715E-02 | 5.498046E-01 | 5.498046E-01 | -2.565586E-01 |
| $a_8$ | 8.651720E-02 | -4.985934E-03 | -3.782884E-01 | -3.782884E-01 | 1.721105E-01 |
| $a_{10}$ | 0.000000E+00 | 1.451121E-02 | 1.073371E-01 | 1.073371E-01 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |

FIG. 45

| \multicolumn{7}{c|}{EFL (Effective focus length) = 0.9949 mm, HFOV (Half angular field of view) = 94.7616 deg., TTL (System length) = 11.6748mm, Image height = 1.8mm, Fno = 2.2} |
|---|---|---|---|---|---|---|---|
| Surface # | | Radius (mm) | Thickness (mm) | Refractive index | Abbe number | Focus (mm) | Material |
| - | Object | 3000.0000 | 300.0000 | | | | |
| 1111 | 1st lens element | 12.8197 | 1.4886_T1 | 1.591_n1 | 61.242_v1 | -6.986_f1 | glass |
| 1112 | | 2.9879 | 2.0825_G12 | | | | |
| 1121 | 2nd lens lement | -17.5240 | 0.7525_T2 | 1.514_n2 | 56.264_v2 | -2.551_f2 | plastic |
| 1122 | | 1.4369 | 1.0126_G23 | | | | |
| 1131 | 3rd lens element | -7.2538 | 1.4987_T3 | 1.586_n3 | 30.181_v3 | 2.220_f3 | plastic |
| 1132 | | -1.1872 | -0.1467_G34-TA | | | | |
| 1100 | Aperture stop | 1.00E+18 | 0.7000_TA | | | | |
| 1141 | 4th lens element | 4.5263 | 0.7000_T4 | 1.640_n4 | 23.899_v4 | -66.471_f4 | plastic |
| 1142 | | 0.6106 | 0_G45 | | | | |
| 1151 | 5th lens element | 0.6106 | 1.9489_T5 | 1.533_n5 | 55.904_v5 | 4.374_f5 | plastic |
| 1152 | | -1.6140 | 0.4378_G5F | | | | |
| 1161 | IR cut filter | 1.00E+18 | 0.7000_TF | 1.518 | 64.166 | | |
| 1162 | | 1.00E+18 | 0.5000_GFP | | | | |
| 1170 | Image plane | 1.00E+18 | 0.0000 | | | | |

FIG. 48

| Aspherical parameters | | | | | |
|---|---|---|---|---|---|
| Surface# | 1111 | 1112 | 1121 | 1122 | 1131 |
| K | 0.000000E+00 | 0.000000E+00 | 0.000000E+00 | 0.000000E+00 | 0.000000E+00 |
| $a_4$ | 0.000000E+00 | 0.000000E+00 | -2.618474E-03 | -4.279742E-02 | -1.114890E-01 |
| $a_6$ | 0.000000E+00 | 0.000000E+00 | 1.484881E-03 | 5.963757E-03 | 3.941354E-03 |
| $a_8$ | 0.000000E+00 | 0.000000E+00 | -8.359159E-05 | -2.759455E-03 | -8.412879E-02 |
| $a_{10}$ | 0.000000E+00 | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |
| Surface# | 1132 | 1141 | 1142 | 1151 | 1152 |
| K | 0.000000E+00 | 0.000000E+00 | -1.000000E+00 | -1.000000E+00 | 1.949267E-01 |
| $a_4$ | 1.123170E-01 | 5.539390E-02 | -6.467027E-02 | -6.467027E-02 | 1.628585E-01 |
| $a_6$ | -5.972996E-02 | -4.092231E-02 | -3.454288E-04 | -3.454288E-04 | -2.340659E-01 |
| $a_8$ | 7.195063E-02 | 1.977392E-02 | -1.714723E-03 | -1.714723E-03 | 1.610768E-01 |
| $a_{10}$ | 0.000000E+00 | -3.180226E-03 | 1.752094E-02 | 1.752094E-02 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |

FIG. 49

| Surface # | | Radius (mm) | Thickness (mm) | Refractive index | Abbe number | Focus (mm) | Material |
|---|---|---|---|---|---|---|---|
| | EFL (Effective focus length) = 1.0277 mm, HFOV (Half angular field of view) = 95.4605 deg., TTL (System length) = 12.1832mm, Image height = 1.8mm, Fno = 2.4 | | | | | | |
| - | Object | 3000.0000 | 300.0000 | | | | |
| 1211 | 1st lens element | 14.3452 | 1.3000_T1 | 1.591_n1 | 61.242_v1 | -7.145_f1 | glass |
| 1212 | | 3.1522 | 1.8187_G12 | | | | |
| 1221 | 2nd lens element | 15.9756 | 0.8943_T2 | 1.514_n2 | 56.264_v2 | -2.813_f2 | plastic |
| 1222 | | 1.2997 | 1.4690_G23 | | | | |
| 1231 | 3rd lens element | -5.7977 | 1.6144_T3 | 1.586_n3 | 30.181_v3 | 2.524_f3 | plastic |
| 1232 | | -1.2998 | -0.1372_G34-TA | | | | |
| 1200 | Aperture stop | 1.00E+18 | 0.2440_TA | | | | |
| 1241 | 4th lens element | 4.3289 | 1.2083_T4 | 1.640_n4 | 23.899_v4 | -32.512_f4 | plastic |
| 1242 | | 0.4883 | 0_G45 | | | | |
| 1251 | 5th lens element | 0.4883 | 1.6893_T5 | 1.533_n5 | 55.904_v5 | 9.116_f5 | plastic |
| 1252 | | -2.0135 | 0.8825_G5F | | | | |
| 1261 | IR cut filter | 1.00E+18 | 0.7000_TF | 1.518 | 64.166 | | |
| 1262 | | 1.00E+18 | 0.5000_GFP | | | | |
| 1270 | Image plane | 1.00E+18 | 0.0000 | | | | |

FIG. 52

| Aspherical parameters | | | | | |
|---|---|---|---|---|---|
| Surface# | 1211 | 1212 | 1221 | 1222 | 1231 |
| K | 0.000000E+00 | 0.000000E+00 | 0.000000E+00 | 0.000000E+00 | 0.000000E+00 |
| $a_4$ | 0.000000E+00 | 0.000000E+00 | -5.515123E-03 | -3.381594E-02 | -5.718730E-02 |
| $a_6$ | 0.000000E+00 | 0.000000E+00 | 8.863420E-04 | 2.202601E-02 | -7.735595E-04 |
| $a_8$ | 0.000000E+00 | 0.000000E+00 | -2.666173E-05 | -1.573923E-02 | -3.836956E-02 |
| $a_{10}$ | 0.000000E+00 | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |
| Surface# | 1232 | 1241 | 1242 | 1251 | 1252 |
| K | 0.000000E+00 | 0.000000E+00 | -1.000000E+00 | -1.000000E+00 | 9.297042E-02 |
| $a_4$ | 1.170106E-01 | 1.298466E-02 | -5.380542E-01 | -5.380542E-01 | -1.395961E-01 |
| $a_6$ | -8.467387E-02 | -1.752646E-02 | 4.158179E-01 | 4.158179E-01 | 3.959721E-01 |
| $a_8$ | 6.439140E-02 | 9.261678E-03 | -4.197358E-01 | -4.197358E-01 | -4.670668E-01 |
| $a_{10}$ | 0.000000E+00 | -1.289559E-03 | 2.514670E-01 | 2.514670E-01 | 2.449060E-01 |
| $a_{12}$ | 0.000000E+00 | 0.000000E+00 | -1.169284E-01 | -1.169284E-01 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |

FIG. 53

| Surface # | | Radius (mm) | Thickness (mm) | Refractive index | Abbe number | Focus (mm) | Material |
|---|---|---|---|---|---|---|---|
| | EFL (Effective focus length) = 1.0227 mm, HFOV (Half angular field of view) = 94.4939 deg., TTL (System length) = 14.2000mm, Image height = 1.8mm, Fno = 2.4 |
| - | Object | 3000.0000 | 300.0000 | | | | |
| 1311 | 1st lens element | 16.5279 | 1.4316_T1 | 1.591_n1 | 61.242_v1 | -6.649_f1 | glass |
| 1312 | | 3.0723 | 2.0028_G12 | | | | |
| 1321 | 2nd lens lement | -104.3363 | 0.7866_T2 | 1.514_n2 | 56.264_v2 | -2.879_f2 | plastic |
| 1322 | | 1.5042 | 1.5160_G23 | | | | |
| 1331 | 3rd lens element | -140.4513 | 2.6817_T3 | 1.586_n3 | 30.181_v3 | 2.855_f3 | plastic |
| 1332 | | -1.6651 | 0.2047_G34-TA | | | | |
| 1300 | Aperture stop | 1.00E+18 | 0.2792_TA | | | | |
| 1341 | 4th lens element | 6.9225 | 2.0132_T4 | 1.640_n4 | 23.899_v4 | -85.316_f4 | plastic |
| 1342 | | 0.8580 | 0_G45 | | | | |
| 1351 | 5th lens element | 0.8580 | 1.9040_T5 | 1.533_n5 | 55.904_v5 | 4.551_f5 | plastic |
| 1352 | | -1.7873 | 0.4000_G5F | | | | |
| 1361 | IR cut filter | 1.00E+18 | 0.7000_TF | 1.518 | 64.166 | | |
| 1362 | | 1.00E+18 | 0.5000_GFP | | | | |
| 1370 | Image plane | 1.00E+18 | 0.0000 | | | | |

FIG. 56

| Aspherical parameters | | | | | |
|---|---|---|---|---|---|
| Surface# | 1311 | 1312 | 1321 | 1322 | 1331 |
| K | 0.000000E+00 | 0.000000E+00 | 0.000000E+00 | 0.000000E+00 | 0.000000E+00 |
| $a_4$ | 0.000000E+00 | 0.000000E+00 | -4.054619E-03 | -2.499711E-02 | -5.753654E-03 |
| $a_6$ | 0.000000E+00 | 0.000000E+00 | 6.755642E-04 | 1.437471E-02 | 6.328501E-03 |
| $a_8$ | 0.000000E+00 | 0.000000E+00 | -2.122851E-05 | -8.072520E-04 | -5.567190E-03 |
| $a_{10}$ | 0.000000E+00 | 0.000000E+00 | 0.000000E+00 | -1.492755E-03 | 4.921457E-04 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |
| Surface# | 1332 | 1341 | 1342 | 1351 | 1352 |
| K | 0.000000E+00 | 0.000000E+00 | -1.000000E+00 | -1.000000E+00 | 6.162426E-02 |
| $a_4$ | 8.720834E-02 | 8.085870E-02 | 8.853284E-02 | 8.853284E-02 | 2.110587E-02 |
| $a_6$ | -4.772114E-02 | -1.135981E-01 | 1.781440E-01 | 1.781440E-01 | -1.099754E-01 |
| $a_8$ | 2.858772E-02 | 1.597751E-01 | -3.733066E-01 | -3.733066E-01 | 1.452614E-01 |
| $a_{10}$ | -6.014123E-03 | -1.507618E-01 | 2.469178E-01 | 2.469178E-01 | -8.272437E-02 |
| $a_{12}$ | 0.000000E+00 | 6.187220E-02 | -6.199541E-02 | -6.199541E-02 | 1.844931E-02 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |

FIG. 57

| EFL (Effective focus length) = 1.0418 mm, HFOV (Half angular field of view) = 95.0757 deg., TTL (System length) = 13.1607mm, Image height = 1.8mm, Fno = 2.4 |||||||| 
|---|---|---|---|---|---|---|---|
| Surface # | | Radius (mm) | Thickness (mm) | Refractive index | Abbe number | Focus (mm) | Material |
| - | Object | 3000.0000 | 300.0000 | | | | |
| 1411 | 1st lens element | 14.5551 | 1.4376_T1 | 1.591_n1 | 61.242_v1 | -6.800_f1 | glass |
| 1412 | | 3.0335 | 2.0112_G12 | | | | |
| 1421 | 2nd lens element | -32.1486 | 0.7000_T2 | 1.514_n2 | 56.264_v2 | -2.767_f2 | plastic |
| 1422 | | 1.4983 | 1.1788_G23 | | | | |
| 1431 | 3rd lens element | -2222.9453 | 2.4868_T3 | 1.586_n3 | 30.181_v3 | 2.706_f3 | plastic |
| 1432 | | -1.5852 | 0.1822_G34-TA | | | | |
| 1400 | Aperture stop | 1.00E+18 | 0.3841_TA | | | | |
| 1441 | 4th lens element | 5.3895 | 1.2687_T4 | 1.640_n4 | 23.899_v4 | 468.458_f4 | plastic |
| 1442 | | 0.8405 | 0_G45 | | | | |
| 1451 | 5th lens element | 0.8405 | 1.7096_T5 | 1.533_n5 | 55.904_v5 | 5.684_f5 | plastic |
| 1452 | | -2.0076 | 0.6016_G5F | | | | |
| 1461 | IR cut filter | 1.00E+18 | 0.7000_TF | 1.518 | 64.166 | | |
| 1462 | | 1.00E+18 | 0.5000_GFP | | | | |
| 1470 | Image plane | 1.00E+18 | 0.0000 | | | | |

FIG. 60

| Aspherical parameters | | | | | |
|---|---|---|---|---|---|
| Surface# | 1411 | 1412 | 1421 | 1422 | 1431 |
| K | 0.000000E+00 | 0.000000E+00 | 0.000000E+00 | 0.000000E+00 | 0.000000E+00 |
| $a_4$ | 0.000000E+00 | 0.000000E+00 | -3.445022E-03 | -1.599371E-02 | -1.509716E-02 |
| $a_6$ | 0.000000E+00 | 0.000000E+00 | 7.997947E-04 | 8.857613E-03 | 2.455056E-03 |
| $a_8$ | 0.000000E+00 | 0.000000E+00 | -3.184695E-05 | -1.795565E-03 | -7.105417E-03 |
| $a_{10}$ | 0.000000E+00 | 0.000000E+00 | 0.000000E+00 | -1.805185E-03 | -9.742875E-05 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |
| Surface# | 1432 | 1441 | 1442 | 1451 | 1452 |
| K | 0.000000E+00 | 0.000000E+00 | -1.000000E+00 | -1.000000E+00 | 1.005490E-01 |
| $a_4$ | 8.769796E-02 | 3.770068E-02 | 2.996134E-01 | 2.996134E-01 | -9.109796E-03 |
| $a_6$ | -4.785467E-02 | -2.992782E-02 | -2.394617E-01 | -2.394617E-01 | -2.536153E-01 |
| $a_8$ | 3.145998E-02 | 1.876204E-02 | -1.272182E-01 | -1.272182E-01 | 8.373511E-01 |
| $a_{10}$ | -6.435668E-03 | -8.229715E-03 | 2.411553E-01 | 2.411553E-01 | -9.692306E-01 |
| $a_{12}$ | 0.000000E+00 | 2.019088E-03 | -1.112461E-01 | -1.112461E-01 | 4.339806E-01 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |

FIG. 61

| Surface # | | Radius (mm) | Thickness (mm) | Refractive index | Abbe number | Focus (mm) | Material |
|---|---|---|---|---|---|---|---|
| | EFL (Effective focus length) = 0.9904 mm, HFOV (Half angular field of view) = 94.5364 deg., TTL (System length) = 13.7838mm, Image height = 1.8mm, Fno = 2.4 |
| - | Object | 3000.0000 | 300.0000 | | | | |
| 1511 | 1st lens element | 16.9830 | 1.3000_T1 | 1.591_n1 | 61.242_v1 | -7.533_f1 | glass |
| 1512 | | 3.4268 | 1.7033_G12 | | | | |
| 1521 | 2nd lens element | 34.3435 | 0.7323_T2 | 1.514_n2 | 56.264_v2 | -3.231_f2 | plastic |
| 1522 | | 1.5716 | 1.1323_G23 | | | | |
| 1531 | 3rd lens element | -12.2862 | 3.7253_T3 | 1.586_n3 | 30.181_v3 | 2.538_f3 | plastic |
| 1532 | | -1.4754 | -0.1219_G34-TA | | | | |
| 1500 | Aperture stop | 1.00E+18 | 0.8649_TA | | | | |
| 1541 | 4th lens element | 7.0833 | 0.7880_T4 | 1.640_n4 | 23.899_v4 | -42.816_f4 | plastic |
| 1542 | | 0.8103 | 0_G45 | | | | |
| 1551 | 5th lens element | 0.8103 | 1.8968_T5 | 1.533_n5 | 55.904_v5 | 6.606_f5 | plastic |
| 1552 | | -2.1884 | 0.5626_G5F | | | | |
| 1561 | IR cut filter | 1.00E+18 | 0.7000_TF | 1.518 | 64.166 | | |
| 1562 | | 1.00E+18 | 0.5000_GFP | | | | |
| 1570 | Image plane | 1.00E+18 | 0.0000 | | | | |

FIG. 64

| Aspherical parameters | | | | | |
|---|---|---|---|---|---|
| Surface# | 1511 | 1512 | 1521 | 1522 | 1531 |
| K | 0.000000E+00 | 0.000000E+00 | 0.000000E+00 | 0.000000E+00 | 0.000000E+00 |
| $a_4$ | 0.000000E+00 | 0.000000E+00 | -3.706744E-05 | -4.286973E-02 | -3.336886E-02 |
| $a_6$ | 0.000000E+00 | 0.000000E+00 | 1.634602E-04 | 8.495535E-03 | 1.089606E-02 |
| $a_8$ | 0.000000E+00 | 0.000000E+00 | 1.785665E-05 | -3.659734E-03 | -4.043515E-03 |
| $a_{10}$ | 0.000000E+00 | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |
| Surface# | 1532 | 1541 | 1542 | 1551 | 1552 |
| K | 0.000000E+00 | 0.000000E+00 | -1.000000E+00 | -1.000000E+00 | 7.745130E-02 |
| $a_4$ | 1.186384E-01 | 1.469905E-01 | 4.380406E-01 | 4.380406E-01 | -7.719056E-02 |
| $a_6$ | -5.188194E-02 | -1.378158E-01 | -4.706247E-01 | -4.706247E-01 | 1.048392E-01 |
| $a_8$ | 3.187098E-02 | 7.774620E-02 | 2.443100E-01 | 2.443100E-01 | -6.827095E-02 |
| $a_{10}$ | 0.000000E+00 | -1.784935E-02 | -5.356592E-02 | -5.356592E-02 | 1.877874E-02 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |

FIG. 65

| EFL (Effective focus length) = 1.4473 mm, HFOV (Half angular field of view) = 74.3430 deg., TTL (System length) = 16.5489mm, Image height = 1.8mm, Fno = 2.4 ||||||||
|---|---|---|---|---|---|---|---|
| Surface # | | Radius (mm) | Thickness (mm) | Refractive index | Abbe number | Focus (mm) | Material |
| - | Object | 3000.0000 | 300.0000 | | | | |
| 1611 | 1st lens element | 105.1249 | 1.4700_T1 | 1.554_n1 | 63.333_v1 | -8.548_f1 | glass |
| 1612 | | 4.5097 | 2.0578_G12 | | | | |
| 1621 | 2nd lens element | 10.6236 | 2.0186_T2 | 1.514_n2 | 56.264_v2 | -3.947_f2 | plastic |
| 1622 | | 1.5927 | 2.0346_G23-TA | | | | |
| 1600 | Aperture stop | 1.00E+18 | 0.0632_TA | | | | |
| 1631 | 3rd lens element | -29.1359 | 2.1244_T3 | 1.586_n3 | 30.181_v3 | 3.306_f3 | plastic |
| 1632 | | -1.8657 | 0.1089_G34 | | | | |
| 1641 | 4th lens element | 5.0541 | 1.4072_T4 | 1.640_n4 | 23.899_v4 | -82.961_f4 | plastic |
| 1642 | | 0.6565 | 0_G45 | | | | |
| 1651 | 5th lens element | 0.6565 | 2.8604_T5 | 1.533_n5 | 55.904_v5 | 14.910_f5 | plastic |
| 1652 | | -3.0230 | 1.1037_G5F | | | | |
| 1661 | IR cut filter | 1.00E+18 | 0.7000_TF | 1.518 | 64.166 | | |
| 1662 | | 1.00E+18 | 0.6000_GFP | | | | |
| 1670 | Image plane | 1.00E+18 | 0.0000 | | | | |

FIG. 68

| Aspherical parameters | | | | | |
|---|---|---|---|---|---|
| Surface# | 1611 | 1612 | 1621 | 1622 | 1631 |
| K | 0.000000E+00 | 0.000000E+00 | 0.000000E+00 | 0.000000E+00 | 0.000000E+00 |
| $a_4$ | 0.000000E+00 | 0.000000E+00 | 4.861038E-03 | 1.006743E-03 | -1.213565E-02 |
| $a_6$ | 0.000000E+00 | 0.000000E+00 | -5.513183E-04 | 4.488593E-03 | 2.191189E-03 |
| $a_8$ | 0.000000E+00 | 0.000000E+00 | 1.811444E-05 | -4.679066E-03 | -7.425066E-03 |
| $a_{10}$ | 0.000000E+00 | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |
| Surface# | 1632 | 1641 | 1642 | 1651 | 1652 |
| K | 0.000000E+00 | 0.000000E+00 | -1.000000E+00 | -1.000000E+00 | 1.628392E-01 |
| $a_4$ | 4.821464E-02 | 9.552045E-02 | -1.301308E+00 | -1.301308E+00 | 9.133066E-02 |
| $a_6$ | -1.288955E-02 | -1.052815E-01 | 2.146535E+00 | 2.146535E+00 | -2.164678E-01 |
| $a_8$ | 2.412633E-03 | 1.186576E-02 | -1.822998E+00 | -1.822998E+00 | 1.148027E-01 |
| $a_{10}$ | 0.000000E+00 | 4.325857E-03 | 5.380173E-01 | 5.380173E-01 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |

FIG. 69

| Embodiment | 1st | 2nd | 3rd | 4th | 5th | 6th | 7th | 8th |
|---|---|---|---|---|---|---|---|---|
| T1 | 1.300 | 1.318 | 1.300 | 1.300 | 1.300 | 1.301 | 1.300 | 1.429 |
| G1 | 1.811 | 1.380 | 1.753 | 1.660 | 1.670 | 1.760 | 1.760 | 1.339 |
| T2 | 0.978 | 0.884 | 0.781 | 0.729 | 0.821 | 0.880 | 1.219 | 0.723 |
| G2 | 0.956 | 1.021 | 0.879 | 1.082 | 0.913 | 0.974 | 0.949 | 1.242 |
| T3 | 1.823 | 2.196 | 1.673 | 1.524 | 1.724 | 1.916 | 1.810 | 3.004 |
| G3 | 0.189 | 0.100 | 0.158 | 0.228 | 0.100 | 0.101 | 0.680 | 0.544 |
| T4 | 0.700 | 1.071 | 0.761 | 0.700 | 0.865 | 0.700 | 0.700 | 1.292 |
| G4 | 0.000 | 0.000 | 0.000 | 0.000 | 0.000 | 0.000 | 0.000 | 0.000 |
| T5 | 2.533 | 1.930 | 2.006 | 1.889 | 1.896 | 2.248 | 2.025 | 1.874 |
| G5 | 0.929 | 0.630 | 0.660 | 0.765 | 0.815 | 0.689 | 0.686 | 0.551 |
| TF | 0.700 | 0.700 | 0.700 | 0.700 | 0.700 | 0.700 | 0.700 | 0.700 |
| GFP | 0.500 | 0.500 | 0.500 | 0.500 | 0.500 | 0.500 | 0.500 | 0.500 |
| TL | 10.290 | 9.899 | 9.312 | 9.112 | 9.288 | 9.879 | 10.444 | 11.447 |
| ALT | 7.334 | 7.398 | 6.521 | 6.143 | 6.606 | 7.044 | 7.054 | 8.322 |
| AAG | 2.955 | 2.501 | 2.790 | 2.970 | 2.683 | 2.835 | 3.389 | 3.125 |
| TTL | 12.419 | 11.730 | 11.172 | 11.078 | 11.304 | 11.768 | 12.330 | 13.198 |
| BFL | 2.129 | 1.830 | 1.860 | 1.965 | 2.015 | 1.889 | 1.886 | 1.751 |
| TL/(G2+G3+G4) | 8.990 | 8.828 | 8.977 | 6.957 | 9.172 | 9.188 | 6.410 | 6.410 |
| ALT/(G3+T2+T4) | 3.929 | 3.600 | 3.836 | 3.705 | 3.700 | 4.190 | 2.714 | 3.251 |
| TL/(G3+T2) | 8.819 | 10.062 | 9.913 | 9.514 | 10.090 | 10.070 | 5.500 | 9.032 |
| ALT/(G3+G1) | 3.668 | 5.000 | 3.412 | 3.253 | 3.732 | 3.784 | 2.891 | 4.419 |
| AAG/(G3+G2) | 2.582 | 2.230 | 2.690 | 2.267 | 2.649 | 2.637 | 2.080 | 1.750 |
| G1/T1 | 1.393 | 1.047 | 1.348 | 1.277 | 1.285 | 1.353 | 1.354 | 0.937 |
| TTL/T3 | 6.814 | 5.342 | 6.676 | 7.271 | 6.558 | 6.143 | 6.812 | 4.393 |
| TTL/G2 | 12.990 | 11.485 | 12.710 | 10.242 | 12.384 | 12.083 | 12.990 | 10.627 |
| TTL/AAG | 4.202 | 4.690 | 4.004 | 3.730 | 4.213 | 4.151 | 3.638 | 4.223 |
| T5/G2 | 2.650 | 1.890 | 2.282 | 1.747 | 2.078 | 2.308 | 2.134 | 1.509 |
| T5/T3 | 1.390 | 0.879 | 1.199 | 1.240 | 1.100 | 1.173 | 1.119 | 0.624 |
| T5/G1 | 1.399 | 1.399 | 1.145 | 1.138 | 1.136 | 1.277 | 1.151 | 1.399 |
| T5/BFL | 1.190 | 1.055 | 1.078 | 0.961 | 0.941 | 1.190 | 1.074 | 1.070 |
| BFL/(G3+G2) | 1.860 | 1.632 | 1.794 | 1.500 | 1.990 | 1.757 | 1.158 | 0.980 |
| T5/T2 | 2.590 | 2.184 | 2.568 | 2.590 | 2.311 | 2.555 | 1.662 | 2.590 |
| ALT/(G3+T4) | 8.254 | 6.316 | 7.098 | 6.617 | 6.847 | 8.790 | 5.111 | 4.533 |
| T5/T1 | 1.949 | 1.465 | 1.543 | 1.453 | 1.459 | 1.728 | 1.558 | 1.312 |
| T3/G2 | 1.906 | 2.150 | 1.904 | 1.409 | 1.889 | 1.967 | 1.907 | 2.419 |
| BFL/T3 | 1.168 | 0.834 | 1.112 | 1.290 | 1.169 | 0.986 | 1.042 | 0.583 |

FIG. 70A

| Embodiment | 9th | 10th | 11th | 12th | 13th | 14th | 15th | 16th |
|---|---|---|---|---|---|---|---|---|
| T1 | 1.300 | 1.823 | 1.489 | 1.300 | 1.432 | 1.438 | 1.300 | 1.470 |
| G1 | 1.631 | 1.294 | 2.083 | 1.819 | 2.003 | 2.011 | 1.703 | 2.058 |
| T2 | 0.897 | 0.700 | 0.752 | 0.894 | 0.787 | 0.700 | 0.732 | 2.019 |
| G2 | 1.469 | 0.920 | 1.013 | 1.469 | 1.516 | 1.179 | 1.132 | 2.098 |
| T3 | 1.509 | 1.690 | 1.499 | 1.614 | 2.682 | 2.487 | 3.725 | 2.124 |
| G3 | 0.100 | 0.251 | 0.553 | 0.107 | 0.484 | 0.566 | 0.743 | 0.109 |
| T4 | 1.135 | 0.706 | 0.700 | 1.208 | 2.013 | 1.269 | 0.788 | 1.407 |
| G4 | 0.000 | 0.000 | 0.000 | 0.000 | 0.000 | 0.000 | 0.000 | 0.000 |
| T5 | 2.017 | 1.810 | 1.949 | 1.689 | 1.904 | 1.710 | 1.897 | 2.860 |
| G5 | 0.495 | 0.763 | 0.438 | 0.883 | 0.400 | 0.602 | 0.563 | 1.104 |
| TF | 0.700 | 0.700 | 0.700 | 0.700 | 0.700 | 0.700 | 0.700 | 0.700 |
| GFP | 0.500 | 0.500 | 0.500 | 0.500 | 0.500 | 0.500 | 0.500 | 0.600 |
| TL | 10.059 | 9.194 | 10.037 | 10.101 | 12.820 | 11.359 | 12.021 | 14.145 |
| ALT | 6.858 | 6.729 | 6.389 | 6.706 | 8.817 | 7.603 | 8.442 | 9.881 |
| AAG | 3.200 | 2.465 | 3.648 | 3.394 | 4.003 | 3.756 | 3.579 | 4.265 |
| TTL | 11.754 | 11.157 | 11.675 | 12.183 | 14.420 | 13.161 | 13.784 | 16.549 |
| BFL | 1.695 | 1.963 | 1.638 | 2.083 | 1.600 | 1.802 | 1.763 | 2.404 |
| TL/(G2+G3+G4) | 6.410 | 7.854 | 6.410 | 6.410 | 6.410 | 6.509 | 6.410 | 6.410 |
| ALT/(G3+T2+T4) | 3.216 | 4.062 | 3.185 | 3.035 | 2.685 | 2.999 | 3.730 | 2.795 |
| TL/(G3+T2) | 10.090 | 9.671 | 7.687 | 10.090 | 10.090 | 8.970 | 8.148 | 6.649 |
| ALT/(G3+G1) | 3.961 | 4.356 | 2.424 | 3.483 | 3.546 | 2.950 | 3.451 | 4.560 |
| AAG/(G3+G2) | 2.040 | 2.106 | 2.330 | 2.154 | 2.001 | 2.152 | 1.908 | 1.933 |
| G1/T1 | 1.255 | 0.710 | 1.399 | 1.399 | 1.399 | 1.399 | 1.310 | 1.400 |
| TTL/T3 | 7.790 | 6.601 | 7.790 | 7.547 | 5.377 | 5.292 | 3.700 | 7.790 |
| TTL/G2 | 8.000 | 12.128 | 11.530 | 8.294 | 9.512 | 11.164 | 12.173 | 7.889 |
| TTL/AAG | 3.673 | 4.527 | 3.200 | 3.589 | 3.602 | 3.504 | 3.852 | 3.881 |
| T5/G2 | 1.373 | 1.968 | 1.925 | 1.150 | 1.256 | 1.450 | 1.675 | 1.363 |
| T5/T3 | 1.337 | 1.071 | 1.300 | 1.046 | 0.710 | 0.687 | 0.509 | 1.346 |
| T5/G1 | 1.237 | 1.399 | 0.936 | 0.929 | 0.951 | 0.850 | 1.114 | 1.390 |
| T5/BFL | 1.190 | 0.922 | 1.190 | 0.811 | 1.190 | 0.949 | 1.076 | 1.190 |
| BFL/(G3+G2) | 1.080 | 1.677 | 1.046 | 1.322 | 0.800 | 1.032 | 0.940 | 1.089 |
| T5/T2 | 2.249 | 2.586 | 2.590 | 1.889 | 2.420 | 2.442 | 2.590 | 1.417 |
| ALT/(G3+T4) | 5.551 | 7.035 | 5.098 | 5.099 | 3.531 | 4.143 | 5.514 | 6.517 |
| T5/T1 | 1.552 | 0.993 | 1.309 | 1.299 | 1.330 | 1.189 | 1.459 | 1.946 |
| T3/G2 | 1.027 | 1.837 | 1.480 | 1.099 | 1.769 | 2.110 | 3.290 | 1.013 |
| BFL/T3 | 1.123 | 1.162 | 1.093 | 1.290 | 0.597 | 0.724 | 0.473 | 1.131 |

FIG. 70B

MOBILE DEVICE AND OPTICAL IMAGING LENS THEREOF

CROSS-REFERENCE TO RELATED APPLICATIONS

This application claims priority to P.R.C. Patent Application No. 2016105525306, titled "Mobile device and optical imaging lens thereof", filed Jul. 14, 2016, with the State Intellectual Property Office of the People's Republic of China (SIPO).

TECHNICAL FIELD

The present disclosure relates to a mobile device and an optical imaging lens thereof, and particularly, relates to a mobile device applying an optical imaging lens having five lens elements and an optical imaging lens thereof.

BACKGROUND

The ever-increasing demand for smaller sized mobile devices, such as cell phones, digital cameras, tablet computers, personal digital assistants (PDAs), etc. has triggered a growing need for smaller sized photography modules, comprising elements such as an optical imaging lens, a module housing unit, and an image sensor, etc., contained therein. Size reductions may be achieved from various aspects of the mobile devices, which may include not only the charge coupled device (CCD) and the complementary metal-oxide semiconductor (CMOS), but also the optical imaging lens mounted therein. When reducing the size of the optical imaging lens, however, achieving good optical characteristics may become a challenging problem. Furthermore, high view angle and improved aperture size are important for applying a photography module in vehicles.

In light of the above issues, when designing an optical imaging lens with a shorter length, reducing the size of each element therein proportionally is not a simple task. Additional factors, such as material nature, production difficulty, assembly yield, and so forth are crucial to the application of the design. Accordingly, there is a need for providing optical imaging lenses having five lens elements, which also feature reduced length as well as good optical characteristics.

SUMMARY

The present disclosure provides for mobile devices and optical imaging lenses thereof. By controlling the convex or concave shape of the surfaces and at least one inequality, the length of the optical imaging lens may be shortened while providing good optical characteristics and sustaining system functionality.

In an example embodiment, an optical imaging lens may comprise, sequentially from an object side to an image side along an optical axis, first, second, third, fourth and fifth lens elements, each of the first, second, third, fourth and fifth lens elements having refracting power, an object-side surface facing toward the object side and an image-side surface facing toward the image side and a central thickness defined along the optical axis.

In the specification, parameters used here are: the central thickness of the first lens element, represented by T1, an air gap between the first lens element and the second lens element along the optical axis, represented by G1, the distance between the aperture stop and the object-side surface of the next lens element along the optical axis, represented by TA, the central thickness of the second lens element, represented by T2, an air gap between the second lens element and the third lens element along the optical axis, represented by G2, the central thickness of the third lens element, represented by T3, an air gap between the third lens element and the fourth lens element along the optical axis, represented by G3, the central thickness of the fourth lens element, represented by T4, an air gap between the fourth lens element and the fifth lens element along the optical axis, represented by G4, the central thickness of the fifth lens element, represented by T5, a distance between the image-side surface of the fifth lens element and the object-side surface of a filtering unit along the optical axis, represented by G5, the central thickness of the filtering unit along the optical axis, represented by TF, a distance between the image-side surface of the filtering unit and an image plane along the optical axis, represented by GFP, a focusing length of the first lens element, represented by f1, a focusing length of the second lens element, represented by f2, a focusing length of the third lens element, represented by f3, a focusing length of the fourth lens element, represented by f4, a focusing length of the fifth lens element, represented by f5, the refracting power of the first lens element, represented by n1, the refracting power of the second lens element, represented by n2, the refracting power of the third lens element, represented by n3, the refracting power of the fourth lens element, represented by n4, the refracting power of the fifth lens element, represented by n5, the refracting power of the filtering unit, represented by nf, an abbe number of the first lens element, represented by v1, an abbe number of the second lens element, represented by v2, an abbe number of the third lens element, represented by v3, an abbe number of the fourth lens element, represented by v4, an abbe number of the fifth lens element, represented by v5, an effective focal length of the optical imaging lens, represented by EFL, a distance between the object-side surface of the first lens element and an image-side surface of the fifth lens element along the optical axis, represented by TL, a distance between the object-side surface of the first lens element and an image plane along the optical axis, represented by TTL, a sum of the central thicknesses of all five lens elements, i.e. a sum of T1, T2, T3, T4 and T5, represented by ALT, a sum of all four air gaps from the first lens element to the fifth lens element along the optical axis, i.e. a sum of G1, G2, G3 and G4, represented by AAG, and a back focal length of the optical imaging lens, which is defined as the distance from the image-side surface of the fifth lens element to the image plane along the optical axis, i.e. a sum of G5, TF and GFP, and represented by BFL.

In an aspect of the present disclosure, in the optical imaging lens, the image-side surface of the first lens element comprises a concave portion in a vicinity of the optical axis, the image-side surface of the second lens element comprises a concave portion in a vicinity of a periphery of the second lens element, the object-side surface of the third lens element comprises a concave portion in a vicinity of the optical axis, the object-side surface of the fourth lens element comprises a convex portion in a vicinity of a periphery of the fourth lens element, and the image-side surface of the fourth lens element comprises a concave portion in a vicinity of the periphery of the fourth lens element, the fifth lens element is constructed by plastic material, the optical imaging lens may comprise no other lenses having refracting power beyond the five lens elements, and TL, G2, G3 and G4 satisfy the inequality:

$$6.4 \leq TL/(G2+G3+G4) \qquad \text{Inequality (1).}$$

In other example embodiment(s), other inequality(s), such as those relating to the ratio among various additional parameters, could be taken into consideration. For example:

$$ALT/(G3+T2+T4) \leq 4.2 \qquad \text{Inequality (2);}$$

$$TL/(G3+T2) \leq 10.1 \qquad \text{Inequality (3);}$$

$$ALT/(G3+G1) \leq 5.7 \qquad \text{Inequality (4);}$$

$$AAG/(G3+G2) \leq 2.7 \qquad \text{Inequality (5);}$$

$$G1/T1 \leq 1.4 \qquad \text{Inequality (6);}$$

$$TTL/T3 \leq 7.8 \qquad \text{Inequality (7);}$$

$$TTL/G2 \leq 13 \qquad \text{Inequality (8);}$$

$$TTL/AAG \leq 4.7 \qquad \text{Inequality (9);}$$

$$T5/G2 \leq 4.1 \qquad \text{Inequality (10);}$$

$$T5/T3 \leq 1.4 \qquad \text{Inequality (11);}$$

$$T5/G1 \leq 1.4 \qquad \text{Inequality (12);}$$

$$T5/BFL \leq 1.2 \qquad \text{Inequality (13);}$$

$$BFL/(G3+G2) \leq 2 \qquad \text{Inequality (14);}$$

$$T5/T2 \leq 2.6 \qquad \text{Inequality (15);}$$

$$ALT/(G3+T4) \leq 8.8 \qquad \text{Inequality (16);}$$

$$T5/T1 \leq 2.2 \qquad \text{Inequality (17);}$$

$$T3/G2 \leq 3.3 \qquad \text{Inequality (18); and/or}$$

$$BFL/T3 \leq 1.3 \qquad \text{Inequality (19).}$$

The above example embodiments are not limited and could be selectively incorporated in other embodiments described herein.

In another example embodiment, a mobile device comprising a housing and a photography module positioned in the housing is provided. The photography module may comprise any of described example embodiments of optical imaging lens, a lens barrel, a module housing unit, and an image sensor. The lens barrel may be for positioning the optical imaging lens, the module housing unit may be for positioning the lens barrel and the image sensor may be positioned at the image side of the optical imaging lens.

Through controlling the convex or concave shape of the surfaces and at lease one inequality, among other parameters, the mobile device and the optical imaging lens thereof in example embodiments achieves good optical characteristics and effectively shortens the length of the optical imaging lens.

BRIEF DESCRIPTION OF THE DRAWINGS

Example embodiments will be more readily understood from the following detailed description when read in conjunction with the appended drawings, in which:

FIG. 8 is a table of optical data for each lens element of a first embodiment of an optical imaging lens according to the present disclosure;

FIG. 9 is a table of aspherical data of a first embodiment of the optical imaging lens according to the present disclosure;

FIG. 12 is a table of optical data for each lens element of the optical imaging lens of a second embodiment of the present disclosure;

FIG. 13 is a table of aspherical data of a second embodiment of the optical imaging lens according to the present disclosure;

FIG. 16 is a table of optical data for each lens element of the optical imaging lens of a third embodiment of the present disclosure;

FIG. 17 is a table of aspherical data of a third embodiment of the optical imaging lens according to the present disclosure;

FIG. 20 is a table of optical data for each lens element of the optical imaging lens of a fourth embodiment of the present disclosure;

FIG. 21 is a table of aspherical data of a fourth embodiment of the optical imaging lens according to the present disclosure;

FIG. 24 is a table of optical data for each lens element of the optical imaging lens of a fifth embodiment of the present disclosure;

FIG. 25 is a table of aspherical data of a fifth embodiment of the optical imaging lens according to the present disclosure;

FIG. 28 is a table of optical data for each lens element of the optical imaging lens of a sixth embodiment of the present disclosure;

FIG. 29 is a table of aspherical data of a sixth embodiment of the optical imaging lens according to the present disclosure;

FIG. 32 is a table of optical data for each lens element of a seventh embodiment of an optical imaging lens according to the present disclosure;

FIG. 33 is a table of aspherical data of a seventh embodiment of the optical imaging lens according to the present disclosure;

FIG. 36 is a table of optical data for each lens element of the optical imaging lens of an eighth embodiment of the present disclosure;

FIG. 37 is a table of aspherical data of an eighth embodiment of the optical imaging lens according to the present disclosure;

FIG. 40 is a table of optical data for each lens element of a ninth embodiment of an optical imaging lens according to the present disclosure;

FIG. 41 is a table of aspherical data of a ninth embodiment of the optical imaging lens according to the present disclosure;

FIG. 44 is a table of optical data for each lens element of the optical imaging lens of a tenth embodiment of the present disclosure;

FIG. 45 is a table of aspherical data of a tenth embodiment of the optical imaging lens according to the present disclosure;

FIG. 48 is a table of optical data for each lens element of the optical imaging lens of an eleventh embodiment of the present disclosure;

FIG. 49 is a table of aspherical data of an eleventh embodiment of the optical imaging lens according to the present disclosure;

FIG. 52 is a table of optical data for each lens element of the optical imaging lens of a twelfth embodiment of the present disclosure;

FIG. 53 is a table of aspherical data of a twelfth embodiment of the optical imaging lens according to the present disclosure;

FIG. 56 is a table of optical data for each lens element of the optical imaging lens of a thirteenth embodiment of the present disclosure;

FIG. 57 is a table of aspherical data of a thirteenth embodiment of the optical imaging lens according to the present disclosure;

FIG. 60 is a table of optical data for each lens element of the optical imaging lens of a fourteenth embodiment of the present disclosure;

FIG. 61 is a table of aspherical data of a fourteenth embodiment of the optical imaging lens according to the present disclosure;

FIG. 64 is a table of optical data for each lens element of a fifteenth embodiment of an optical imaging lens according to the present disclosure;

FIG. 65 is a table of aspherical data of a fifteenth embodiment of the optical imaging lens according to the present disclosure;

FIG. 68 is a table of optical data for each lens element of the optical imaging lens of a sixteenth embodiment of the present disclosure;

FIG. 69 is a table of aspherical data of a sixteenth embodiment of the optical imaging lens according to the present disclosure;

FIG. 70A is a table for the values of T1, G1, T2, G2, T3, G3, T4, G4, T5, G5, TF, GFP, TL, ALT, AAG, TTL, BFL, TL/(G2+G3+G4), ALT/(G3+T2+T4), TL/(G3+T2), ALT/(G3+G1), AAG/(G3+G2), G1/T1, TTL/T3, TTL/G2, TTL/AAG, T5/G2, T5/T3, T5/G1, T5/BFL, BFL/(G3+G2), T5/T2, ALT/(G3+T4), T5/T1, T3/G2 and BFL/T3 of the first to eighth example embodiments;

FIG. 70B is a table for the values of T1, G1, T2, G2, T3, G3, T4, G4, T5, G5, TF, GFP, TL, ALT, AAG, TTL, BFL, TL/(G2+G3+G4), ALT/(G3+T2+T4), TL/(G3+T2), ALT/(G3+G1), AAG/(G3+G2), G1/T1, TTL/T3, TTL/G2, TTL/AAG, T5/G2, T5/T3, T5/G1, T5/BFL, BFL/(G3+G2), T5/T2, ALT/(G3+T4), T5/T1, T3/G2 and BFL/T3 of the ninth to sixteenth example embodiments;

DETAILED DESCRIPTION

Figures 1, 2:
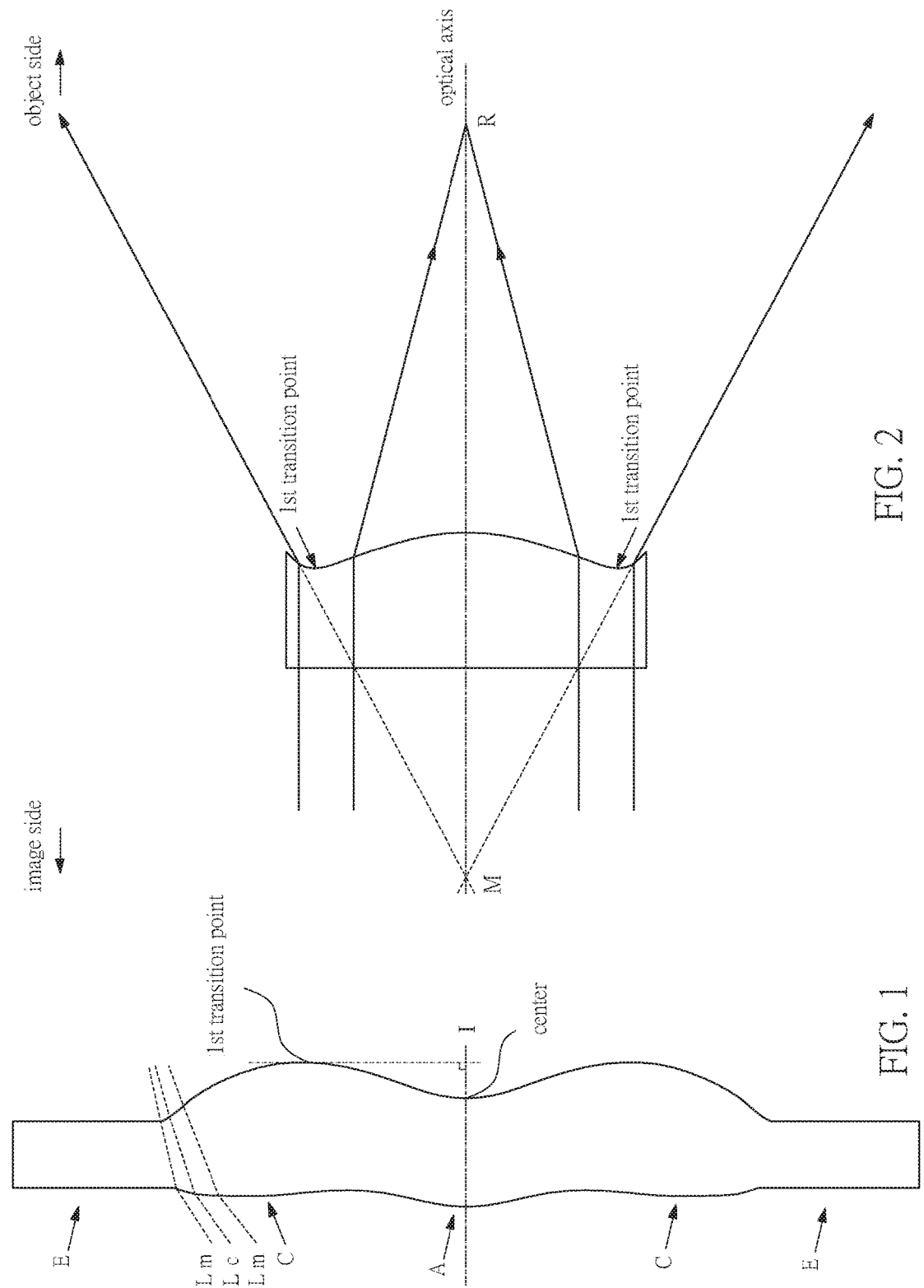
FIG. 1 is a cross-sectional view of one single lens element according to the present disclosure.
FIG. 2 is a cross-sectional view showing the relation between the shape of a portion and the position where a collimated ray meets the optical axis.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

In the present disclosure, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present disclosure. These criteria mainly determine the boundaries of portions under various circumstances including the portion in a vicinity of the optical axis, the portion in a vicinity of a periphery of a lens element surface, and other types of lens element surfaces such as those having multiple portions.

FIG. 1 depicts a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there may be other portions existing between the portion in a vicinity of the optical axis and the portion in a vicinity of a periphery of the lens element; the numbers of portions may depend on the numbers of the transition point(s). In addition, the radius of the clear aperture (or a so-called effective radius) of a surface may be defined as the radial distance from the optical axis I to a point of intersection of the marginal ray Lm and the surface of the lens element.

Referring to FIG. 2, determining whether the shape of a portion may be convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion may be determined by whether the ray or its extension line meets (intersects) the optical axis (focal point) at the object-side or image-side.

For instance, if the ray itself intersects the optical axis at the image side of the lens element after passing through a portion, i.e. the focal point of this ray is at the image side (see point R in FIG. 2), the portion may be determined as having a convex shape. In contrast, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point may have a convex shape, the portion located radially outside of the first transition point may have a concave shape, and the first transition point is the point where the portion having a convex shape changes to the portion having a concave shape, namely the border of two adjacent portions. Alternatively, there may be another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Figure 3:
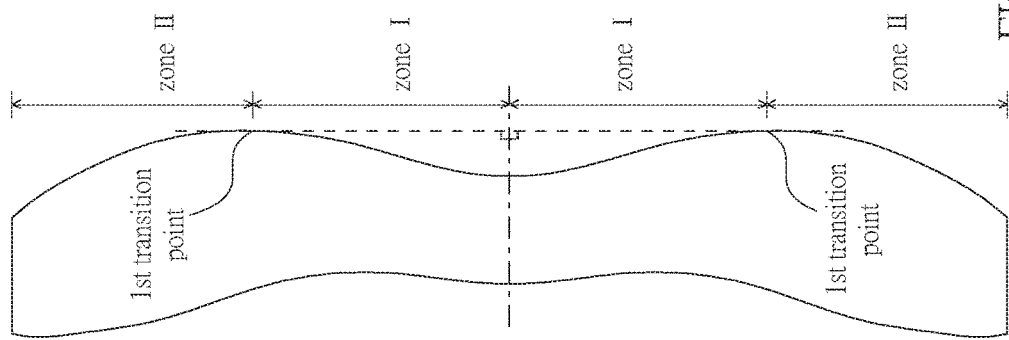
FIG. 3 is a cross-sectional view showing the relation between the shape of a portion and the effective radius of a first example.

Referring to the first example depicted in FIG. 3, only one transition point, namely a first transition point, may appear within the clear aperture of the image-side surface of the lens element. Portion I may be a portion in a vicinity of the optical axis, and portion II may be a portion in a vicinity of a periphery of the lens element. The portion in a vicinity of the optical axis may be determined as having a concave surface due to the R value at the image-side surface of the lens element is positive. The shape of the portion in a vicinity of a periphery of the lens element may be different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Figure 4:
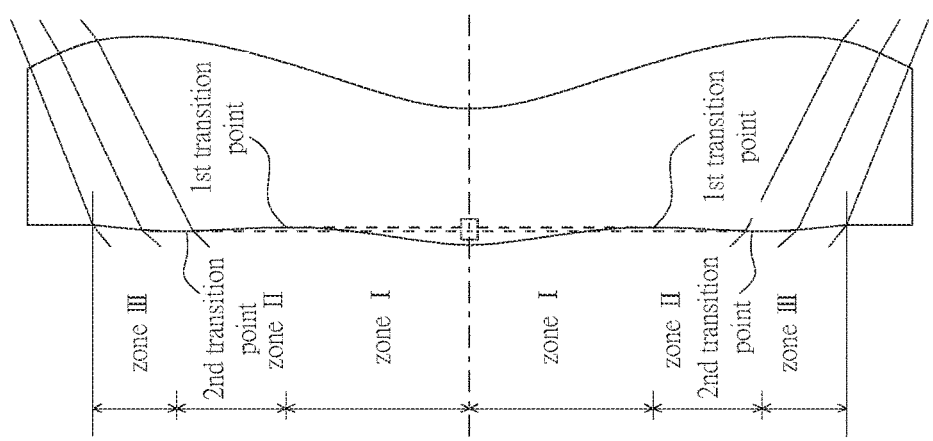
FIG. 4 is a cross-sectional view showing the relation between the shape of a portion and the effective radius of a second example.

Referring to the second example depicted in FIG. 4, a first transition point and a second transition point may exist on the object-side surface (within the clear aperture) of a lens element, in which portion I may be the portion in a vicinity of the optical axis, and portion III may be the portion in a vicinity of a periphery of the lens element. The portion in a vicinity of the optical axis may have a convex shape because the R value at the object-side surface of the lens element may be positive. The portion in a vicinity of a periphery of the lens element (portion III) may have a convex shape.

What is more, there may be another portion having a concave shape existing between the first and second transition point (portion II).

Figure 5:
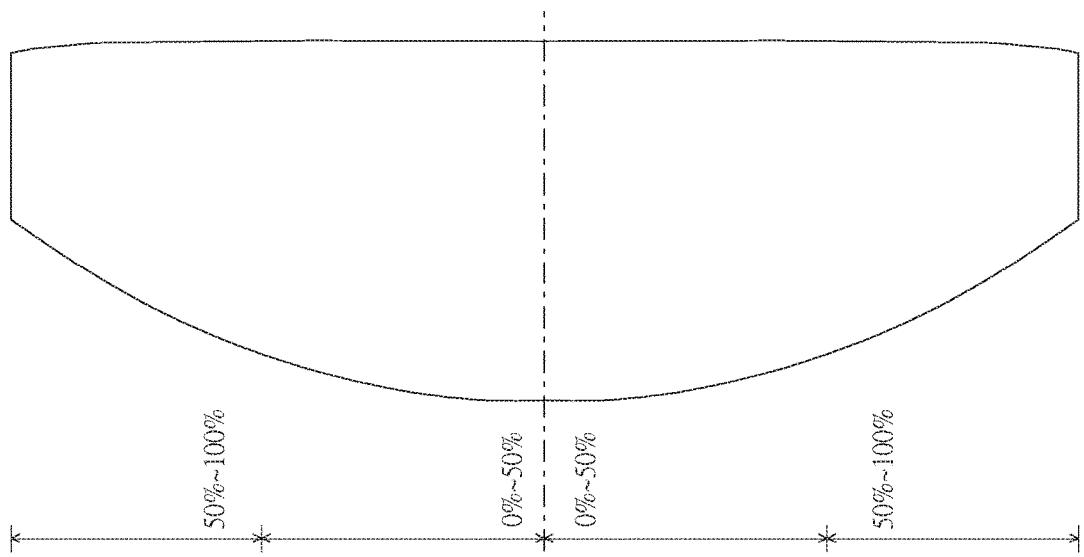
FIG. 5 is a cross-sectional view showing the relation between the shape of a portion and the effective radius of a third example.

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

The optical imaging lens of the present disclosure may be a prime lens. The optical imaging lens may comprise a first lens element, a second lens element, a third lens element, a fourth lens element and a fifth lens element. Additionally, each of the lens elements may comprise refracting power, an object-side surface facing toward an object side, an image-side surface facing toward an image side, and a central thickness defined along the optical axis. These lens elements may be arranged sequentially from the object side to the image side along an optical axis, and example embodiments of the lens may comprise no other lenses having refracting power beyond the five lens elements. In an example embodiment: the image-side surface of the first lens element may comprise a concave portion in a vicinity of the optical axis, the image-side surface of the second lens element may comprise a concave portion in a vicinity of a periphery of the second lens element, the object-side surface of the third lens element may comprise a concave portion in a vicinity of the optical axis, the object-side surface of the fourth lens element may comprise a convex portion in a vicinity of a periphery of the fourth lens element, and the image-side surface of the fourth lens element may comprise a concave portion in a vicinity of the periphery of the fourth lens element, the fifth lens element is constructed by plastic material, and the optical imaging lens may comprise no other lenses having refracting power beyond the five lens elements.

The lens elements may be designed in light of the optical characteristics and the length of the optical imaging lens. For example, the concave portion in a vicinity of the optical axis formed on the image-side surface of the first lens element may assist in collecting light with great incident angle, and the concave portion in a vicinity of a periphery of the second lens element formed on the image-side surface thereof may assist in adjusting abberations for the whole and partial image. Together with the concave portion in a vicinity of the optical axis formed on the object-side surface of the third lens element, the convex portion in a vicinity of a periphery of the fourth lens element formed on the object-side surface thereof and the concave portion in a vicinity of the periphery of the fourth lens element formed on the image-side surface thereof, the quality of the image may be promoted effectively. Through applying parts or all of each of the aforesaid designs in various implementations, the length of the optical imaging lens may be reduced while enhancing aspects of the imaging quality, such as clarity of the image.

Additionally, values of parameters may be controlled to assist in designing optical imaging lenses with good optical characters and a short length. To shorten the length of the optical imaging lens, the thickness of the lens elements and/or the air gaps between the lens elements may be used for shorter distances; however, considering both the difficulty to assemble the optical imaging lens and imaging quality, the optical imaging lens may be better configured if it satisfies: 6.4≤TL/(G2+G3+G4), and the value of TL/(G2+G3+G4) may be within about 6.4~10.1; ALT/(G3+T2+T4) ≤4.2, and the value of ALT/(G3+T2+T4) may be within 0.8~4.2; TL/(G3+T2)≤10.1, and the value of TL/(G3+T2) may be within about 2.9~10.1; ALT/(G3+G1)≤5.7, and the value of ALT/(G3+G1) may be within about 0.6~5.7; AAG/(G3+G2)≤2.7, and the value of AAG/(G3+G2) may be within about 1.1~2.7; G1/T1≤1.4, and the value of G1/T1 may be within about 0.08~1.4; BFL/(G3+G2)≤2, and the value of BFL/(G3+G2) may be within about 0.4~2; ALT/(G3+T4)≤8.8, and the value of ALT/(G3+T4) may be within about 1~8.8.

Controlling the parameters following this manner may assist in keeping the ratio of the effective focal length to the length of the optical imaging lens proper, i.e. avoiding an excessively small value unfavorable to forming a clear image for an object far away from the optical imaging lens, or an excessively large value resulting in a lengthy optical imaging lens. The optical imaging lens may be better configured if it satisfies: TTL/T3≤7.8, and the value of TTL/T3 may be within about 2.8~7.8; TTL/G2≤13, and the value of TTL/G2 may be within about 5.4~13; TTL/AAG≤4.7, and the value of TTL/AAG may be within about 1.7~4.7.

Controlling the parameters which limit relations between the thickness of the fifth lens element and the thicknesses of other lens elements or air gaps in the following manner may assist in controlling the thickness of the fifth lens element to avoid from an excessive small or large value and reduce aberration which occurs between the first to fourth lens elements. The optical imaging lens may be better configured if it satisfies: T5/G2≤4.1, and the value of T5/G2 may be within about 0.2~4.1; T5/T3≤1.4, and the value of T5/T3 may be within about 0.5~1.4; T5/G1≤1.4, and the value of T5/G1 may be within about 0.1~1.4; T5/BFL≤1.2, and the value of T5/BFL may be within about 0.1~1.2; T5/T2≤2.6, and the value of T5/T2 may be within about 0.1~2.6; T5/T1≤2.2, and the value of T5/T1 may be within about 0.1~2.2.

Controlling the parameters which limit relations between the thickness of the third lens element and the thickness of other lens element or air gap in the following manner may assist in controlling the thickness of the third lens element to avoid an excessively small or large value and reduce aberration which occurs between the first to second lens elements. The optical imaging lens may be better configured if it satisfies: T3/G2≤3.3, and the value of T3/G2 may be within about 0.3~3.3; BFL/T3≤1.3, and the value of BFL/T3 may be within about 0.4~1.3.

In light of the unpredictability in an optical system, in the present disclosure, satisfying the inequalities listed above may advantageously shorten the length of the optical imaging lens, lower the f-number, enlarge the shot angle, promote the imaging quality and/or increase the yield in the assembly process.

When implementing example embodiments, more details about the convex or concave surface could be incorporated for one specific lens element or broadly for plural lens elements to enhance the control for the system performance and/or resolution, or promote the yield. It is noted that the details listed here could be incorporated in example embodiments if no inconsistency occurs.

Figure 6:
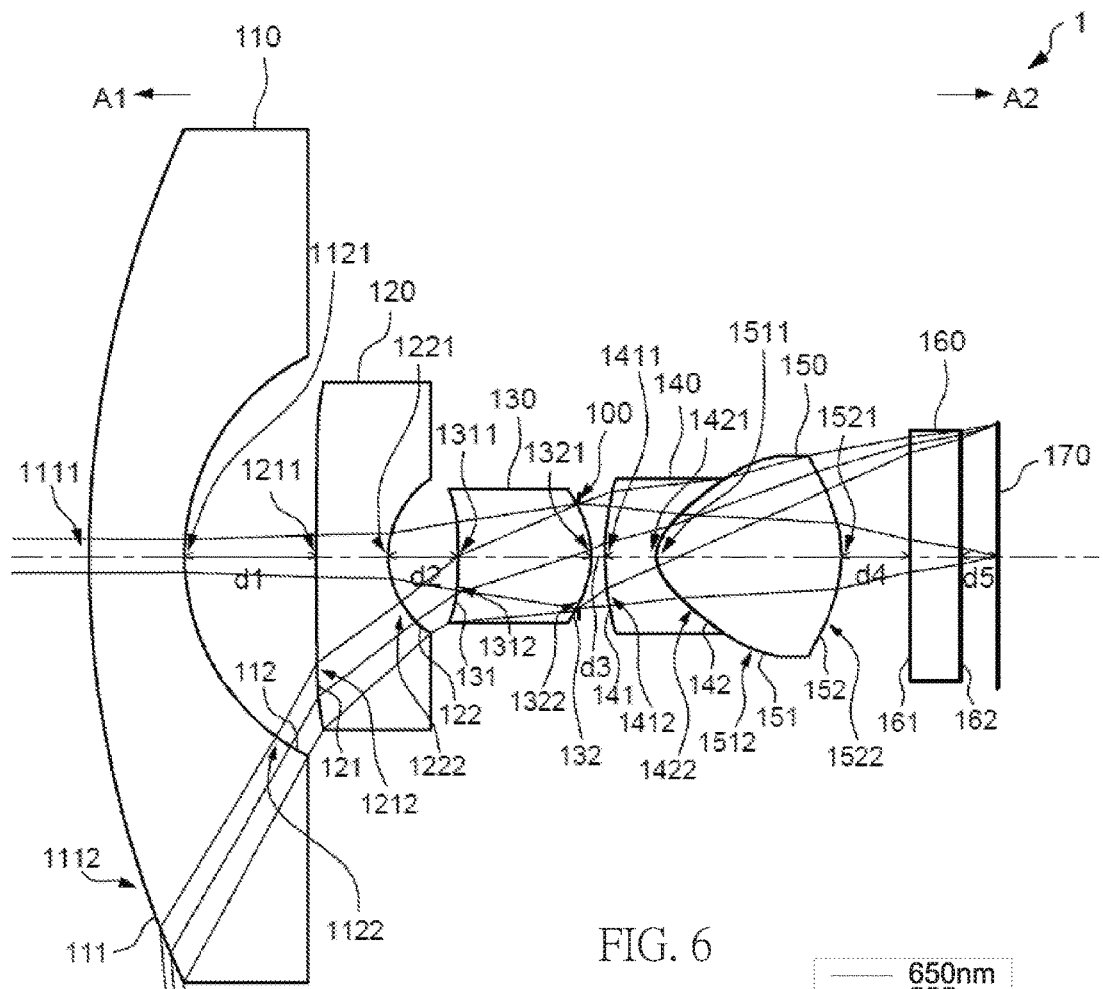
FIG. 6 is a cross-sectional view of a first embodiment of an optical imaging lens having five lens elements according to the present disclosure.
Figure 7:
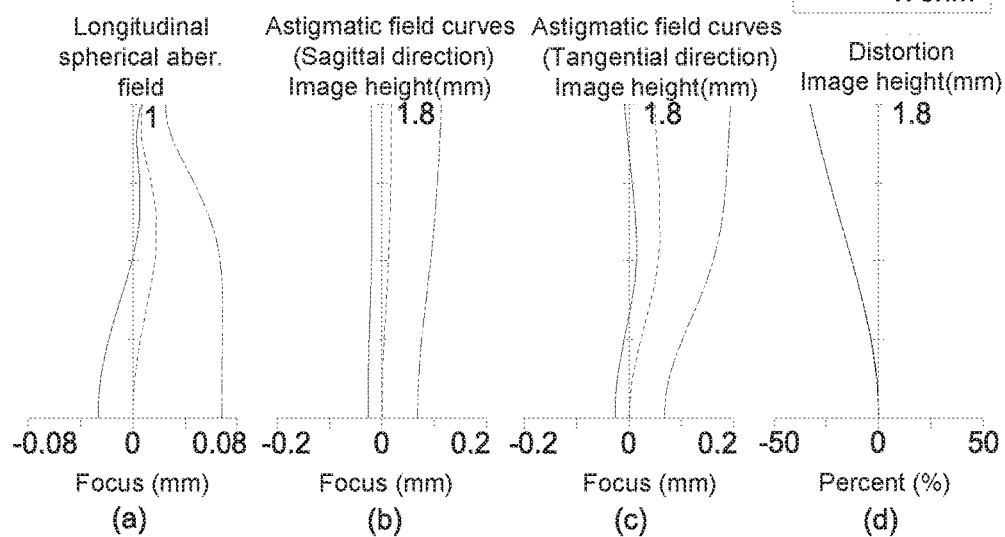
FIG. 7 is a chart of longitudinal spherical aberration and other kinds of optical aberrations of a first embodiment of the optical imaging lens according to the present disclosure.

Several example embodiments and associated optical data will now be provided for illustrating example embodiments of optical imaging lenses with good optical characteristics, a wide view angle and a low f-number. Reference is now made to FIGS. 6-9. FIG. 6 illustrates an example cross-sectional view of an optical imaging lens 1 having five lens elements of the optical imaging lens according to a first example embodiment. FIG. 7 shows example charts of longitudinal spherical aberration and other kinds of optical aberrations of the optical imaging lens 1 according to an example embodiment. FIG. 8 illustrates an example table of optical data of each lens element of the optical imaging lens 1 according to an example embodiment, in which f is used for representing EFL. FIG. 9 depicts an example table of aspherical data of the optical imaging lens 1 according to an example embodiment.

As shown in FIG. 6, the optical imaging lens 1 of the present embodiment may comprise, in order from an object side A1 to an image side A2 along an optical axis, a first lens element 110, a second lens element 120, a third lens element 130, an aperture stop 100, a fourth lens element 140 and a fifth lens element 150. A filtering unit 160 and an image plane 170 of an image sensor are positioned at the image side A2 of the optical lens 1. Each of the first, second, third, fourth, fifth lens elements 110, 120, 130, 140, 150 and the filtering unit 160 may comprise an object-side surface 111/121/131/141/151/161 facing toward the object side A1 and an image-side surface 112/122/132/142/152/162 facing toward the image side A2. The example embodiment of the filtering unit 160 illustrated may be an IR cut filter (infrared cut filter) positioned between the fifth lens element 150 and an image plane 170. The filtering unit 160 selectively absorbs light with specific wavelength from the light passing optical imaging lens 1. For example, IR light may be absorbed, and this may prohibit the IR light which is not seen by human eyes from producing an image on the image plane 170.

Please note that during the normal operation of the optical imaging lens 1, the distance between any two adjacent lens elements of the first, second, third, fourth and fifth lens elements 110, 120, 130, 140, 150 is a unchanged value, i.e. the optical imaging lens 1 is a prime lens.

Example embodiments of each lens element of the optical imaging lens 1 which may be constructed by glass or plastic material will now be described with reference to the drawings.

An example embodiment of the first lens element 110, which is constructed by glass material, has negative refracting power. The object-side surface 111 may be a convex surface comprising a convex portion 1111 in a vicinity of the optical axis and a convex portion 1112 in a vicinity of a periphery of the first lens element 110. The image-side surface 112 may be a concave surface comprising a concave portion 1121 in a vicinity of the optical axis and a concave portion 1122 in a vicinity of the periphery of the first lens element 110.

An example embodiment of the second lens element 120, which is constructed by plastic material, has negative refracting power. The object-side surface 121 may be a convex surface comprising a convex portion 1211 in a vicinity of the optical axis and a convex portion 1212 in a vicinity of a periphery of the second lens element 120. The image-side surface 122 may be a concave surface comprising a concave portion 1221 in a vicinity of the optical axis and a concave portion 1222 in a vicinity of the periphery of the second lens element 120.

An example embodiment of the third lens element 130, which is constructed by plastic material, has positive refracting power. The object-side surface 131 may be a concave surface comprising a concave portion 1311 in a vicinity of the optical axis and a concave portion 1312 in a vicinity of a periphery of the third lens element 130. The image-side surface 132 may be a convex surface comprising a convex portion 1321 in a vicinity of the optical axis and a convex portion 1322 in a vicinity of the periphery of the third lens element 130.

An example embodiment of the fourth lens element 140, which is constructed by plastic material, has negative refracting power. The object-side surface 141 may be a convex surface comprising a convex portion 1411 in a vicinity of the optical axis and a convex portion 1412 in a vicinity of a periphery of the fourth lens element 140. The image-side surface 142 may be a concave surface comprising a concave portion 1421 in a vicinity of the optical axis and a concave portion 1422 in a vicinity of the periphery of the fourth lens element 140.

An example embodiment of the fifth lens element 150, which is constructed by plastic material, has positive refracting power. The object-side surface 151 may be a convex surface comprising a convex portion 1511 in a vicinity of the optical axis and a convex portion 1512 in a vicinity of a periphery of the fifth lens element 150. The image-side surface 152 may be a convex surface comprising a convex portion 1521 in a vicinity of the optical axis and a convex portion 1522 in a vicinity of the periphery of the fifth lens element 150.

In example embodiments, air gaps may exist between the first and second lens elements 110, 120, the second and third lens elements 120, 130, the third and fourth lens elements, 130, 140, the fifth lens element 150 and the filtering unit 160, and the filtering unit 160 and the image plane 170 of the image sensor. For example, FIG. 1 illustrates the air gap d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fifth lens element 150 and the filtering unit 160 and the air gap d5 existing between the filtering unit 160 and the image plane 170 of the image sensor. The profiles of opposite surfaces of the fourth lens element 140 and the fifth lens element 150 may correspond to each other, and in such situation, the air gap may not exist. The air gap d1 is denoted by G1, the air gap d2 is denoted by G2, the air gap d3 is denoted by G3, and the sum of d1, d2 and d3 is denoted by AAG. Please note, in other embodiments, any of the aforementioned air gaps may or may not exist.

FIG. 8 depicts the optical characteristics of each lens elements in the optical imaging lens 1 of the present embodiment, and please refer to FIG. 70A for the values of T1, G1, T2, G2, T3, G3, T4, G4, T5, G5, TF, GFP, TL, ALT, AAG, TTL, BFL, TL/(G2+G3+G4), ALT/(G3+T2+T4), TL/(G3+T2), ALT/(G3+G1), AAG/(G3+G2), G1/T1, TTL/T3, TTL/G2, TTL/AAG, T5/G2, T5/T3, T5/G1, T5/BFL, BFL/(G3+G2), T5/T2, ALT/(G3+T4), T5/T1, T3/G2 and BFL/T3 the present embodiment. The distance from the object-side surface 111 of the first lens element 110 to the image plane 170 along the optical axis may be about 12.419 mm, the effective focal length (EFL) may be about 1.030 mm, image height may be about 1.8 mm, half field of view angle (HFOV) may be about 64.291, and f-number (Fno) may be about 2.2. Thus, the optical imaging lens 1 may be capable of providing excellent imaging quality for smaller sized mobile devices.

The aspherical surfaces, including the object-side surface 121 and the image-side surface 122 of the second lens element 120, the object-side surface 131 and the image-side surface 132 of the third lens element 130, the object-side surface 141 and the image-side surface 142 of the fourth lens element 140, the object-side surface 151 and the image-side surface 152 of the fifth lens element 150, are all defined by the following aspherical formula:

$$Z(Y) = \frac{Y^2}{R} \bigg/ \left(1 + \sqrt{1-(1+K)\frac{Y^2}{R^2}}\right) + \sum_{i=1}^{n} a_i \times Y^i$$

wherein, Y represents the perpendicular distance between the point of the aspherical surface and the optical axis; Z represents the depth of the aspherical surface (the perpendicular distance between the point of the aspherical surface at a distance Y from the optical axis and the tangent plane of the vertex on the optical axis of the aspherical surface); R represents the radius of curvature of the surface of the lens element; K represents a conic constant; and $a_i$ represents an aspherical coefficient of $i^{th}$ level. The values of each aspherical parameter are shown in FIG. 9.

Please refer to FIG. 7(a), longitudinal spherical aberration of the optical imaging lens in the present embodiment is shown in the coordinate in which the horizontal axis represents focus and the vertical axis represents field of view, and FIG. 7(b), astigmatism aberration of the optical imaging lens in the present embodiment in the sagittal direction is shown in the coordinate in which the horizontal axis represents focus and the vertical axis represents image height, and FIG. 7(c), astigmatism aberration in the tangential direction of the optical imaging lens in the present embodiment is shown in the coordinate in which the horizontal axis represents focus and the vertical axis represents image height, and FIG. 7(d), distortion aberration of the optical imaging lens in the present embodiment is shown in the coordinate in which the horizontal axis represents percentage and the vertical axis represents image height. The curves of different wavelengths (470 nm, 555 nm, 650 nm) are closed to each other. This represents off-axis light with respect to these wavelengths is focused around an image point. From the vertical deviation of each curve shown therein, the offset of the off-axis light relative to the image point may be within about ±0.08 mm. Therefore, the present embodiment improves the longitudinal spherical aberration with respect to different wavelengths. For astigmatism aberration in the sagittal direction, the focus variation with respect to the three wavelengths in the whole field may fall within about ±0.2 mm, for astigmatism aberration in the tangential direction, the focus variation with respect to the three wavelengths in the whole field may fall within about ±0.2 mm, and the variation of the distortion aberration may be within about ±50%.

According to the value of the aberrations, it is shown that the optical imaging lens 1 of the present embodiment, with the length that may be as short as about 12.419 mm, may be capable of providing good imaging quality as well as good optical characteristics.

Figure 10:
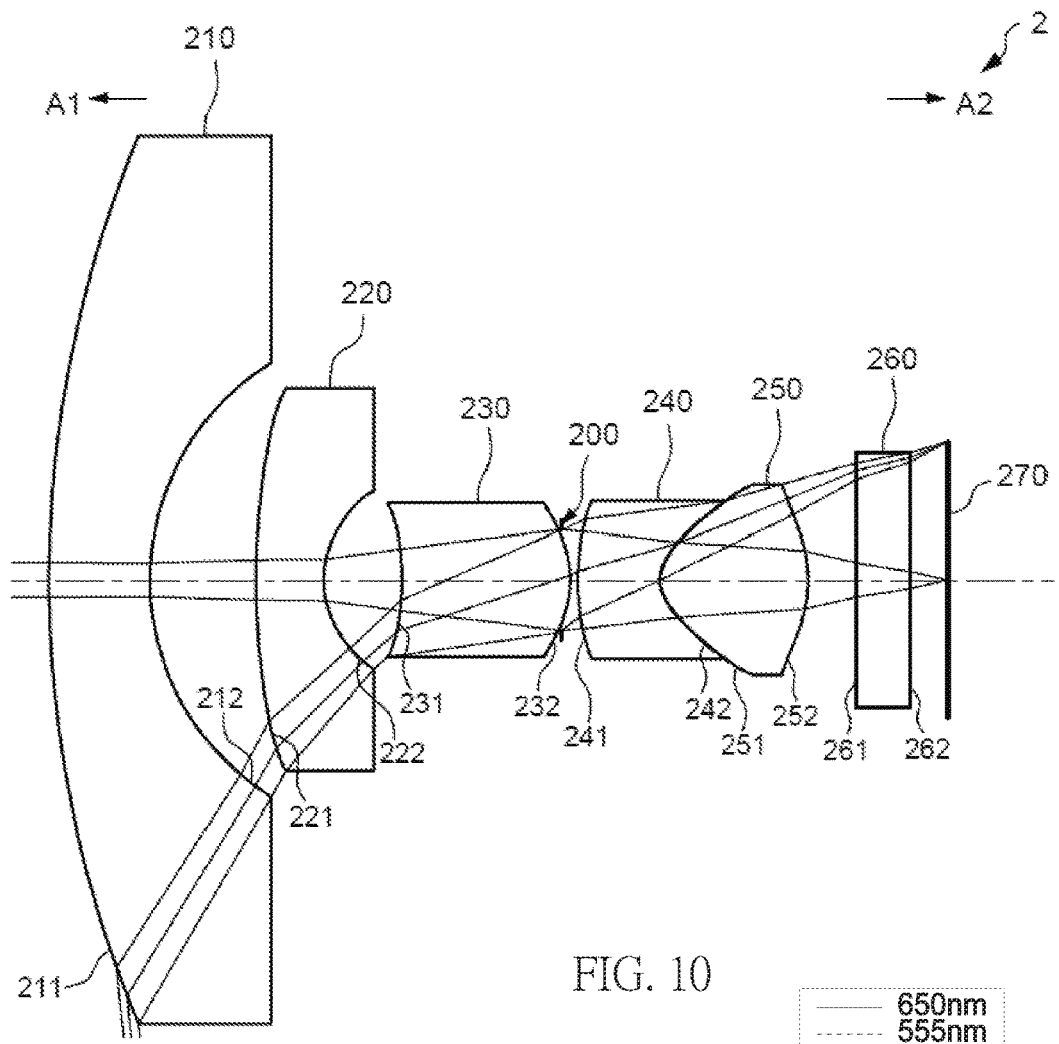
FIG. 10 is a cross-sectional view of a second embodiment of an optical imaging lens having five lens elements according to the present disclosure.
Figure 11:
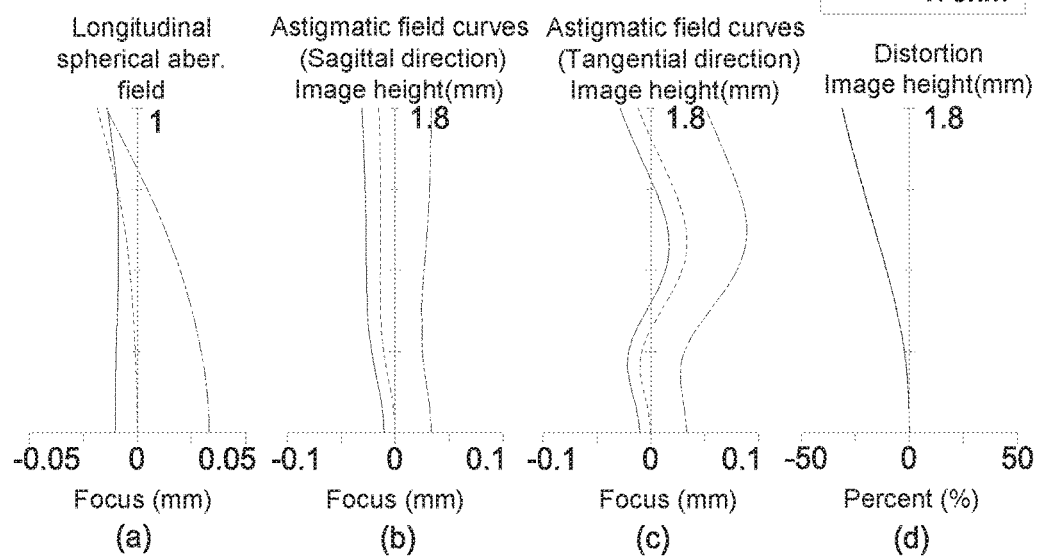
FIG. 11 is a chart of longitudinal spherical aberration and other kinds of optical aberrations of a second embodiment of the optical imaging lens according to the present disclosure.

Reference is now made to FIGS. 10-13. FIG. 10 illustrates an example cross-sectional view of an optical imaging lens 2 having five lens elements of the optical imaging lens according to a second example embodiment. FIG. 11 shows example charts of longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 10, the optical imaging lens 2 of the present embodiment, in an order from an object side A1 to an image side A2 along an optical axis, may comprise a first lens element 210, a second lens element 220, a third lens element 230, an aperture stop 200, a fourth lens element 240 and a fifth lens element 250.

The differences between the second embodiment and the first embodiment are the radius of curvature, thickness of each lens element, the distance of each air gap, aspherical data, and related optical parameters, such as back focal length, but the configuration of the concave/convex shape of surfaces, comprising the object-side surfaces 211, 221, 231, 241, 251 facing to the object side A1 and the image-side surfaces 212, 222, 232, 242, 252 facing to the image side A2, are similar to those in the first embodiment. Here and in the embodiments hereinafter, for clearly showing the drawings of the present embodiment, only the surface shapes which are different from that in the first embodiment are labeled. Please refer to FIG. 12 for the optical characteristics of each lens elements in the optical imaging lens 2 the present embodiment, and please refer to FIG. 70A for the values of T1, G1, T2, G2, T3, G3, T4, G4, T5, G5, TF, GFP, TL, ALT, AAG, TTL, BFL, TL/(G2+G3+G4), ALT/(G3+T2+T4), TL/(G3+T2), ALT/(G3+G1), AAG/(G3+G2), G1/T1, TTL/T3, TTL/G2, TTL/AAG, T5/G2, T5/T3, T5/G1, T5/BFL, BFL/(G3+G2), T5/T2, ALT/(G3+T4), T5/T1, T3/G2 and BFL/T3 of the present embodiment. The distance from the object-side surface 211 of the first lens element 210 to the image plane 270 along the optical axis may be about 11.730 mm, the image height may be about 1.8 mm, EFL may be about 1.004 mm, HFOV may be about 65.080, and Fno may be about 2.2. Compared with the first embodiment, the length of the optical imaging lens 2 may be shorter, and the HFOV may be greater.

As illustrated by the longitudinal spherical aberration shown in FIG. 11(a), the offset of the off-axis light relative to the image point may be within about ±0.05 mm. As illustrated by the astigmatism aberration in the sagittal direction shown in FIG. 11(b), the focus variation with respect to the three wavelengths in the whole field may fall within about ±0.1 mm. As illustrated by the astigmatism aberration in the tangential direction shown in FIG. 11(c), the focus variation with respect to the three wavelengths in the whole field may fall within about ±0.1 mm. As shown in FIG. 11(d), the variation of the distortion aberration may be within about ±50%.

Compared with the first embodiment, the longitudinal spherical aberration and astigmatism aberration of the optical imaging lens 2 may be less. According to the value of the aberrations, it is shown that the optical imaging lens 2 of the present embodiment, with the length that may be as short as about 11.730 mm, may be capable of providing good imaging quality as well as good optical characteristics.

Figure 14:
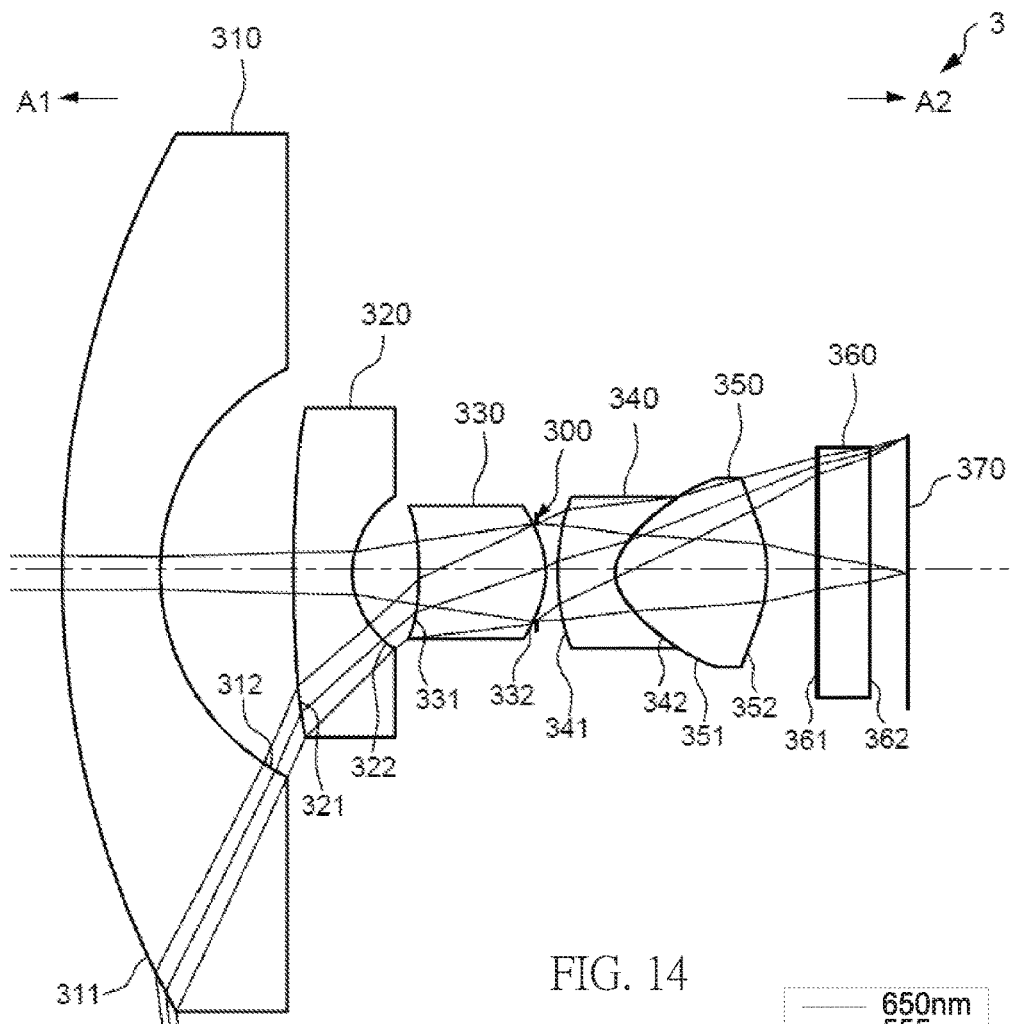
FIG. 14 is a cross-sectional view of a third embodiment of an optical imaging lens having five lens elements according to the present disclosure.
Figure 15:
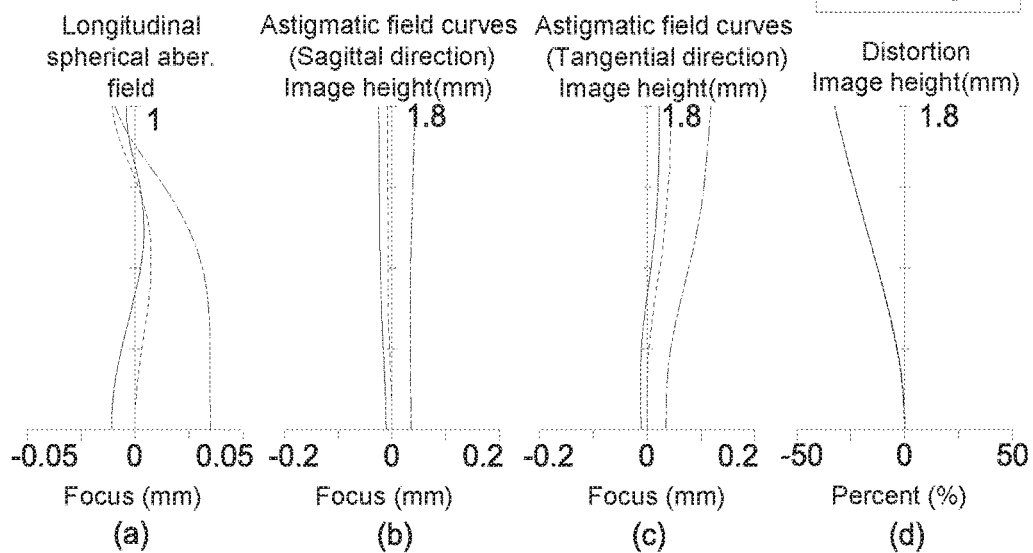
FIG. 15 is a chart of longitudinal spherical aberration and other kinds of optical aberrations of a third embodiment of the optical imaging lens according the present disclosure.

Reference is now made to FIGS. 14-17. FIG. 14 illustrates an example cross-sectional view of an optical imaging lens 3 having five lens elements of the optical imaging lens according to a third example embodiment. FIG. 15 shows example charts of longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 17 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 14, the optical imaging lens 3 of the present embodiment, in an order from an object side A1 to an image side A2 along an optical axis, may comprise a first lens element 310, a second lens element 320, a third lens element 330, an aperture stop 300, a fourth lens element 340 and a fifth lens element 350.

The differences between the third embodiment and the first embodiment are the radius of curvature and thickness of each lens element, the distance of each air gap, aspherical data, and related optical parameters, such as back focal length, but the configuration of the concave/convex shape of surfaces, comprising the object-side surfaces 311, 321, 331, 341, 351 facing to the object side A1 and the image-side surfaces 312, 322, 332, 342, 352 facing to the image side A2, are similar to those in the first embodiment. Please refer to FIG. 16 for the optical characteristics of each lens element in the optical imaging lens 3 of the present embodiment, and please refer to FIG. 70A for the values of T1, G1, T2, G2, T3, G3, T4, G4, T5, G5, TF, GFP, TL, ALT, AAG, TTL, BFL, TL/(G2+G3+G4), ALT/(G3+T2+T4), TL/(G3+T2), ALT/(G3+G1), AAG/(G3+G2), G1/T1, TTL/T3, TTL/G2, TTL/AAG, T5/G2, T5/T3, T5/G1, T5/BFL, BFL/(G3+G2), T5/T2, ALT/(G3+T4), T5/T1, T3/G2 and BFL/T3 of the present embodiment. The distance from the object-side surface 311 of the first lens element 310 to the image plane 370 along the optical axis may be about 11.172 mm, the image height may be about 1.8 mm, EFL may be about 1.001 mm, HFOV may be about 65.161, and Fno may be about 2.2. Compared with the first embodiment, the length of the optical imaging lens 2 may be shorter and the HFOV may be greater.

As illustrated by the longitudinal spherical aberration shown in FIG. 15(a), the offset of the off-axis light relative to the image point may be within about ±0.05 mm. As illustrated by the astigmatism aberration in the sagittal direction shown in FIG. 15(b), the focus variation with respect to the three wavelengths in the whole field may fall within about ±0.1 mm. As illustrated by the astigmatism aberration in the tangential direction shown in FIG. 15(c), the focus variation with respect to the three wavelengths in the whole field may fall within about ±0.2 mm. As shown in FIG. 15(d), the variation of the distortion aberration may be within about ±50%.

Compared with the first embodiment, the longitudinal spherical aberration and the astigmatism aberration in the sagittal direction of the optical imaging lens 3 may be lower. According to the value of the aberrations, it is shown that the optical imaging lens 3 of the present embodiment, with the length that may be as short as about 11.172 mm, may be capable of providing good imaging quality as well as good optical characteristics.

Figure 18:
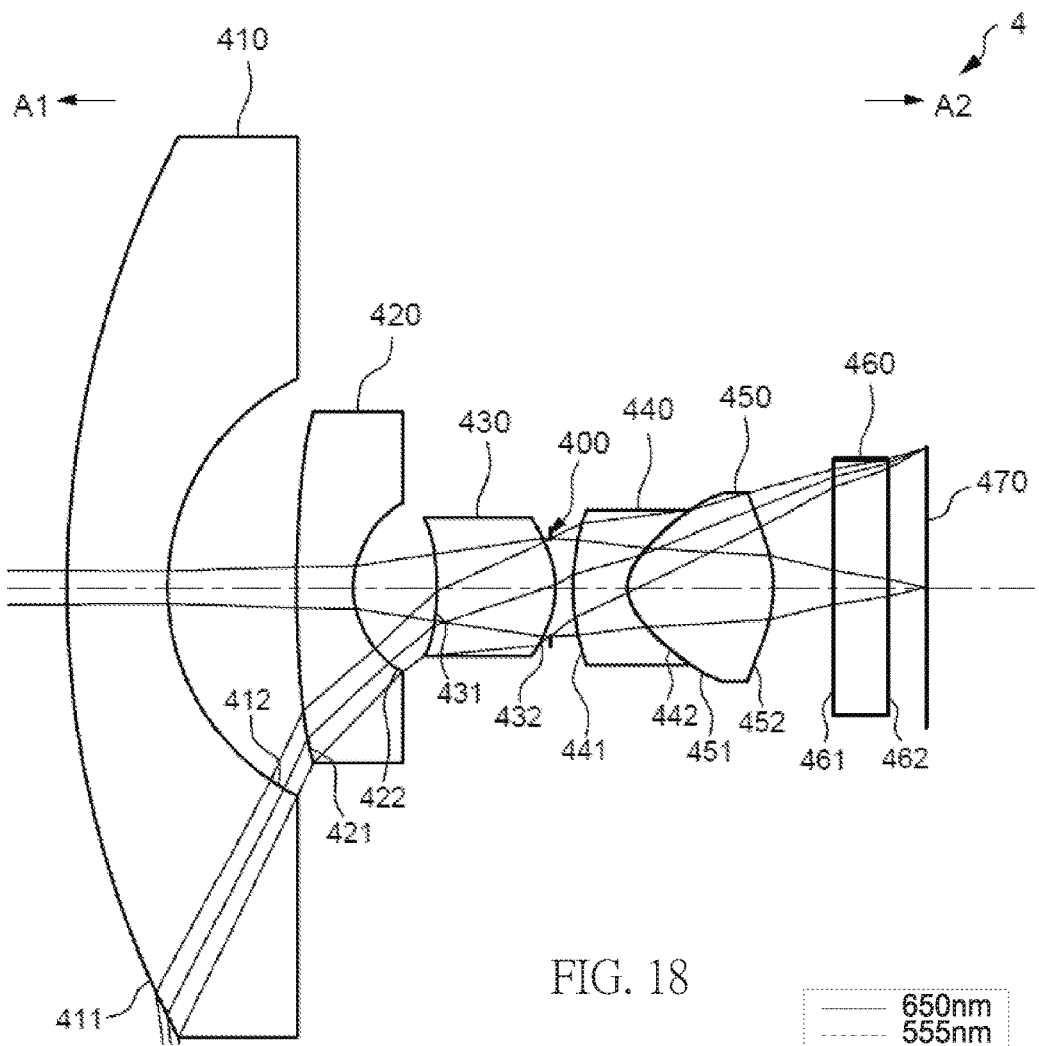
FIG. 18 is a cross-sectional view of a fourth embodiment of an optical imaging lens having five lens elements according to the present disclosure.
Figure 19:
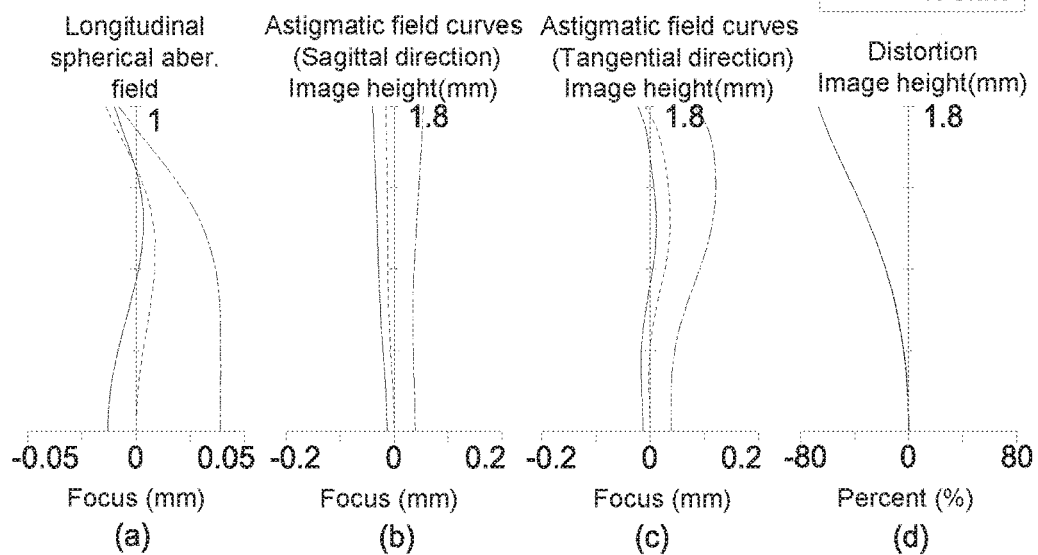
FIG. 19 is a chart of longitudinal spherical aberration and other kinds of optical aberrations of a fourth embodiment of the optical imaging lens according the present disclosure.

Reference is now made to FIGS. 18-21. FIG. 18 illustrates an example cross-sectional view of an optical imaging lens 4 having five lens elements of the optical imaging lens according to a fourth example embodiment. FIG. 19 shows example charts of longitudinal spherical aberration and other kinds of optical aberrations of the optical imaging lens 4 according to the fourth embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 18, the optical imaging lens 4 of the present embodiment, in an order from an object side A1 to an image side A2 along an optical axis, may comprise a first lens element 410, a second lens element 420, a third lens element 430, an aperture stop 400, a fourth lens element 44 and a fifth lens element 450.

The differences between the fourth embodiment and the first embodiment are the radius of curvature and thickness of each lens element, the distance of each air gap, aspherical data, and related optical parameters, such as back focal length, but the configuration of the concave/convex shape of surfaces, comprising the object-side surfaces 411, 421, 431, 441, 451 facing to the object side A1 and the image-side surfaces 412, 422, 432, 442, 452 facing to the image side A2, are similar to those in the first embodiment. Please refer to FIG. 20 for the optical characteristics of each lens elements in the optical imaging lens 4 of the present embodiment, please refer to FIG. 70A for the values of T1, G1, T2, G2, T3, G3, T4, G4, T5, G5, TF, GFP, TL, ALT, AAG, TTL, BFL, TL/(G2+G3+G4), ALT/(G3+T2+T4), TL/(G3+T2), ALT/(G3+G1), AAG/(G3+G2), G1/T1, TTL/T3, TTL/G2, TTL/AAG, T5/G2, T5/T3, T5/G1, T5/BFL, BFL/(G3+G2), T5/T2, ALT/(G3+T4), T5/T1, T3/G2 and BFL/T3 of the present embodiment. The distance from the object-side surface 411 of the first lens element 410 to the image plane 470 along the optical axis may be about 11.078 mm, the image height may be about 1.8 mm, EFL may be about 0.979 mm, HFOV may be about 97.149, and Fno may be about 2.2. Compared with the first embodiment, the length of the optical imaging lens 4 may be shorter, and the HFOV may be greater.

As illustrated by the longitudinal spherical aberration shown in FIG. 19(*a*), the offset of the off-axis light relative to the image point may be within about ±0.05 mm. As illustrated by the astigmatism aberration in the sagittal direction shown in FIG. 19(*b*), the focus variation with respect to the three wavelengths in the whole field may fall within about ±0.1 mm. As illustrated by the astigmatism aberration in the tangential direction shown in FIG. 19(*c*), the focus variation with respect to the three wavelengths in the whole field may fall within about ±0.2 mm. As shown in FIG. 19(*d*), the variation of the distortion aberration may be within about ±80%.

Compared with the first embodiment, the longitudinal spherical aberration and the astigmatism aberration in the sagittal direction of the optical imaging lens 4 may be lower. According to the value of the aberrations, it is shown that the optical imaging lens 4 of the present embodiment, with the length that may be as short as about 11.078 mm, may be capable of providing good imaging quality as well as good optical characteristics.

Figure 22:
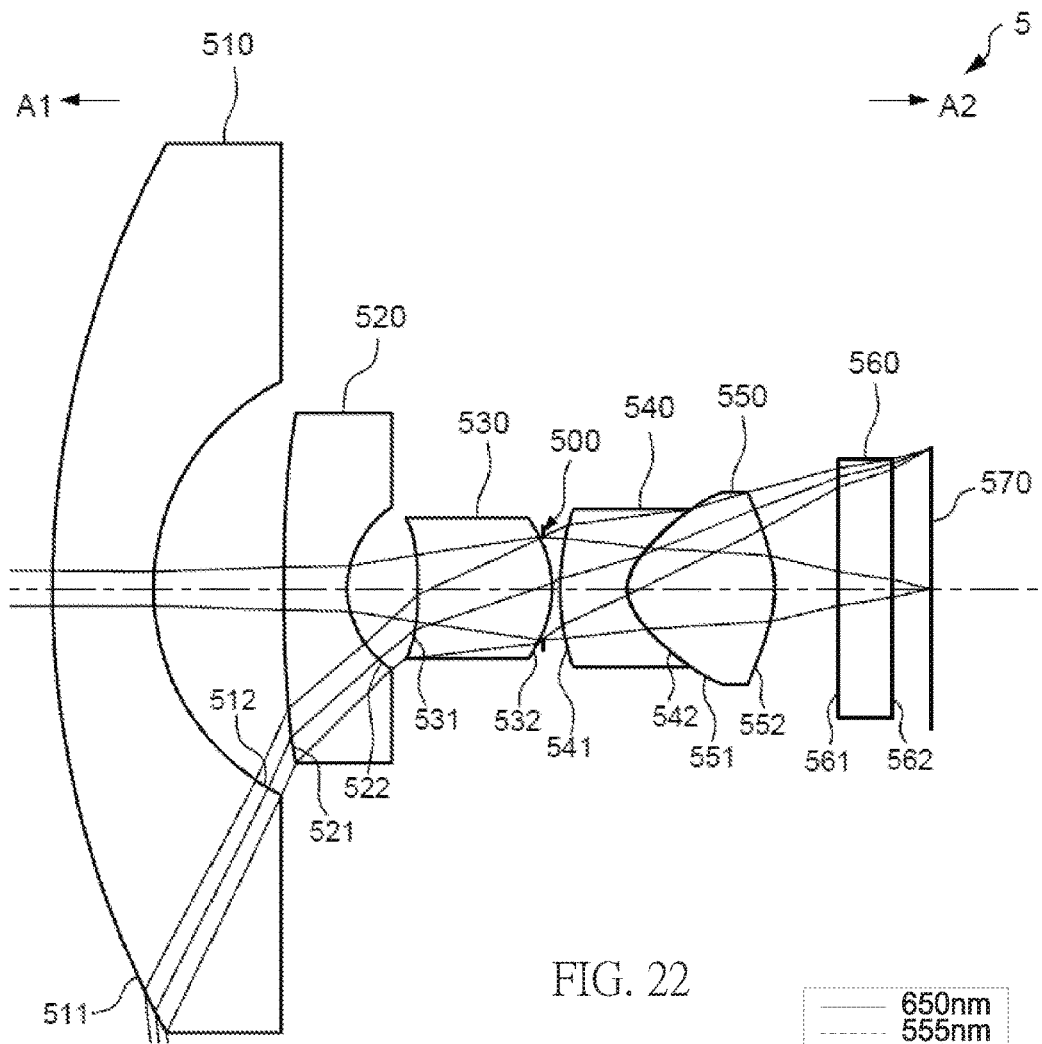
FIG. 22 is a cross-sectional view of a fifth embodiment of an optical imaging lens having five lens elements according to the present disclosure.
Figure 23:
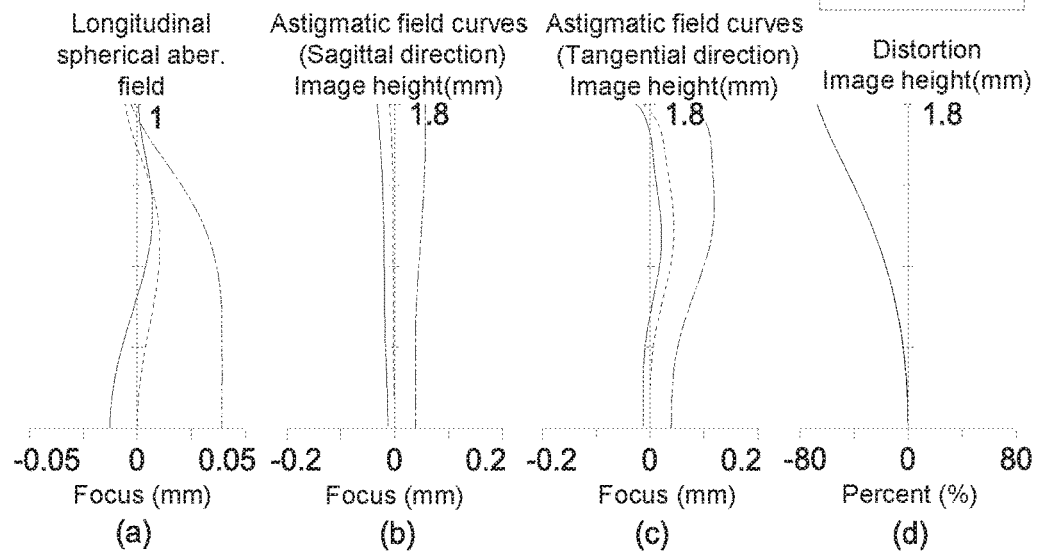
FIG. 23 is a chart of longitudinal spherical aberration and other kinds of optical aberrations of a fifth embodiment of the optical imaging lens according the present disclosure.

Reference is now made to FIGS. 22-25. FIG. 22 illustrates an example cross-sectional view of an optical imaging lens 5 having five lens elements of the optical imaging lens according to a fifth example embodiment. FIG. 23 shows example charts of longitudinal spherical aberration and other kinds of optical aberrations of the optical imaging lens 5 according to the fifth embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 22, the optical imaging lens 5 of the present embodiment, in an order from an object side A1 to an image side A2 along an optical axis, may comprise a first lens element 510, a second lens element 520, a third lens element 530, an aperture stop 500, a fourth lens element 540 and a fifth lens element 550.

The differences between the fifth embodiment and the first embodiment are the radius of curvature and thickness of each lens element, the distance of each air gap, aspherical data, and related optical parameters, such as back focal length, but the configuration of the concave/convex shape of surfaces, comprising the object-side surfaces 511, 521, 531, 541, 551 facing to the object side A1 and the image-side surfaces 512, 522, 532, 542, 552 facing to the image side A2, are similar to those in the first embodiment. Please refer to FIG. 24 for the optical characteristics of each lens elements in the optical imaging lens 5 of the present embodiment, please refer to FIG. 70A for the values of T1, G1, T2, G2, T3, G3, T4, G4, T5, G5, TF, GFP, TL, ALT, AAG, TTL, BFL, TL/(G2+G3+G4), ALT/(G3+T2+T4), TL/(G3+T2), ALT/(G3+G1), AAG/(G3+G2), G1/T1, TTL/T3, TTL/G2, TTL/AAG, T5/G2, T5/T3, T5/G1, T5/BFL, BFL/(G3+G2), T5/T2, ALT/(G3+T4), T5/T1, T3/G2 and BFL/T3 of the present embodiment. The distance from the object-side surface 511 of the first lens element 510 to the image plane 570 along the optical axis may be about 11.304 mm, the image height may be about 1.8 mm, EFL may be about 1.026 mm, HFOV may be about 96.356, and Fno may be about 2.2. Compared with the first embodiment, the length of the optical imaging lens 5 may be shorter, and the HFOV may be greater.

As illustrated by the longitudinal spherical aberration shown in FIG. 23(*a*), the offset of the off-axis light relative to the image point may be within about ±0.05 mm. As illustrated by the astigmatism aberration in the sagittal direction shown in FIG. 23(*b*), the focus variation with respect to the three wavelengths in the whole field may fall within about ±0.1 mm. As illustrated by the astigmatism aberration in the tangential direction shown in FIG. 23(*c*), the focus variation with respect to the three wavelengths in the whole field may fall within about +0.2 mm. As shown in FIG. 23(*d*), the variation of the distortion aberration may be within about ±80%.

Compared with the first embodiment, the longitudinal spherical aberration and the astigmatism aberration in the sagittal direction of the optical imaging lens 5 may be lower. According to the value of the aberrations, it is shown that the optical imaging lens 5 of the present embodiment, with the length that may be as short as about 11.304 mm, may be capable of providing good imaging quality as well as good optical characteristics.

Figure 26:
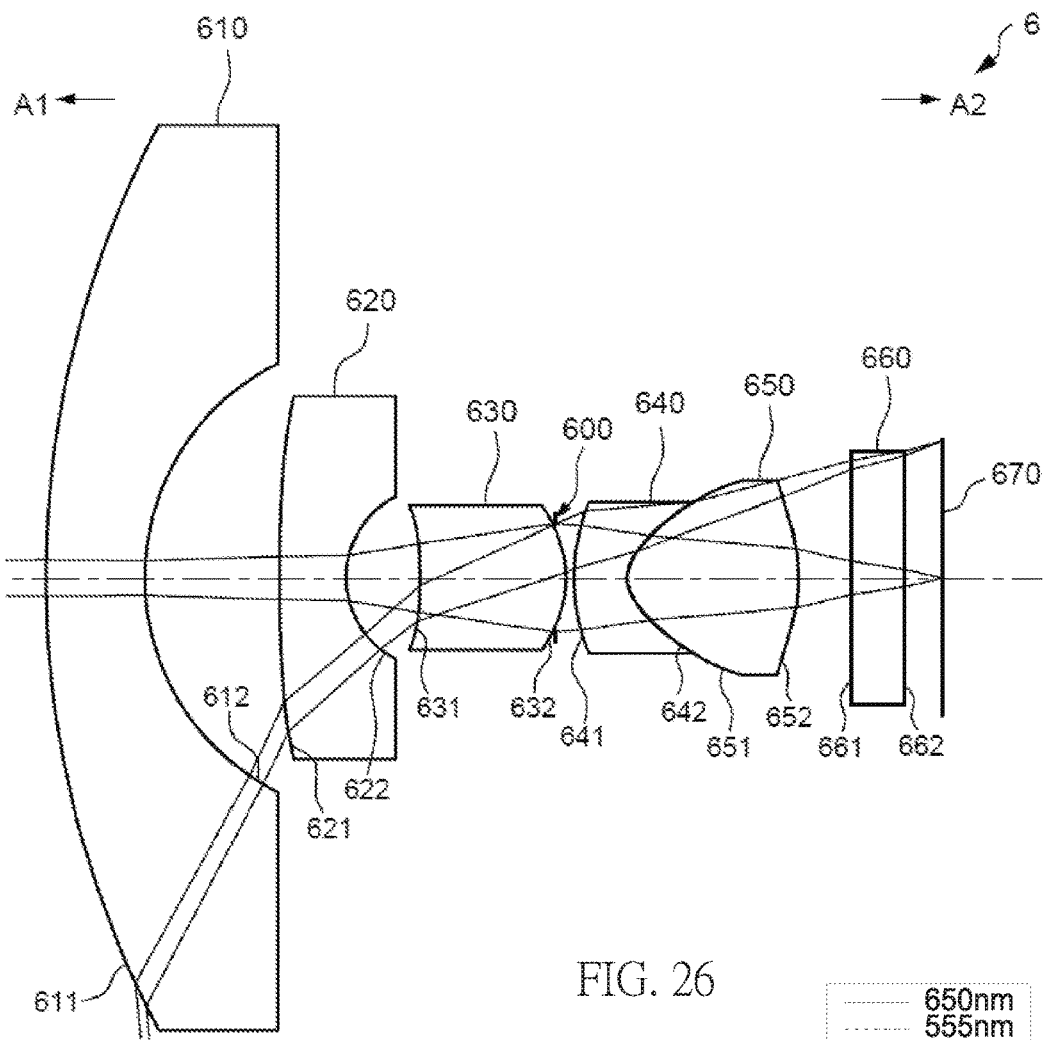
FIG. 26 is a cross-sectional view of a sixth embodiment of an optical imaging lens having five lens elements according to the present disclosure.
Figure 27:
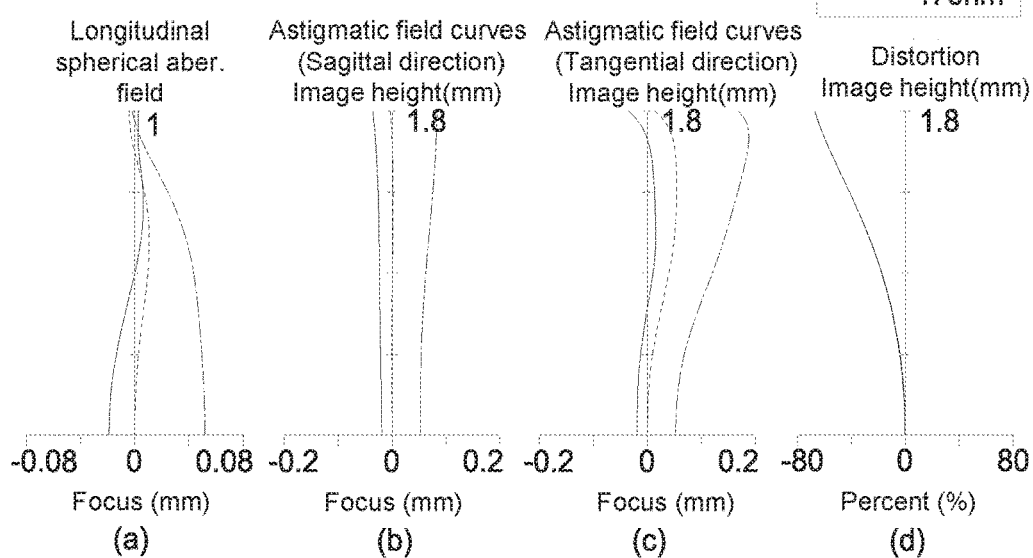
FIG. 27 is a chart of longitudinal spherical aberration and other kinds of optical aberrations of a sixth embodiment of the optical imaging lens according the present disclosure.

Reference is now made to FIGS. 26-29. FIG. 26 illustrates an example cross-sectional view of an optical imaging lens 6 having five lens elements of the optical imaging lens according to a sixth example embodiment. FIG. 27 shows example charts of longitudinal spherical aberration and other kinds of optical aberrations of the optical imaging lens 6 according to the sixth embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 26, the optical imaging lens 6 of the present embodiment, in an order from an object side A1 to an image side A2 along an optical axis, may comprise a first lens element 610, a second lens element 620, a third lens element 630, an aperture stop 600, a fourth lens element 640 and a fifth lens element 650.

The differences between the sixth embodiment and the first embodiment are the radius of curvature and thickness of each lens element, the distance of each air gap, aspherical data, and related optical parameters, such as back focal length, but the configuration of the concave/convex shape of surfaces, comprising the object-side surfaces 611, 621, 631, 641, 651 facing to the object side A1 and the image-side surfaces 612, 622, 632, 642, 652 facing to the image side A2, are similar to those in the first embodiment, and the fourth lens element 640 has positive refracting power. Please refer to FIG. 28 for the optical characteristics of each lens elements in the optical imaging lens 6 of the present embodiment, please refer to FIG. 70A for the values of T1, G1, T2, G2, T3, G3, T4, G4, T5, G5, TF, GFP, TL, ALT, AAG, TTL, BFL, TL/(G2+G3+G4), ALT/(G3+T2+T4), TL/(G3+T2), ALT/(G3+G1), AAG/(G3+G2), G1/T1, TTL/T3, TTL/G2, TTL/AAG, T5/G2, T5/T3, T5/G1, T5/BFL, BFL/(G3+G2), T5/T2, ALT/(G3+T4), T5/T1, T3/G2 and BFL/T3 of the present embodiment. The distance from the object-side surface 611 of the first lens element 610 to the image plane 670 along the optical axis may be about 11.768 mm, the image height may be about 1.8 mm, EFL may be about 1.047 mm, HFOV may be about 95.563, and Fno may be about 2.2. Compared with the first embodiment, the length of the optical imaging lens 6 may be shorter, and the HFOV may be greater.

As illustrated by the longitudinal spherical aberration shown in FIG. 27(a), the offset of the off-axis light relative to the image point may be within about ±0.08 mm. As illustrated by the astigmatism aberration in the sagittal direction shown in FIG. 27(b), the focus variation with respect to the three wavelengths in the whole field may fall within about ±0.1 mm. As illustrated by the astigmatism aberration in the tangential direction shown in FIG. 27(c), the focus variation with respect to the three wavelengths in the whole field may fall within about ±0.2 mm. As shown in FIG. 27(d), the variation of the distortion aberration may be within about ±80%.

Compared with the first embodiment, the astigmatism aberration in the sagittal direction may be lower. According to the value of the aberrations, it is shown that the optical imaging lens 6 of the present embodiment, with the length that may be as short as about 11.768 mm, may be capable of providing good imaging quality as well as good optical characteristics.

Figure 30:
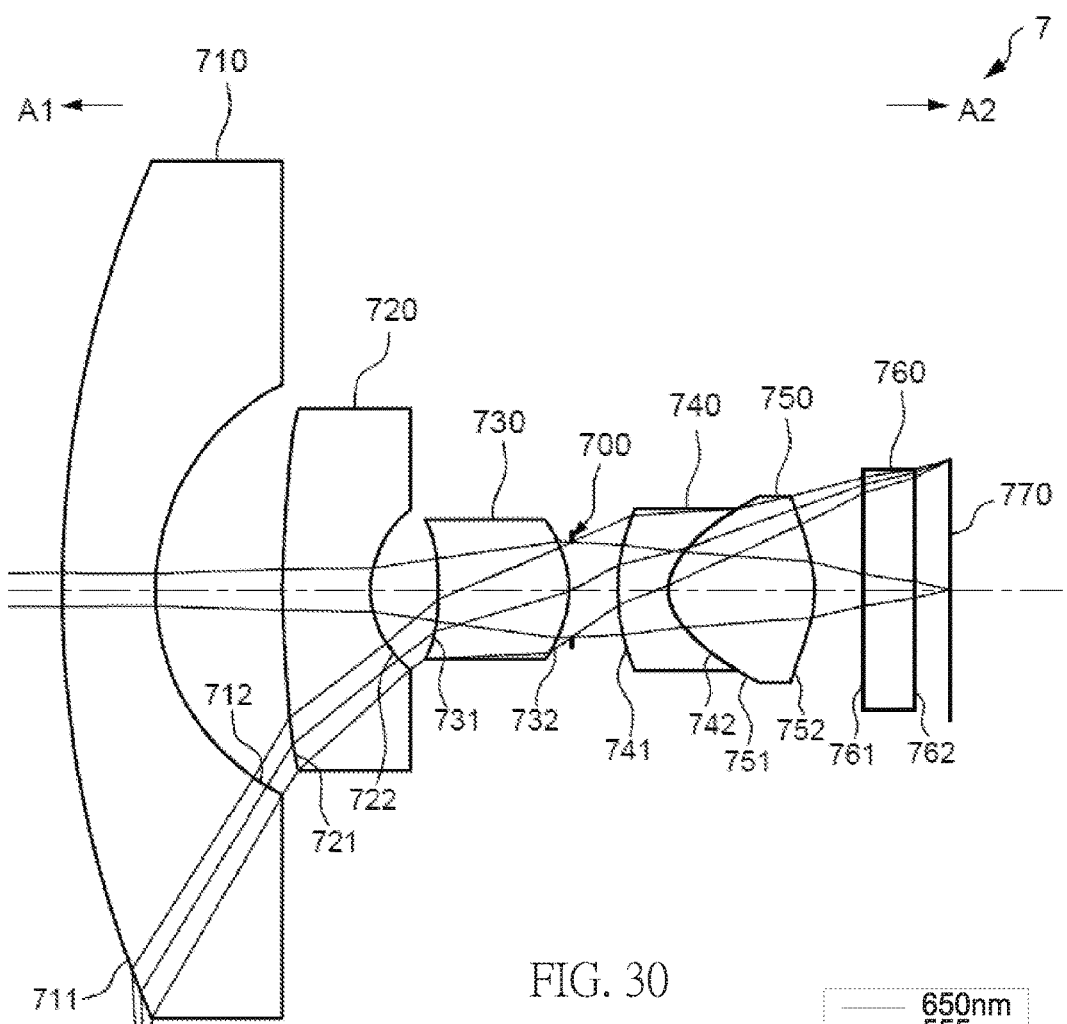
FIG. 30 is a cross-sectional view of a seventh embodiment of an optical imaging lens having five lens elements according to the present disclosure.
Figure 31:
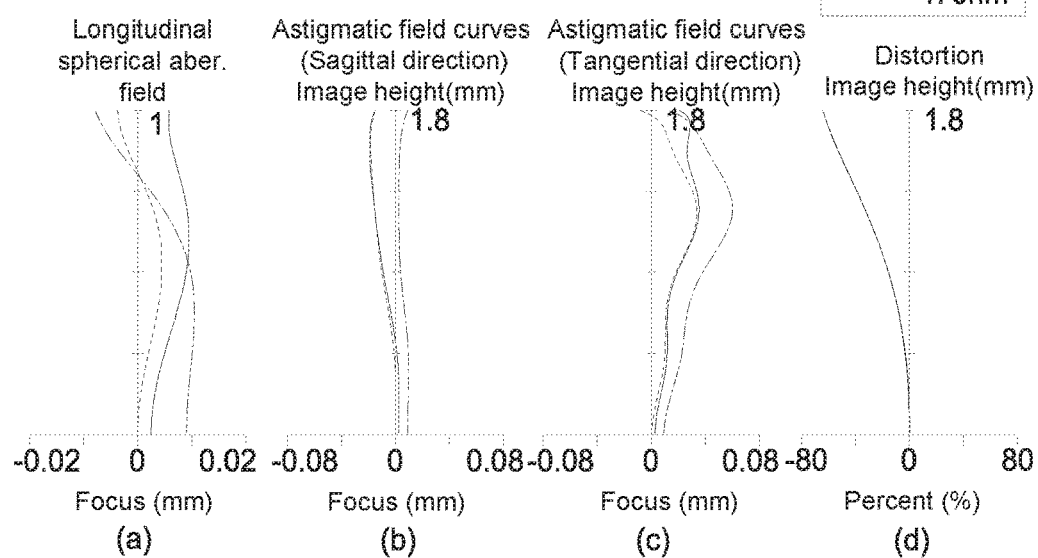
FIG. 31 is a chart of longitudinal spherical aberration and other kinds of optical aberrations of a seventh embodiment of the optical imaging lens according to the present disclosure.

Reference is now made to FIGS. 30-33. FIG. 30 illustrates an example cross-sectional view of an optical imaging lens 7 having five lens elements of the optical imaging lens according to a seventh example embodiment. FIG. 31 shows example charts of longitudinal spherical aberration and other kinds of optical aberrations of the optical imaging lens 7 according to the seventh embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 30, the optical imaging lens 7 of the present embodiment, in an order from an object side A1 to an image side A2 along an optical axis, may comprise a first lens element 710, a second lens element 720, a third lens element 730, an aperture stop 700, a fourth lens element 740 and a fifth lens element 750.

The differences between the seventh embodiment and the first embodiment are the radius of curvature and thickness of each lens element, the distance of each air gap, aspherical data, and related optical parameters, such as back focal length, but the configuration of the concave/convex shape of surfaces, comprising the object-side surfaces 711, 721, 731, 741, 751 facing to the object side A1 and the image-side surfaces 712, 722, 732, 742, 752 facing to the image side A2, are similar to those in the first embodiment. Please refer to FIG. 32 for the optical characteristics of each lens elements in the optical imaging lens 7 of the present embodiment, please refer to FIG. 70A for the values of T1, G1, T2, G2, T3, G3, T4, G4, T5, G5, TF, GFP, TL, ALT, AAG, TTL, BFL, TL/(G2+G3+G4), ALT/(G3+T2+T4), TL/(G3+T2), ALT/(G3+G1), AAG/(G3+G2), G1/T1, TTL/T3, TTL/G2, TTL/AAG, T5/G2, T5/T3, T5/G1, T5/BFL, BFL/(G3+G2), T5/T2, ALT/(G3+T4), T5/T1, T3/G2 and BFL/T3 of the present embodiment. The distance from the object-side surface 711 of the first lens element 710 to the image plane 770 along the optical axis may be about 12.330 mm, the image height may be about 1.8 mm, EFL may be about 1.042 mm, HFOV may be about 93.113, and Fno may be about 2.2. Compared with the first embodiment, the length of the optical imaging lens 7 may be shorter, and the HFOV may be greater.

As illustrated by the longitudinal spherical aberration shown in FIG. 31(a), the offset of the off-axis light relative to the image point may be within about ±0.02 mm. As illustrated by the astigmatism aberration in the sagittal direction shown in FIG. 31(b), the focus variation with respect to the three wavelengths in the whole field may fall within about ±0.04 mm. As illustrated by the astigmatism aberration in the tangential direction shown in FIG. 31(c), the focus variation with respect to the three wavelengths in the whole field may fall within about +0.08 mm. As shown in FIG. 31(d), the variation of the distortion aberration may be within about ±80%.

Compared with the first embodiment, the longitudinal spherical aberration and the astigmatism aberration both in the sagittal and tangential directions of the optical imaging lens 7 may be less. According to the value of the aberrations, it is shown that the optical imaging lens 7 of the present embodiment, with the length that may be as short as about 12.330 mm, may be capable of providing good imaging quality as well as good optical characteristics.

Figure 34:
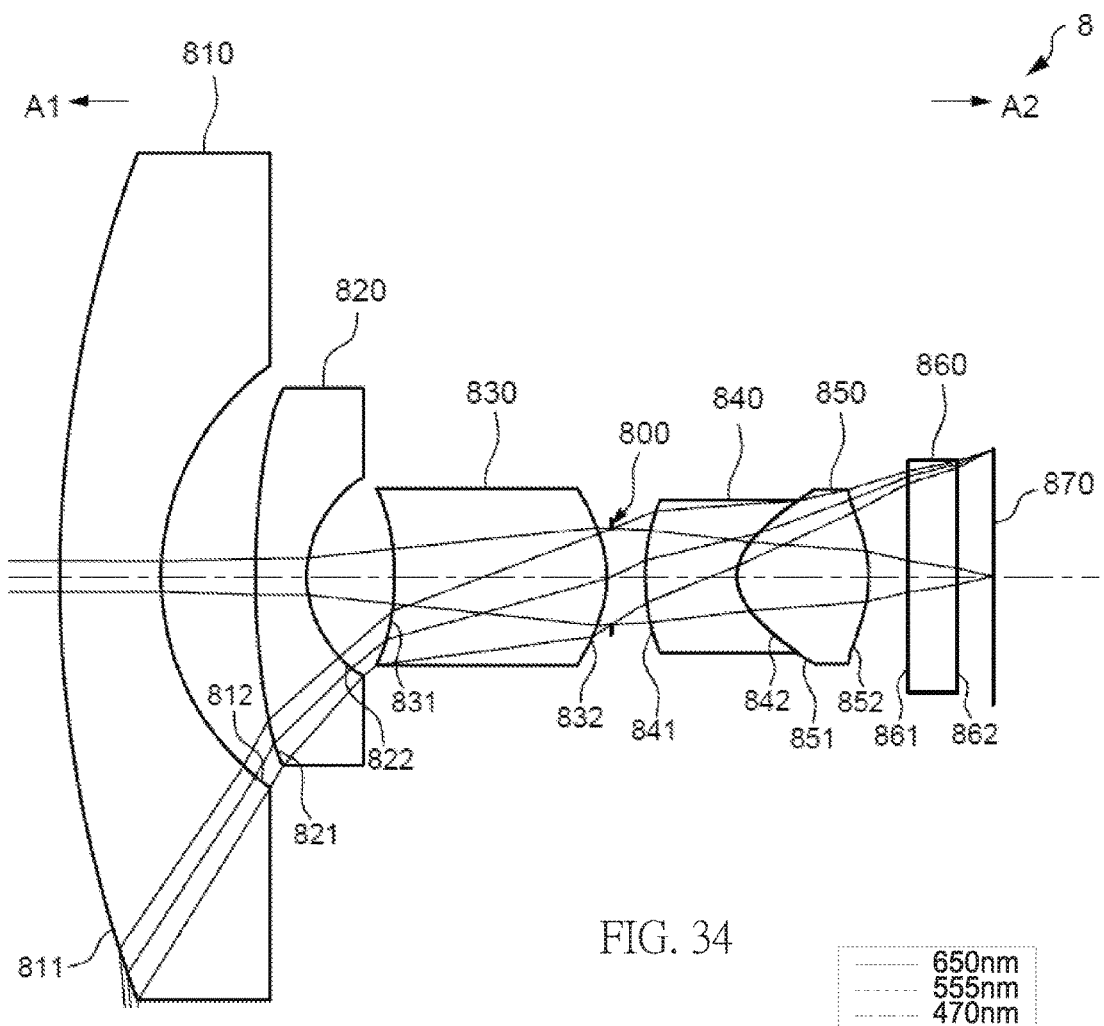
FIG. 34 is a cross-sectional view of an eighth embodiment of an optical imaging lens having five lens elements according to the present disclosure.
Figure 35:
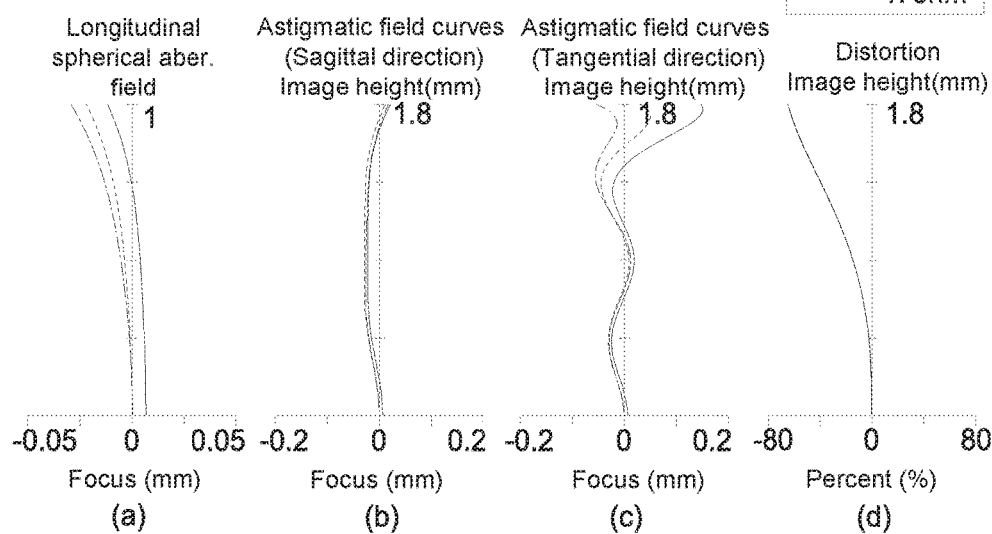
FIG. 35 is a chart of longitudinal spherical aberration and other kinds of optical aberrations of an eighth embodiment of the optical imaging lens according to the present disclosure.

Reference is now made to FIGS. 34-37. FIG. 34 illustrates an example cross-sectional view of an optical imaging lens 8 having five lens elements of the optical imaging lens according to an eighth example embodiment. FIG. 35 shows example charts of longitudinal spherical aberration and other kinds of optical aberrations of the optical imaging lens 8 according to the eighth embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 34, the optical imaging lens 8 of the present embodiment, in an order from an object side A1 to an image side A2 along an optical axis, may comprise a first lens element 810, a second lens element 820, a third lens element 830, an aperture stop 800, a fourth lens element 840 and a fifth lens element 850.

The differences between the eighth embodiment and the first embodiment are the radius of curvature and thickness of each lens element, the distance of each air gap, aspherical data, and related optical parameters, such as back focal length, but the configuration of the concave/convex shape of surfaces, comprising the object-side surfaces 811, 821, 831, 841, 851 facing to the object side A1 and the image-side surfaces 812, 822, 832, 842, 852 facing to the image side A2, are similar to those in the first embodiment, and the fourth lens element 840 has positive refracting power. Please refer to FIG. 36 for the optical characteristics of each lens elements in the optical imaging lens 8 of the present embodiment, please refer to FIG. 70A for the values of T1, G1, T2, G2, T3, G3, T4, G4, T5, G5, TF, GFP, TL, ALT, AAG, TTL, BFL, TL/(G2+G3+G4), ALT/(G3+T2+T4), TL/(G3+T2), ALT/(G3+G1), AAG/(G3+G2), G1/T1, TTL/T3, TTL/G2, TTL/AAG, T5/G2, T5/T3, T5/G1, T5/BFL, BFL/(G3+G2), T5/T2, ALT/(G3+T4), T5/T1, T3/G2 and BFL/T3 of the present embodiment. The distance from the object-side surface 811 of the first lens element 810 to the image plane 870 along the optical axis may be about 13.198 mm, the image height may be about 1.8 mm, EFL may be about 0.9858 mm, HFOV may be about 95.249, and Fno may be about 2.2. Compared with the first embodiment, the HFOV of the optical imaging lens 8 may be greater.

As illustrated by the longitudinal spherical aberration shown in FIG. 35(a), the offset of the off-axis light relative to the image point may be within about ±0.05 mm. As illustrated by the astigmatism aberration in the sagittal direction shown in FIG. 35(b), the focus variation with respect to the three wavelengths in the whole field may fall within about ±0.1 mm. As illustrated by the astigmatism aberration in the tangential direction shown in FIG. 35(c), the focus variation with respect to the three wavelengths in the whole field may fall within about ±0.2 mm. As shown in FIG. 35(d), the variation of the distortion aberration may be within about ±80%.

Compared with the first embodiment, the longitudinal spherical aberration and the astigmatism aberration in the sagittal direction of the optical imaging lens 8 may be less. According to the value of the aberrations, it is shown that the optical imaging lens 8 of the present embodiment, with the length that may be as short as about 13.198 mm, may be capable to provide good imaging quality as well as good optical characteristics.

Figure 38:
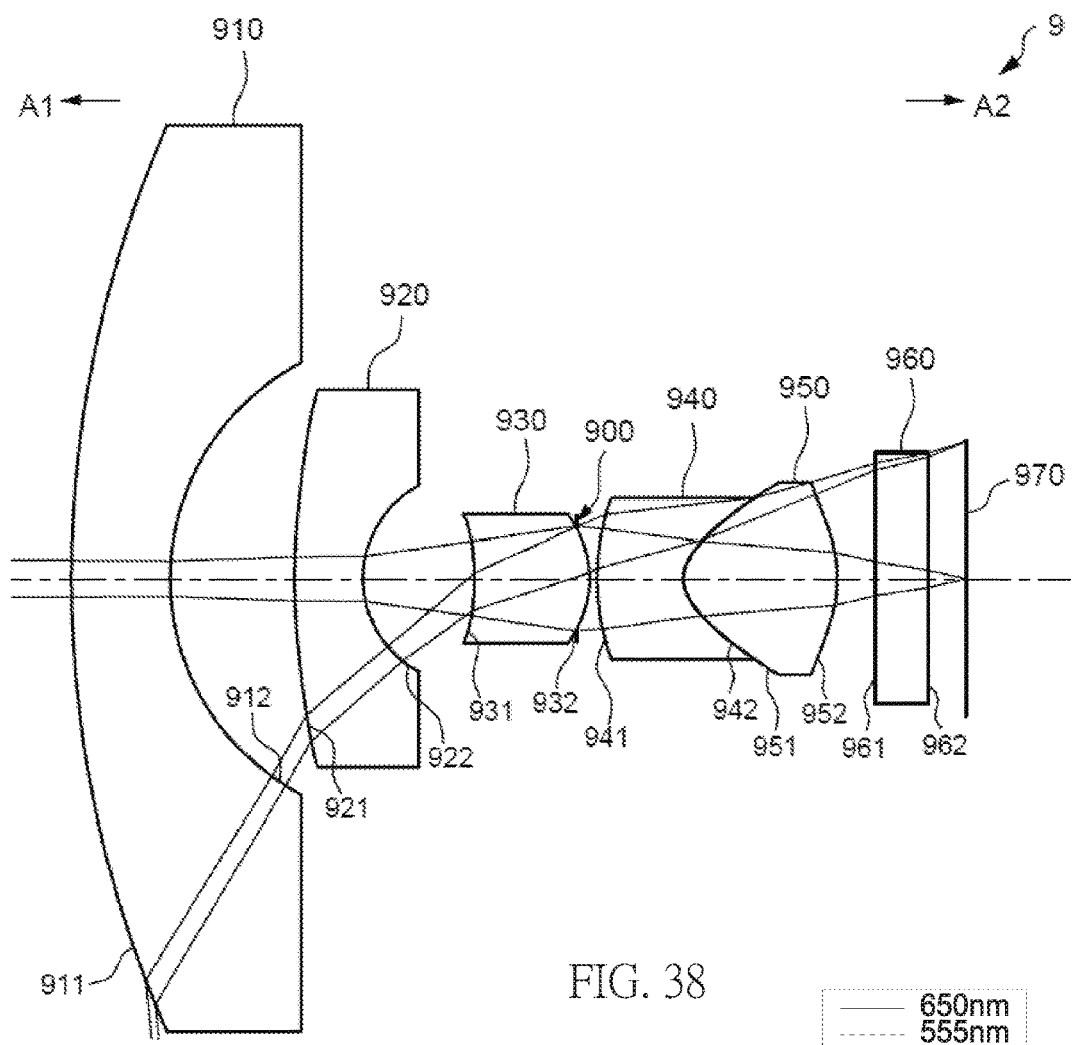
FIG. 38 is a cross-sectional view of a ninth embodiment of an optical imaging lens having five lens elements according to the present disclosure.
Figure 39:
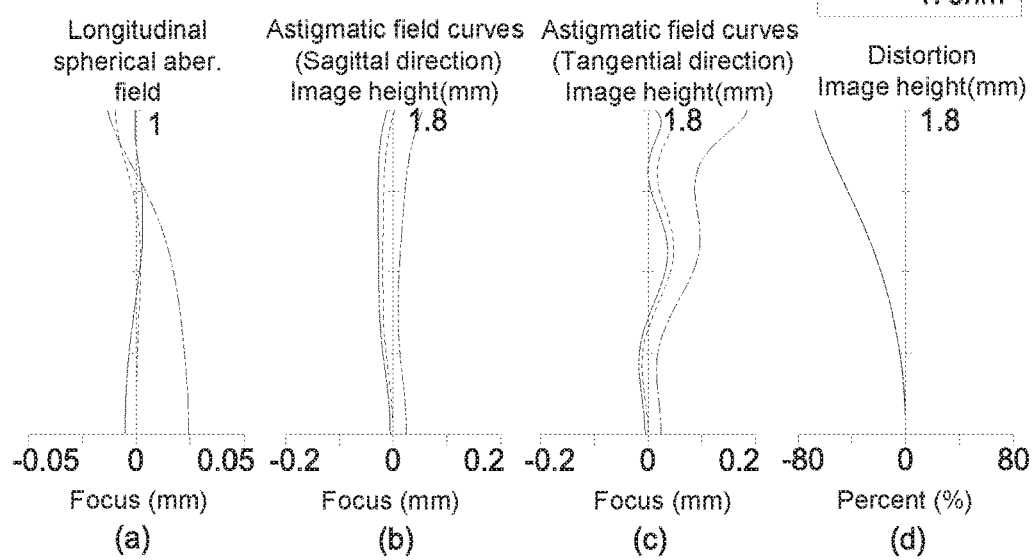
FIG. 39 is a chart of longitudinal spherical aberration and other kinds of optical aberrations of a ninth embodiment of the optical imaging lens according to the present disclosure.

Reference is now made to FIGS. 38-41. FIG. 38 illustrates an example cross-sectional view of an optical imaging lens 9 having five lens elements of the optical imaging lens according to an ninth example embodiment. FIG. 39 shows example charts of longitudinal spherical aberration and other kinds of optical aberrations of the optical imaging lens 9 according to the ninth embodiment. FIG. 40 shows an example table of optical data of each lens element of the optical imaging lens 9 according to the ninth example embodiment. FIG. 41 shows an example table of aspherical data of the optical imaging lens 9 according to the ninth example embodiment. The reference numbers labeled in the present embodiment are similar to those in the first embodiment for the similar elements, but here the reference numbers are initialed with 9, for example, reference number 931 for labeling the object-side surface of the third lens element 930, reference number 932 for labeling the image-side surface of the third lens element 930, etc.

As shown in FIG. 38, the optical imaging lens 9 of the present embodiment, in an order from an object side A1 to an image side A2 along an optical axis, may comprise a first lens element 910, a second lens element 920, a third lens element 930, an aperture stop 900, a fourth lens element 940 and a fifth lens element 950.

The differences between the ninth embodiment and the first embodiment are the radius of curvature and thickness of each lens element, the distance of each air gap, aspherical data, and related optical parameters, such as back focal length, but the configuration of the concave/convex shape of surfaces, comprising the object-side surfaces 911, 921, 931, 941, 951 facing to the object side A1 and the image-side surfaces 912, 922, 932, 942, 952 facing to the image side A2, are similar to those in the first embodiment. Please refer to FIG. 40 for the optical characteristics of each lens elements in the optical imaging lens 9 of the present embodiment, please refer to FIG. 70B for the values of T1, G1, T2, G2, T3, G3, T4, G4, T5, G5, TF, GFP, TL, ALT, AAG, TTL, BFL, TL/(G2+G3+G4), ALT/(G3+T2+T4), TL/(G3+T2), ALT/(G3+G1), AAG/(G3+G2), G1/T1, TTL/T3, TTL/G2, TTL/AAG, T5/G2, T5/T3, T5/G1, T5/BFL, BFL/(G3+G2), T5/T2, ALT/(G3+T4), T5/T1, T3/G2 and BFL/T3 of the present embodiment. The distance from the object-side surface 911 of the first lens element 910 to the image plane 970 along the optical axis may be about 11.754 mm, the image height may be about 1.8 mm, EFL may be about 1.063 mm, HFOV may be about 95.456, and Fno may be about 2.2. Compared with the first embodiment, the length of the optical imaging lens 9 may be shorter, and the HFOV may be greater.

As illustrated by the longitudinal spherical aberration shown in FIG. 39(a), the offset of the off-axis light relative to the image point may be within about ±0.05 mm. As illustrated by the astigmatism aberration in the sagittal direction shown in FIG. 39(b), the focus variation with respect to the three wavelengths in the whole field may fall within about ±0.1 mm. As illustrated by the astigmatism aberration in the tangential direction shown in FIG. 39(c), the focus variation with respect to the three wavelengths in the whole field may fall within about ±0.2 mm. As shown in FIG. 39(*d*), the variation of the distortion aberration may be within about ±80%.

Compared with the first embodiment, the longitudinal spherical aberration and the astigmatism aberration in the sagittal direction of the optical imaging lens 9 may be less. According to the value of the aberrations, it is shown that the optical imaging lens 9 of the present embodiment, with the length that may be as short as about 11.754 mm, may be capable to provide good imaging quality as well as good optical characteristics.

Figure 42:
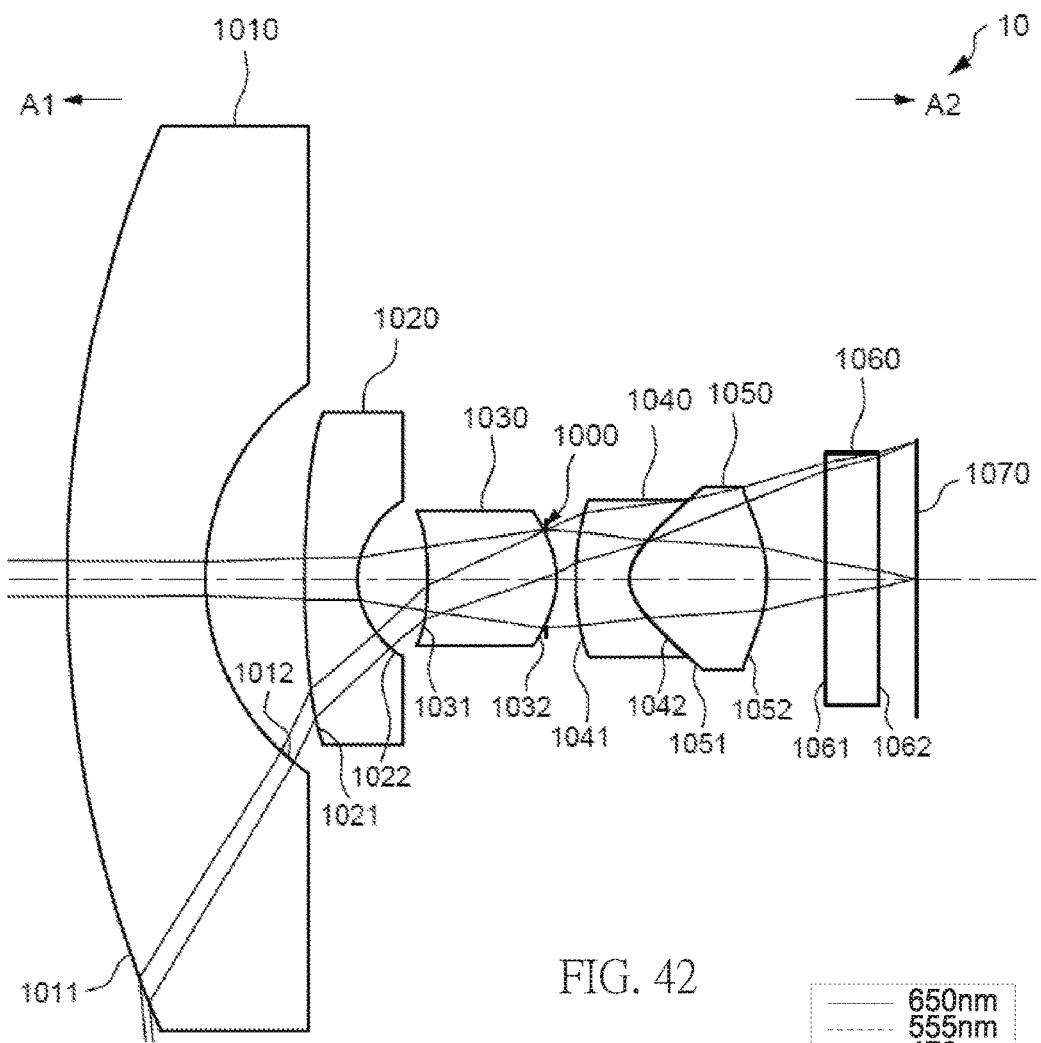
FIG. 42 is a cross-sectional view of a tenth embodiment of an optical imaging lens having five lens elements according to the present disclosure.
Figure 43:
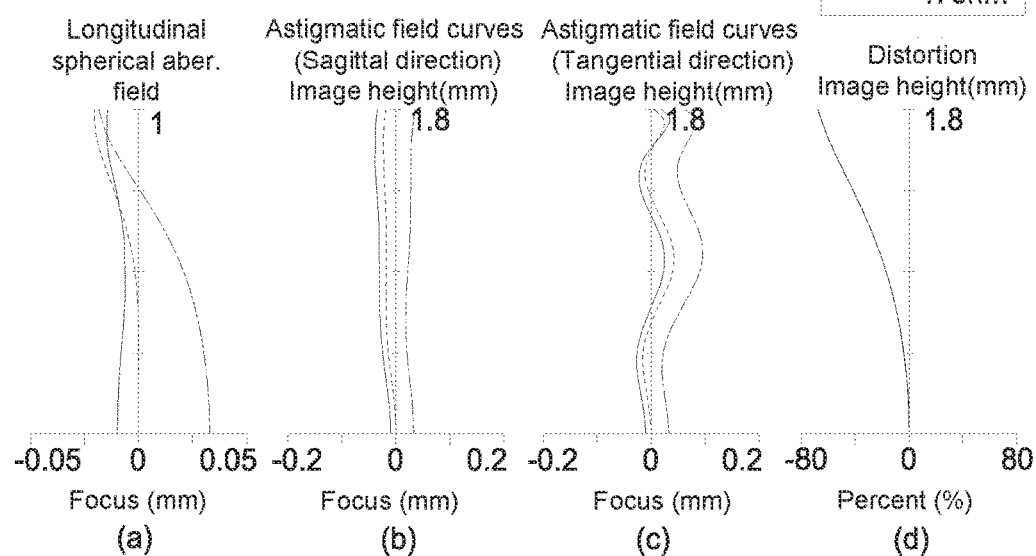
FIG. 43 is a chart of longitudinal spherical aberration and other kinds of optical aberrations of a tenth embodiment of the optical imaging lens according to the present disclosure.

Reference is now made to FIGS. 42-45. FIG. 42 illustrates an example cross-sectional view of an optical imaging lens 10 having five lens elements of the optical imaging lens according to an tenth example embodiment. FIG. 43 shows example charts of longitudinal spherical aberration and other kinds of optical aberrations of the optical imaging lens 10 according to the tenth embodiment. FIG. 44 shows an example table of optical data of each lens element of the optical imaging lens 10 according to the tenth example embodiment. FIG. 45 shows an example table of aspherical data of the optical imaging lens 10 according to the tenth example embodiment. The reference numbers labeled in the present embodiment are similar to those in the first embodiment for the similar elements, but here the reference numbers are initialed with 10, for example, reference number 1031 for labeling the object-side surface of the third lens element 1030, reference number 1032 for labeling the image-side surface of the third lens element 1030, etc.

As shown in FIG. 34, the optical imaging lens 10 of the present embodiment, in an order from an object side A1 to an image side A2 along an optical axis, may comprise a first lens element 1010, a second lens element 1020, a third lens element 1030, an aperture stop 1000, a fourth lens element 1040 and a fifth lens element 1050.

The differences between the tenth embodiment and the first embodiment are the radius of curvature and thickness of each lens element, the distance of each air gap, aspherical data, and related optical parameters, such as back focal length, but the configuration of the concave/convex shape of surfaces, comprising the object-side surfaces 1011, 1021, 1031, 1041, 1051 facing to the object side A1 and the image-side surfaces 1012, 1022, 1032, 1042, 1052 facing to the image side A2, are similar to those in the first embodiment. Please refer to FIG. 44 for the optical characteristics of each lens elements in the optical imaging lens 10 of the present embodiment, please refer to FIG. 70B for the values of T1, G1, T2, G2, T3, G3, T4, G4, T5, G5, TF, GFP, TL, ALT, AAG, TTL, BFL, TL/(G2+G3+G4), ALT/(G3+T2+T4), TL/(G3+T2), ALT/(G3+G1), AAG/(G3+G2), G1/T1, TTL/T3, TTL/G2, TTL/AAG, T5/G2, T5/T3, T5/G1, T5/BFL, BFL/(G3+G2), T5/T2, ALT/(G3+T4), T5/T1, T3/G2 and BFL/T3 of the present embodiment. The distance from the object-side surface 1011 of the first lens element 1010 to the image plane 1070 along the optical axis may be about 11.157 mm, the image height may be about 1.8 mm, EFL may be about 1.054 mm, HFOV may be about 95.731, and Fno may be about 2.2. Compared with the first embodiment, the length of the optical imaging lens 10 may be shorter, and the HFOV may be greater.

As illustrated by the longitudinal spherical aberration shown in FIG. 43(*a*), the offset of the off-axis light relative to the image point may be within about ±0.05 mm. As illustrated by the astigmatism aberration in the sagittal direction shown in FIG. 43(*b*), the focus variation with respect to the three wavelengths in the whole field may fall within about ±0.1 mm. As illustrated by the astigmatism aberration in the tangential direction shown in FIG. 43(*c*), the focus variation with respect to the three wavelengths in the whole field may fall within about +0.2 mm. As shown in FIG. 43(*d*), the variation of the distortion aberration may be within about ±80%.

Compared with the first embodiment, the longitudinal spherical aberration and the astigmatism aberration in the sagittal direction of the optical imaging lens 10 may be less. According to the value of the aberrations, it is shown that the optical imaging lens 10 of the present embodiment, with the length that may be as short as about 11.157 mm, is capable to provide good imaging quality as well as good optical characteristics.

Figure 46:
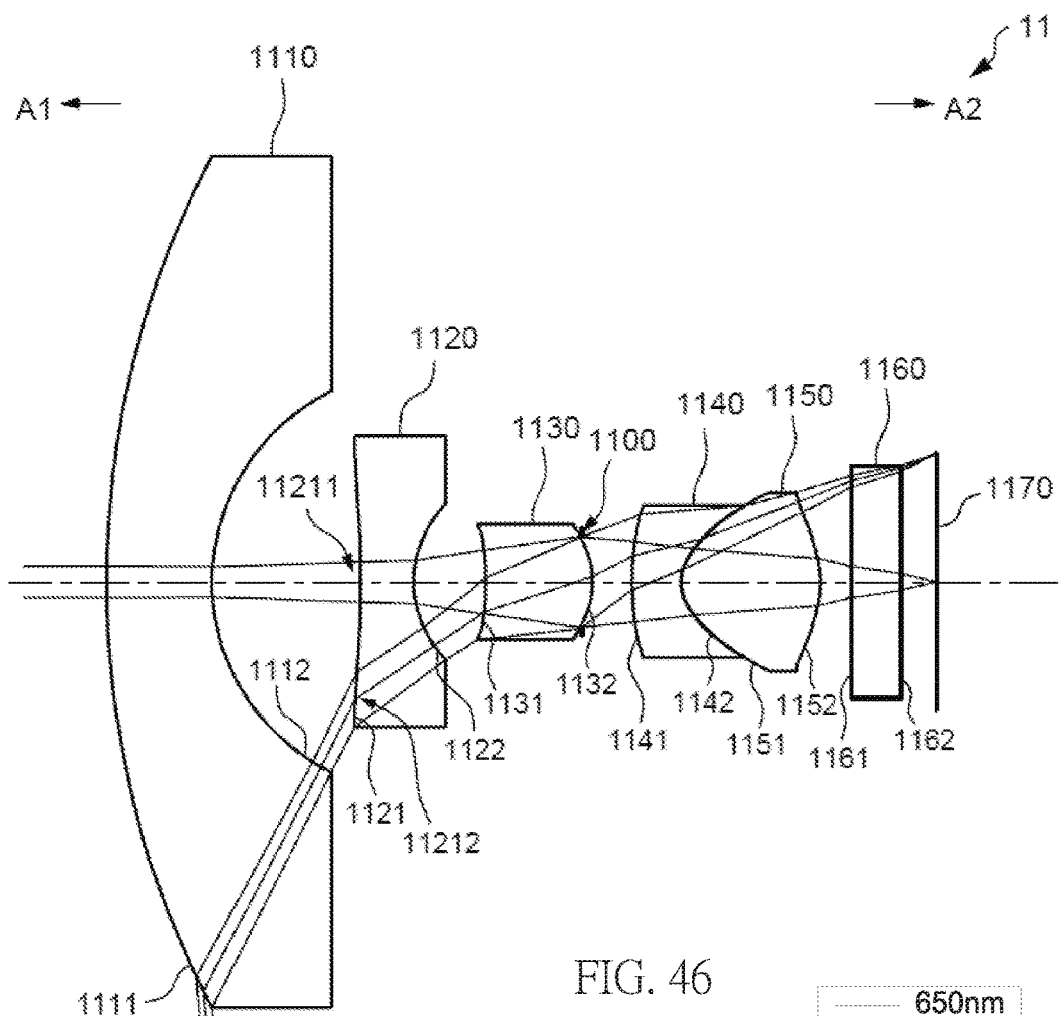
FIG. 46 is a cross-sectional view of an eleventh embodiment of an optical imaging lens having five lens elements according to the present disclosure.
Figure 47:
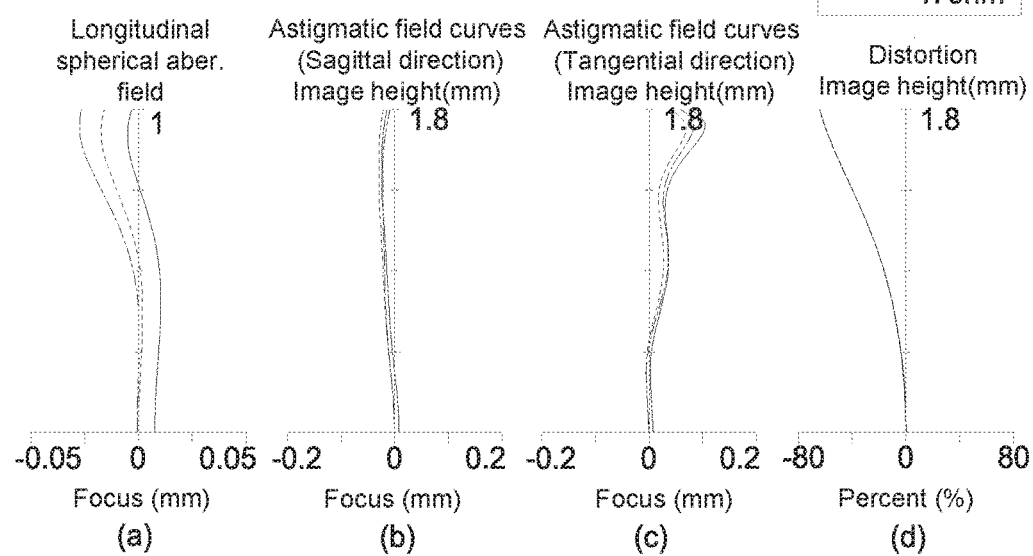
FIG. 47 is a chart of longitudinal spherical aberration and other kinds of optical aberrations of an eleventh embodiment of the optical imaging lens according the present disclosure.

Reference is now made to FIGS. 46-49. FIG. 46 illustrates an example cross-sectional view of an optical imaging lens 11 having five lens elements of the optical imaging lens according to an eleventh example embodiment. FIG. 47 shows example charts of longitudinal spherical aberration and other kinds of optical aberrations of the optical imaging lens 11 according to the eleventh embodiment. FIG. 48 shows an example table of optical data of each lens element of the optical imaging lens 11 according to the eleventh example embodiment. FIG. 49 shows an example table of aspherical data of the optical imaging lens 11 according to the eleventh example embodiment. The reference numbers labeled in the present embodiment are similar to those in the first embodiment for the similar elements, but here the reference numbers are initialed with 11, for example, reference number 1131 for labeling the object-side surface of the third lens element 1130, reference number 1132 for labeling the image-side surface of the third lens element 1130, etc.

As shown in FIG. 46, the optical imaging lens 11 of the present embodiment, in an order from an object side A1 to an image side A2 along an optical axis, may comprise a first lens element 1110, a second lens element 1120, a third lens element 1130, an aperture stop 1100, a fourth lens element 1140 and a fifth lens element 1150.

The differences between the eleventh embodiment and the first embodiment are the radius of curvature and thickness of each lens element, the distance of each air gap, aspherical data, related optical parameters, such as back focal length, and the configuration of the concave/convex shape of the object-side surface 1121, but the configuration of the concave/convex shape of surfaces, comprising the object-side surfaces 1111, 1131, 1141, 1151 facing to the object side A1 and the image-side surfaces 1112, 1122, 1132, 1142, 1152 facing to the image side A2, are similar to those in the first embodiment. Specifically, the object-side surface 1121 of the second lens element 1120 is a concave surface comprising a concave portion 11211 in a vicinity of the optical axis and a concave portion 11212 in a vicinity of a periphery of the second lens element 1120. Please refer to FIG. 48 for the optical characteristics of each lens elements in the optical imaging lens 11 of the present embodiment, please refer to FIG. 70B for the values of T1, G1, T2, G2, T3, G3, T4, G4, T5, G5, TF, GFP, TL, ALT, AAG, TTL, BFL, TL/(G2+G3+G4), ALT/(G3+T2+T4), TL/(G3+T2), ALT/(G3+G1), AAG/(G3+G2), G1/T1, TTL/T3, TTL/G2, TTL/AAG, T5/G2, T5/T3, T5/G1, T5/BFL, BFL/(G3+G2), T5/T2, ALT/(G3+T4), T5/T1, T3/G2 and BFL/T3 of the present embodiment. The distance from the object-side surface 1111 of the first lens element 1110 to the image plane 1170 along the optical axis may be about 11.675 mm, the image height may be about 1.8 mm, EFL may be about 0.995 mm, HFOV may be about 94.762, and Fno may be about 2.2. Compared with the first embodiment, the length of the optical imaging lens 11 may be shorter, and the HFOV may be greater.

As illustrated by the longitudinal spherical aberration shown in FIG. 47(a), the offset of the off-axis light relative to the image point may be within about ±0.05 mm. As illustrated by the astigmatism aberration in the sagittal direction shown in FIG. 47(b), the focus variation with respect to the three wavelengths in the whole field may fall within about ±0.1 mm. As illustrated by the astigmatism aberration in the tangential direction shown in FIG. 47(c), the focus variation with respect to the three wavelengths in the whole field may fall within about ±0.2 mm. As shown in FIG. 47(d), the variation of the distortion aberration may be within about ±80%.

Compared with the first embodiment, the longitudinal spherical aberration and the astigmatism aberration in the sagittal direction of the optical imaging lens 11 may be less. According to the value of the aberrations, it is shown that the optical imaging lens 11 of the present embodiment, with the length that may be as short as about 11.675 mm, may be capable to provide good imaging quality as well as good optical characteristics.

Figure 50:
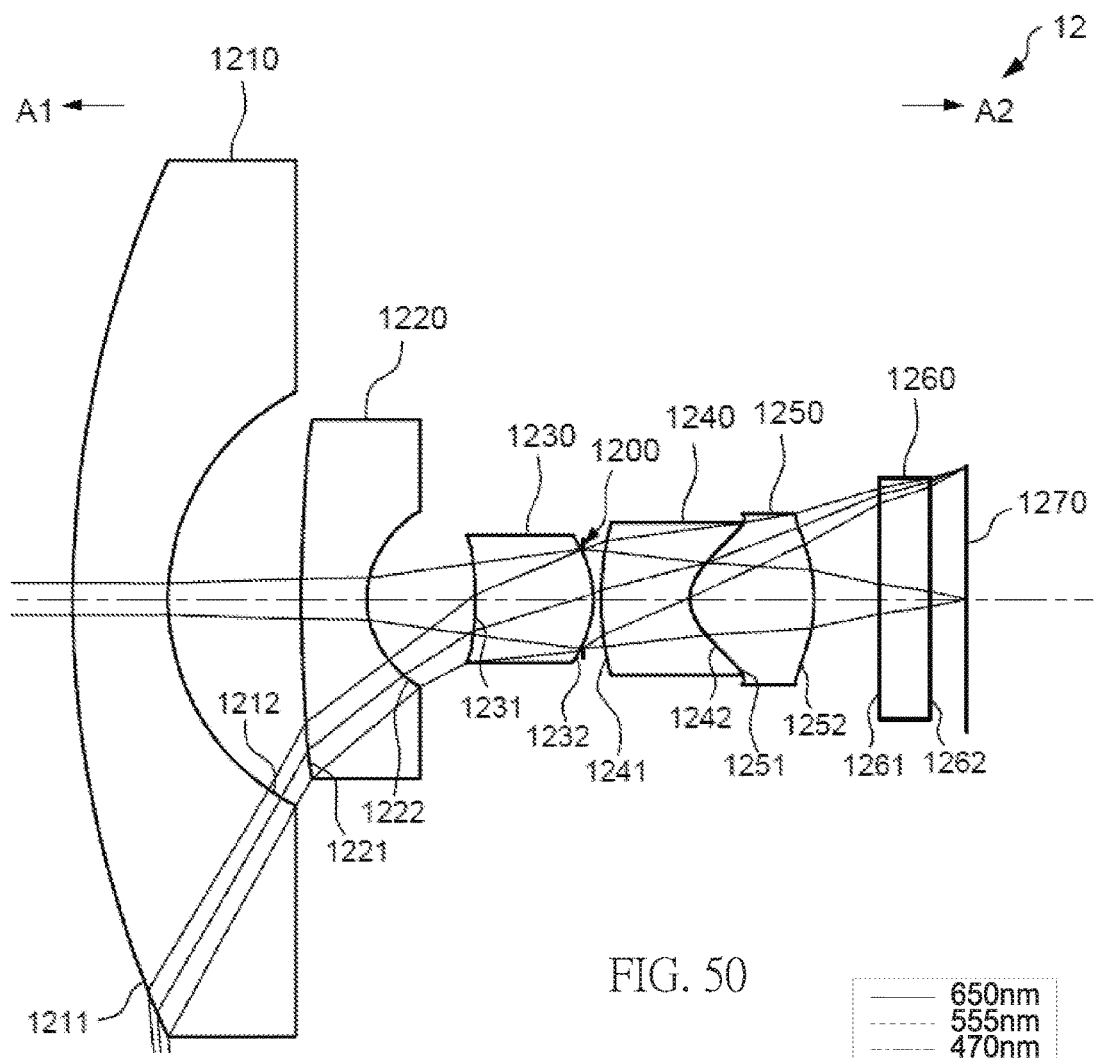
FIG. 50 is a cross-sectional view of a twelfth embodiment of an optical imaging lens having five lens elements according to the present disclosure.
Figure 51:
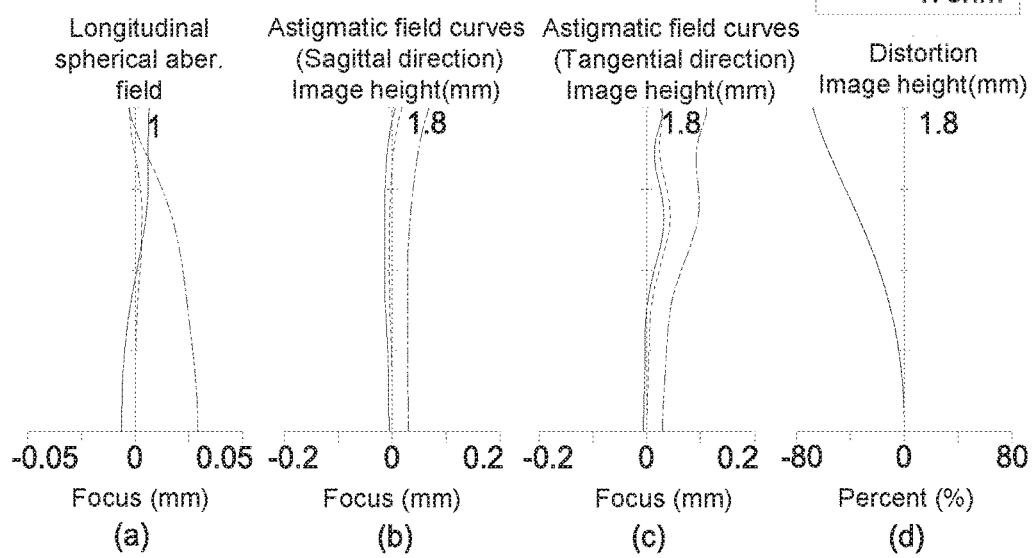
FIG. 51 is a chart of longitudinal spherical aberration and other kinds of optical aberrations of a twelfth embodiment of the optical imaging lens according the present disclosure.

Reference is now made to FIGS. 50-53. FIG. 50 illustrates an example cross-sectional view of an optical imaging lens 12 having five lens elements of the optical imaging lens according to an twelfth example embodiment. FIG. 51 shows example charts of longitudinal spherical aberration and other kinds of optical aberrations of the optical imaging lens 12 according to the twelfth embodiment. FIG. 52 shows an example table of optical data of each lens element of the optical imaging lens 12 according to the twelfth example embodiment. FIG. 53 shows an example table of aspherical data of the optical imaging lens 12 according to the twelfth example embodiment. The reference numbers labeled in the present embodiment are similar to those in the first embodiment for the similar elements, but here the reference numbers are initialed with 12, for example, reference number 1231 for labeling the object-side surface of the third lens element 1230, reference number 1232 for labeling the image-side surface of the third lens element 1230, etc.

As shown in FIG. 50, the optical imaging lens 12 of the present embodiment, in an order from an object side A1 to an image side A2 along an optical axis, may comprise a first lens element 1210, a second lens element 1220, a third lens element 1230, an aperture stop 1200, a fourth lens element 1240 and a fifth lens element 1250.

The differences between the twelfth embodiment and the first embodiment are the radius of curvature and thickness of each lens element, the distance of each air gap, aspherical data, and related optical parameters, such as back focal length, but the configuration of the concave/convex shape of surfaces, comprising the object-side surfaces 1211, 1221, 1231, 1241, 1251 facing to the object side A1 and the image-side surfaces 1212, 1222, 1232, 1242, 1252 facing to the image side A2, are similar to those in the first embodiment. Please refer to FIG. 52 for the optical characteristics of each lens elements in the optical imaging lens 12 of the present embodiment, please refer to FIG. 70B for the values of T1, G1, T2, G2, T3, G3, T4, G4, T5, G5, TF, GFP, TL, ALT, AAG, TTL, BFL, TL/(G2+G3+G4), ALT/(G3+T2+T4), TL/(G3+T2), ALT/(G3+G1), AAG/(G3+G2), G1/T1, TTL/T3, TTL/G2, TTL/AAG, T5/G2, T5/T3, T5/G1, T5/BFL, BFL/(G3+G2), T5/T2, ALT/(G3+T4), T5/T1, T3/G2 and BFL/T3 of the present embodiment. The distance from the object-side surface 1211 of the first lens element 1210 to the image plane 1270 along the optical axis may be about 12.183 mm, the image height may be about 1.8 mm, EFL may be about 1.073 mm, HFOV may be about 95.461, and Fno may be about 2.4. Compared with the first embodiment, the length of the optical imaging lens 12 may be shorter, and the HFOV may be greater.

As illustrated by the longitudinal spherical aberration shown in FIG. 51(a), the offset of the off-axis light relative to the image point may be within about ±0.05 mm. As illustrated by the astigmatism aberration in the sagittal direction shown in FIG. 51(b), the focus variation with respect to the three wavelengths in the whole field may fall within about ±0.1 mm. As illustrated by the astigmatism aberration in the tangential direction shown in FIG. 51(c), the focus variation with respect to the three wavelengths in the whole field may fall within about ±0.2 mm. As shown in FIG. 51(d), the variation of the distortion aberration may be within about ±80%.

Compared with the first embodiment, the longitudinal spherical aberration and the astigmatism aberration in the sagittal direction of the optical imaging lens 12 may be less. According to the value of the aberrations, it is shown that the optical imaging lens 12 of the present embodiment, with the length that may be as short as about 12.183 mm, may be capable to provide good imaging quality as well as good optical characteristics.

Figure 54:
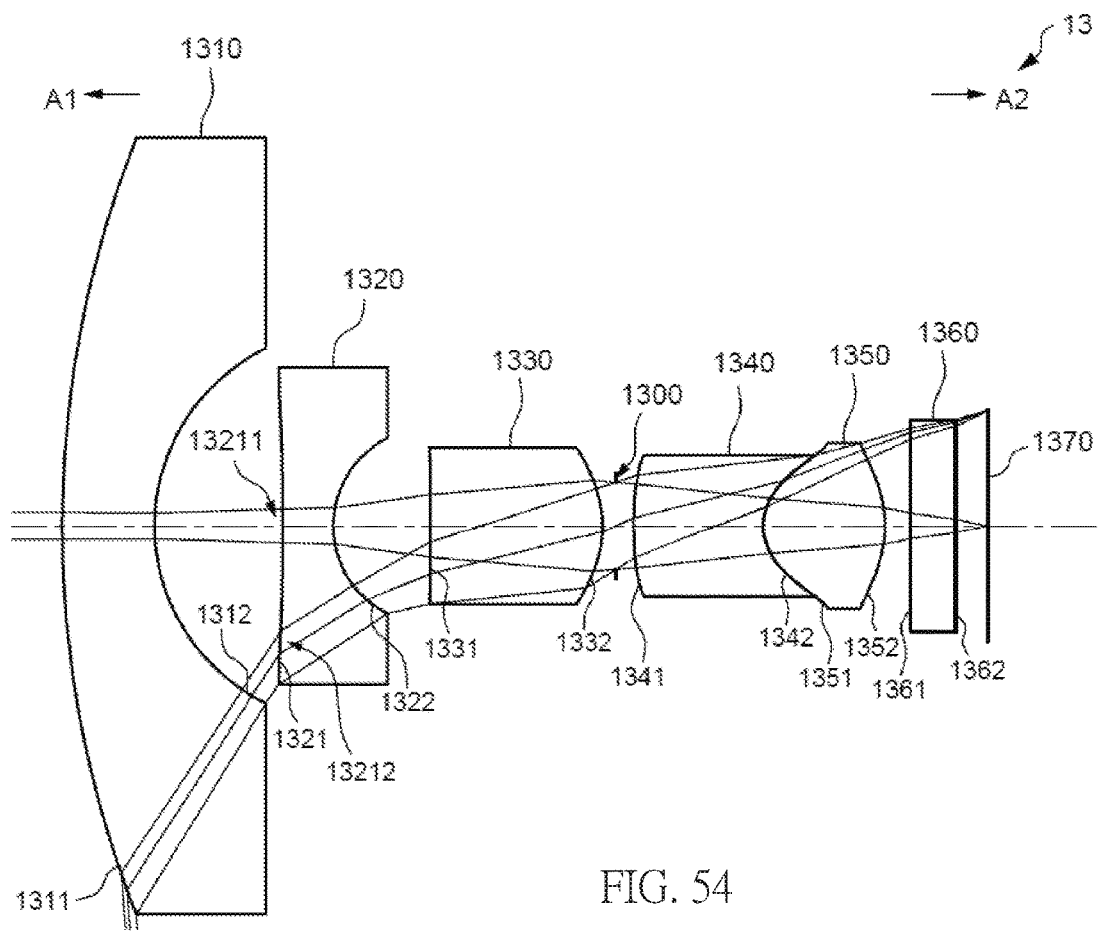
FIG. 54 is a cross-sectional view of a thirteenth embodiment of an optical imaging lens having five lens elements according to the present disclosure.
Figure 55:
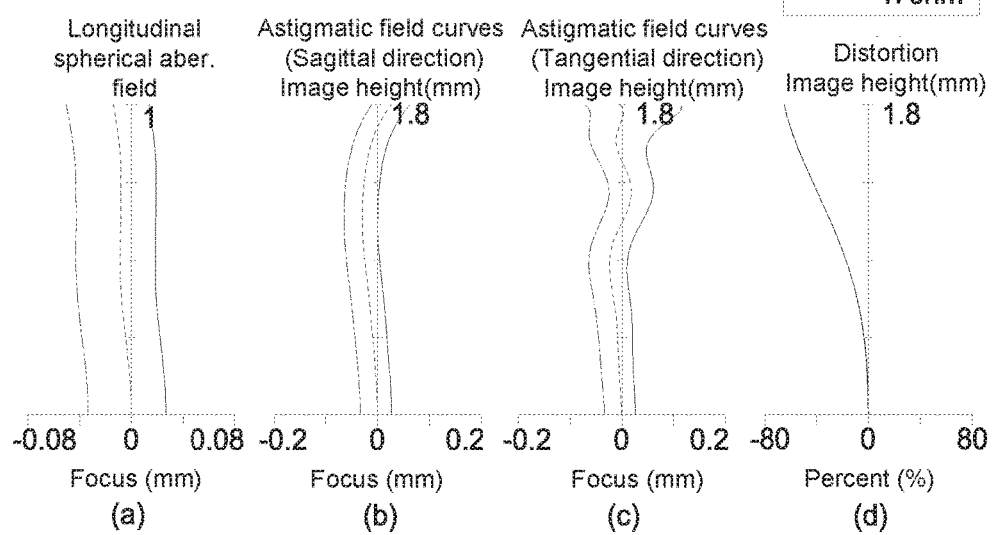
FIG. 55 is a chart of longitudinal spherical aberration and other kinds of optical aberrations of a thirteenth embodiment of the optical imaging lens according the present disclosure.

Reference is now made to FIGS. 54-57. FIG. 54 illustrates an example cross-sectional view of an optical imaging lens 13 having five lens elements of the optical imaging lens according to an thirteenth example embodiment. FIG. 55 shows example charts of longitudinal spherical aberration and other kinds of optical aberrations of the optical imaging lens 13 according to the thirteenth embodiment. FIG. 56 shows an example table of optical data of each lens element of the optical imaging lens 13 according to the thirteenth example embodiment. FIG. 57 shows an example table of aspherical data of the optical imaging lens 13 according to the thirteenth example embodiment. The reference numbers labeled in the present embodiment are similar to those in the first embodiment for the similar elements, but here the reference numbers are initialed with 13, for example, reference number 1331 for labeling the object-side surface of the third lens element 1330, reference number 1332 for labeling the image-side surface of the third lens element 1330, etc.

As shown in FIG. 54, the optical imaging lens 13 of the present embodiment, in an order from an object side A1 to an image side A2 along an optical axis, may comprise a first lens element 1310, a second lens element 1320, a third lens element 1330, an aperture stop 1300, a fourth lens element 1340 and a fifth lens element 1350.

The differences between the thirteenth embodiment and the first embodiment are the radius of curvature and thickness of each lens element, the distance of each air gap, aspherical data, related optical parameters, such as back focal length, and the configuration of the concave/convex shape of the object-side surface 1321, but the configuration of the concave/convex shape of surfaces, comprising the object-side surfaces 1311, 1331, 1341, 1351 facing to the object side A1 and the image-side surfaces 1312, 1322, 1332, 1342, 1352 facing to the image side A2, are similar to those in the first embodiment. Specifically, the object-side surface 1321 of the second lens element 1320 is a concave surface comprising a concave portion 13211 in a vicinity of the optical axis and a concave portion 13212 in a vicinity of a periphery of the second lens element 1320. Please refer to FIG. 56 for the optical characteristics of each lens elements in the optical imaging lens 13 of the present embodiment, please refer to FIG. 70B for the values of T1, G1, T2, G2, T3, G3, T4, G4, T5, G5, TF, GFP, TL, ALT, AAG, TTL, BFL, TL/(G2+G3+G4), ALT/(G3+T2+T4), TL/(G3+T2), ALT/(G3+G1), AAG/(G3+G2), G1/T1, TTL/T3, TTL/G2, TTL/AAG, T5/G2, T5/T3, T5/G1, T5/BFL, BFL/(G3+G2), T5/T2, ALT/(G3+T4), T5/T1, T3/G2 and BFL/T3 of the present embodiment. The distance from the object-side surface 1311 of the first lens element 1310 to the image plane 1370 along the optical axis may be about 14.420 mm, the image height may be about 1.8 mm, EFL may be about 1.023 mm, HFOV may be about 94.494, and Fno may be about 2.4. Compared with the first embodiment, the HFOV of the optical imaging lens 13 may be greater.

As illustrated by the longitudinal spherical aberration shown in FIG. 55(a), the offset of the off-axis light relative to the image point may be within about ±0.08 mm. As illustrated by the astigmatism aberration in the sagittal direction shown in FIG. 55(b), the focus variation with respect to the three wavelengths in the whole field may fall within about ±0.1 mm. As illustrated by the astigmatism aberration in the tangential direction shown in FIG. 55(c), the focus variation with respect to the three wavelengths in the whole field may fall within about ±0.2 mm. As shown in FIG. 55(d), the variation of the distortion aberration may be within about ±80%.

Compared with the first embodiment, the astigmatism aberration in the sagittal direction of the optical imaging lens 13 may be less. According to the value of the aberrations, it is shown that the optical imaging lens 13 of the present embodiment, with the length as short as about 14.420 mm, may be capable to provide good imaging quality as well as good optical characteristics.

Figure 58:
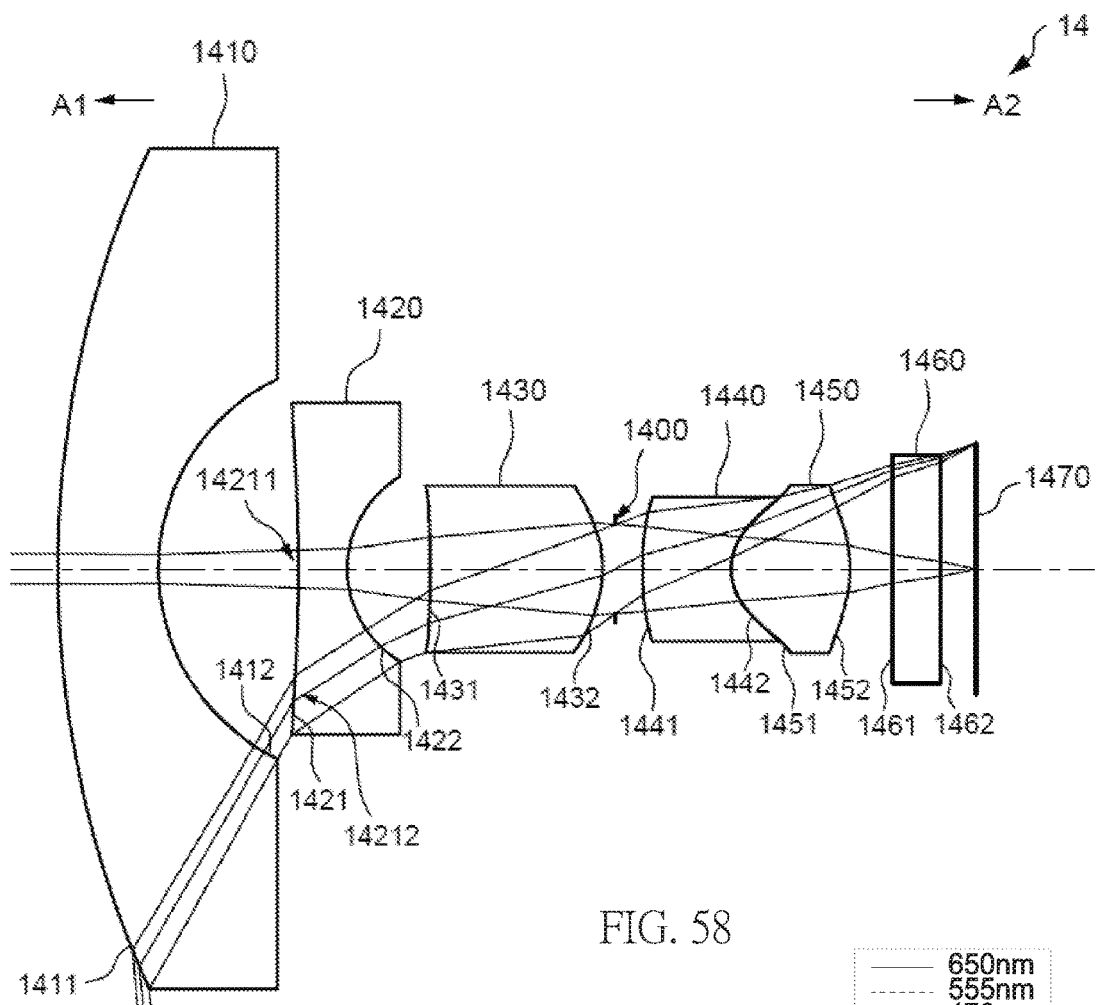
FIG. 58 is a cross-sectional view of a fourteenth embodiment of an optical imaging lens having five lens elements according to the present disclosure.
Figure 59:
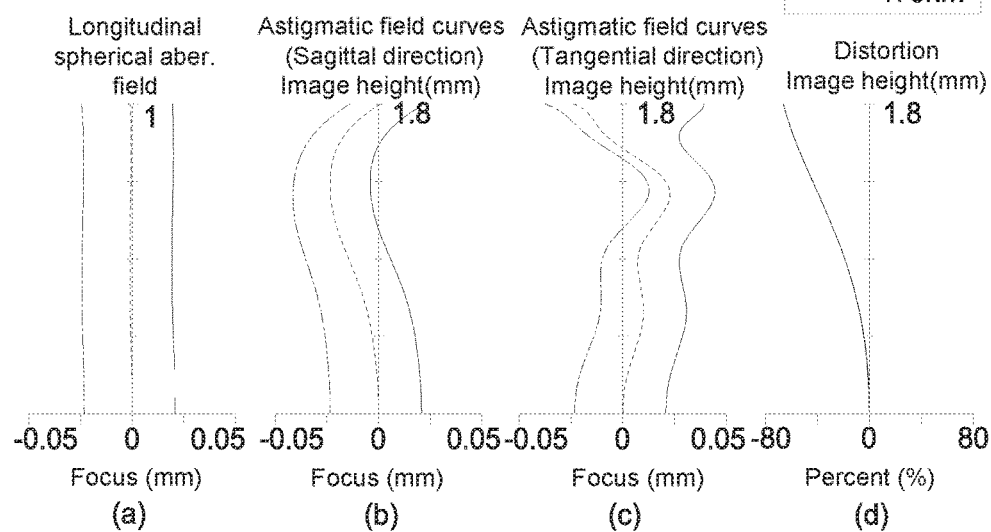
FIG. 59 is a chart of longitudinal spherical aberration and other kinds of optical aberrations of a fourteenth embodiment of the optical imaging lens according the present disclosure.

Reference is now made to FIGS. 58-61. FIG. 58 illustrates an example cross-sectional view of an optical imaging lens 14 having five lens elements of the optical imaging lens according to an fourteenth example embodiment. FIG. 59 shows example charts of longitudinal spherical aberration and other kinds of optical aberrations of the optical imaging lens 14 according to the fourteenth embodiment. FIG. 60 shows an example table of optical data of each lens element of the optical imaging lens 14 according to the fourteenth example embodiment. FIG. 61 shows an example table of aspherical data of the optical imaging lens 14 according to the fourteenth example embodiment. The reference numbers labeled in the present embodiment are similar to those in the first embodiment for the similar elements, but here the reference numbers are initialed with 14, for example, reference number 1431 for labeling the object-side surface of the third lens element 1430, reference number 1432 for labeling the image-side surface of the third lens element 1430, etc.

As shown in FIG. 58, the optical imaging lens 14 of the present embodiment, in an order from an object side A1 to an image side A2 along an optical axis, may comprise a first lens element 1410, a second lens element 1420, a third lens element 1430, an aperture stop 1400, a fourth lens element 1440 and a fifth lens element 1450.

The differences between the fourteenth embodiment and the first embodiment are the radius of curvature and thickness of each lens element, the distance of each air gap, aspherical data, related optical parameters, such as back focal length, and the configuration of the concave/convex shape of the object-side surface 1421, but the configuration of the concave/convex shape of surfaces, comprising the object-side surfaces 1411, 1431, 1441, 1451 facing to the object side A1 and the image-side surfaces 1412, 1422, 1432, 1442, 1452 facing to the image side A2, are similar to those in the first embodiment, and the fourth lens element 1440 has positive refracting power. Specifically, the object-side surface 1421 of the second lens element 1420 is a concave surface comprising a concave portion 14211 in a vicinity of the optical axis and a concave portion 14212 in a vicinity of a periphery of the second lens element 1420. Please refer to FIG. 60 for the optical characteristics of each lens elements in the optical imaging lens 14 of the present embodiment, please refer to FIG. 70B for the values of T1, G1, T2, G2, T3, G3, T4, G4, T5, G5, TF, GFP, TL, ALT, AAG, TTL, BFL, TL/(G2+G3+G4), ALT/(G3+T2+T4), TL/(G3+T2), ALT/(G3+G1), AAG/(G3+G2), G1/T1, TTL/T3, TTL/G2, TTL/AAG, T5/G2, T5/T3, T5/G1, T5/BFL, BFL/(G3+G2), T5/T2, ALT/(G3+T4), T5/T1, T3/G2 and BFL/T3 of the present embodiment. The distance from the object-side surface 1411 of the first lens element 1410 to the image plane 1470 along the optical axis may be about 13.161 mm, the image height may be about 1.8 mm, EFL may be about 1.042 mm, HFOV may be about 95.076, and Fno may be about 2.4. Compared with the first embodiment, the HFOV of the optical imaging lens 14 may be greater.

As illustrated by the longitudinal spherical aberration shown in FIG. 59(a), the offset of the off-axis light relative to the image point may be within about ±0.05 mm. As illustrated by the astigmatism aberration in the sagittal direction shown in FIG. 59(b), the focus variation with respect to the three wavelengths in the whole field may fall within about ±0.05 mm. As illustrated by the astigmatism aberration in the tangential direction shown in FIG. 59(c), the focus variation with respect to the three wavelengths in the whole field may fall within about +0.05 mm. As shown in FIG. 59(d), the variation of the distortion aberration may be within about ±80%.

Compared with the first embodiment, the longitudinal spherical aberration and the astigmatism aberration of the optical imaging lens 14 may be less. According to the value of the aberrations, it is shown that the optical imaging lens 14 of the present embodiment, with the length that may be as short as about 13.161 mm, may be capable to provide good imaging quality as well as good optical characteristics.

Figure 62:
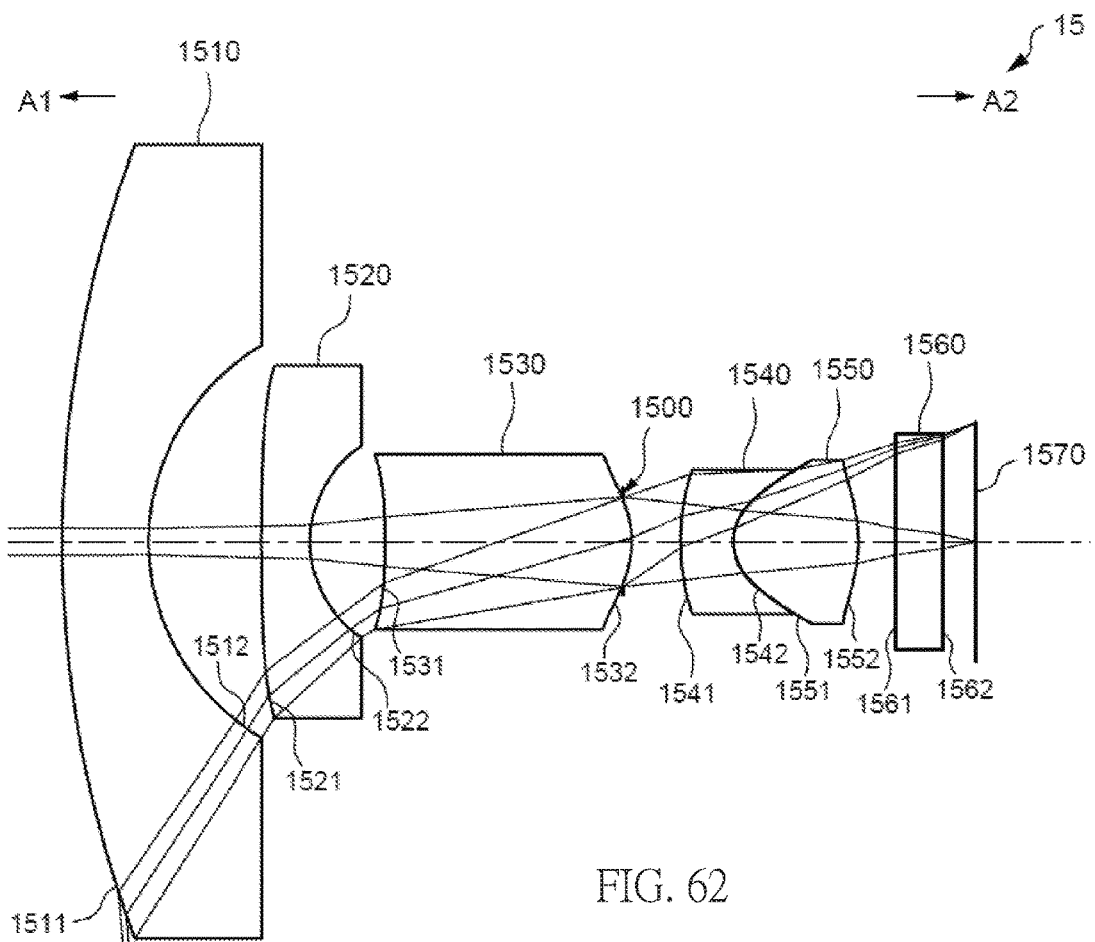
FIG. 62 is a cross-sectional view of a fifteenth embodiment of an optical imaging lens having five lens elements according to the present disclosure.
Figure 63:
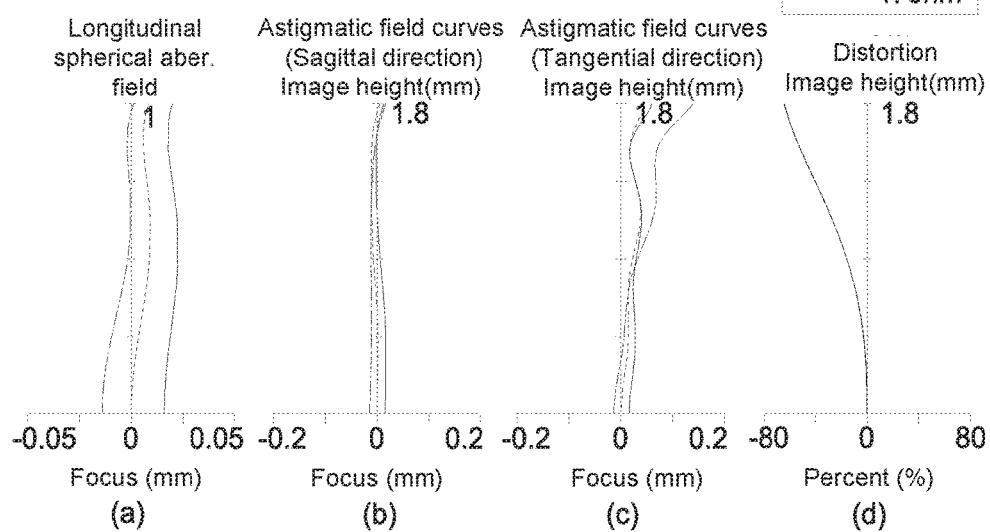
FIG. 63 is a chart of longitudinal spherical aberration and other kinds of optical aberrations of a fifteenth embodiment of the optical imaging lens according to the present disclosure.

Reference is now made to FIGS. 62-65. FIG. 62 illustrates an example cross-sectional view of an optical imaging lens 15 having five lens elements of the optical imaging lens according to an fifteenth example embodiment. FIG. 63 shows example charts of longitudinal spherical aberration and other kinds of optical aberrations of the optical imaging lens 15 according to the fifteenth embodiment. FIG. 64 shows an example table of optical data of each lens element of the optical imaging lens 15 according to the fifteenth example embodiment. FIG. 65 shows an example table of aspherical data of the optical imaging lens 15 according to the fifteenth example embodiment. The reference numbers labeled in the present embodiment are similar to those in the first embodiment for the similar elements, but here the reference numbers are initialed with 15, for example, reference number 1531 for labeling the object-side surface of the third lens element 1530, reference number 1532 for labeling the image-side surface of the third lens element 1530, etc.

As shown in FIG. 62, the optical imaging lens 15 of the present embodiment, in an order from an object side A1 to an image side A2 along an optical axis, may comprise a first lens element 1510, a second lens element 1520, a third lens element 1530, an aperture stop 1500, a fourth lens element 1540 and a fifth lens element 1550.

The differences between the fifteenth embodiment and the first embodiment are the radius of curvature and thickness of each lens element, the distance of each air gap, aspherical data, and related optical parameters, such as back focal length, but the configuration of the concave/convex shape of surfaces, comprising the object-side surfaces 1511, 1521, 1531, 1541, 1551 facing to the object side A1 and the image-side surfaces 1512, 1522, 1532, 1542, 1552 facing to the image side A2, are similar to those in the first embodiment. Please refer to FIG. 64 for the optical characteristics of each lens elements in the optical imaging lens 15 of the present embodiment, please refer to FIG. 70B for the values of T1, G1, T2, G2, T3, G3, T4, G4, T5, G5, TF, GFP, TL, ALT, AAG, TTL, BFL, TL/(G2+G3+G4), ALT/(G3+T2+T4), TL/(G3+T2), ALT/(G3+G1), AAG/(G3+G2), G1/T1, TTL/T3, TTL/G2, TTL/AAG, T5/G2, T5/T3, T5/G1, T5/BFL, BFL/(G3+G2), T5/T2, ALT/(G3+T4), T5/T1, T3/G2 and BFL/T3 of the present embodiment. The distance from the object-side surface 1511 of the first lens element 1510 to the image plane 1570 along the optical axis may be about 13.784 mm, the image height may be about 1.8 mm, EFL may be about 0.990 mm, HFOV may be about 94.536, and Fno may be about 2.4. Compared with the first embodiment, the HFOV of the optical imaging lens 15 may be greater.

As illustrated by the longitudinal spherical aberration shown in FIG. 63(a), the offset of the off-axis light relative to the image point may be within about ±0.05 mm. As illustrated by the astigmatism aberration in the sagittal direction shown in FIG. 63(b), the focus variation with respect to the three wavelengths in the whole field may fall within about ±0.1 mm. As illustrated by the astigmatism aberration in the tangential direction shown in FIG. 63(c), the focus variation with respect to the three wavelengths in the whole field may fall within about +0.2 mm. As shown in FIG. 63(d), the variation of the distortion aberration may be within about ±80%.

Compared with the first embodiment, the longitudinal spherical aberration and the astigmatism aberration in the sagittal direction of the optical imaging lens 15 may be less. According to the value of the aberrations, it is shown that the optical imaging lens 15 of the present embodiment, with the length that may be as short as about 13.784 mm, may be capable to provide good imaging quality as well as good optical characteristics.

Figure 66:
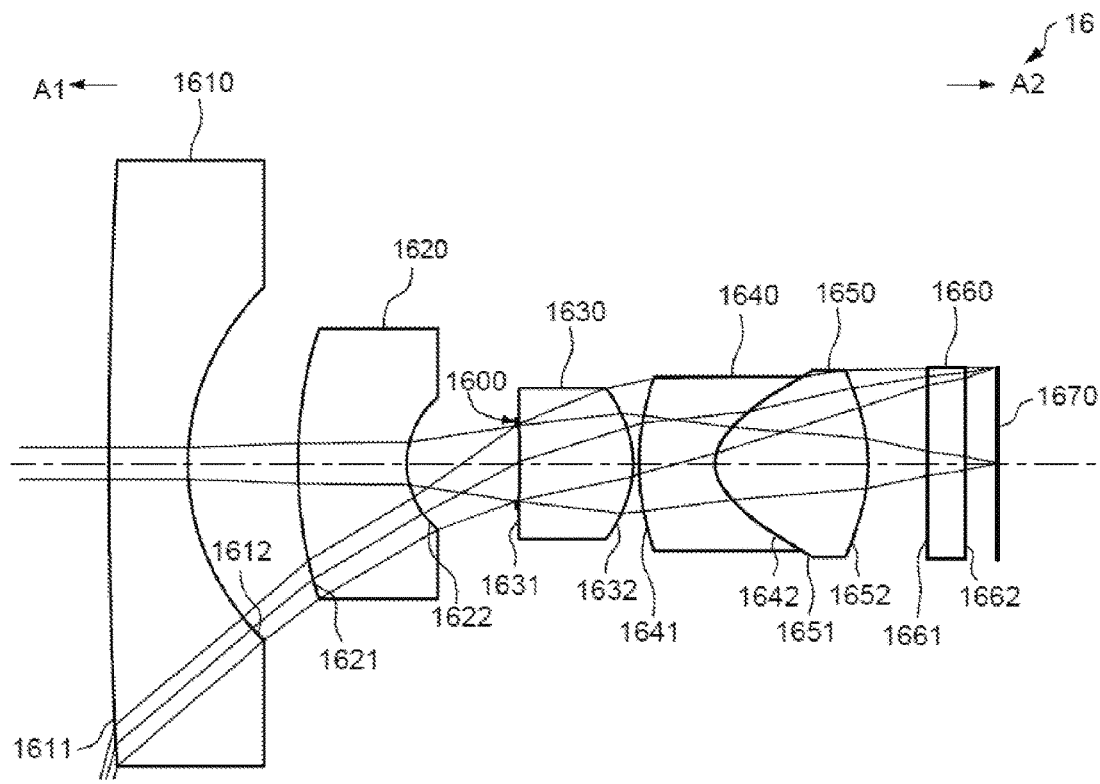
FIG. 66 is a cross-sectional view of a sixteenth embodiment of an optical imaging lens having five lens elements according to the present disclosure.
Figure 67:
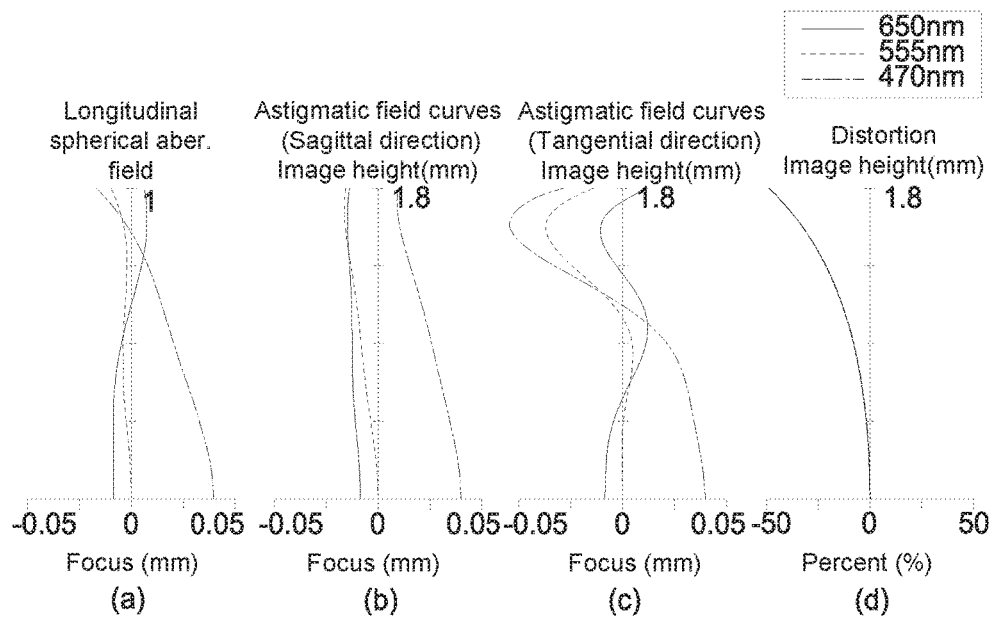
FIG. 67 is a chart of longitudinal spherical aberration and other kinds of optical aberrations of a sixteenth embodiment of the optical imaging lens according to the present disclosure.

Reference is now made to FIGS. 66-69. FIG. 66 illustrates an example cross-sectional view of an optical imaging lens 16 having five lens elements of the optical imaging lens according to an sixteenth example embodiment. FIG. 67 shows example charts of longitudinal spherical aberration and other kinds of optical aberrations of the optical imaging lens 16 according to the sixteenth embodiment. FIG. 68 shows an example table of optical data of each lens element of the optical imaging lens 16 according to the sixteenth example embodiment. FIG. 69 shows an example table of aspherical data of the optical imaging lens 16 according to the sixteenth example embodiment. The reference numbers labeled in the present embodiment are similar to those in the first embodiment for the similar elements, but here the reference numbers are initialed with 16, for example, reference number 1631 for labeling the object-side surface of the third lens element 1630, reference number 1632 for labeling the image-side surface of the third lens element 1630, etc.

As shown in FIG. 66, the optical imaging lens 16 of the present embodiment, in an order from an object side A1 to an image side A2 along an optical axis, may comprise a first lens element 1610, a second lens element 1620, an aperture stop 1600, a third lens element 1630, a fourth lens element 1640 and a fifth lens element 1650.

The differences between the sixteenth embodiment and the first embodiment are the radius of curvature and thickness of each lens element, the distance of each air gap, aspherical data, and related optical parameters, such as back focal length, but the configuration of the concave/convex shape of surfaces, comprising the object-side surfaces 1611, 1621, 1631, 1641, 1651 facing to the object side A1 and the image-side surfaces 1612, 1622, 1632, 1642, 1652 facing to the image side A2, are similar to those in the first embodiment. Please refer to FIG. 68 for the optical characteristics of each lens elements in the optical imaging lens 16 of the present embodiment, please refer to FIG. 70B for the values of T1, G1, T2, G2, T3, G3, T4, G4, T5, G5, TF, GFP, TL, ALT, AAG, TTL, BFL, TL/(G2+G3+G4), ALT/(G3+T2+T4), TL/(G3+T2), ALT/(G3+G1), AAG/(G3+G2), G1/T1, TTL/T3, TTL/G2, TTL/AAG, T5/G2, T5/T3, T5/G1, T5/BFL, BFL/(G3+G2), T5/T2, ALT/(G3+T4), T5/T1, T3/G2 and BFL/T3 of the present embodiment. The distance from the object-side surface 1611 of the first lens element 1610 to the image plane 1670 along the optical axis may be about 16.549 mm, the image height may be about 1.8 mm, EFL may be about 1.447 mm, HFOV may be about 74.3439, and Fno may be about 2.4. Compared with the first embodiment, the HFOV of the optical imaging lens 16 may be greater.

As illustrated by the longitudinal spherical aberration shown in FIG. 67(a), the offset of the off-axis light relative to the image point may be within about ±0.05 mm. As illustrated by the astigmatism aberration in the sagittal direction shown in FIG. 67(b), the focus variation with respect to the three wavelengths in the whole field may fall within about ±0.05 mm. As illustrated by the astigmatism aberration in the tangential direction shown in FIG. 67(c), the focus variation with respect to the three wavelengths in the whole field may fall within about +0.05 mm. As shown in FIG. 67(d), the variation of the distortion aberration may be within about ±50%.

Compared with the first embodiment, the longitudinal spherical aberration and the astigmatism aberration of the optical imaging lens 16 may be less. According to the value of the aberrations, it is shown that the optical imaging lens 16 of the present embodiment, with the length that may be as short as about 16.549 mm, may be capable to provide good imaging quality as well as good optical characteristics.

Please refer to FIGS. 70A and 70B, which show the values of T1, G1, T2, G2, T3, G3, T4, G4, T5, G5, TF, GFP, TL, ALT, AAG, TTL, BFL, TL/(G2+G3+G4), ALT/(G3+T2+T4), TL/(G3+T2), ALT/(G3+G1), AAG/(G3+G2), G1/T1, TTL/T3, TTL/G2, TTL/AAG, T5/G2, T5/T3, T5/G1, T5/BFL, BFL/(G3+G2), T5/T2, ALT/(G3+T4), T5/T1, T3/G2 and BFL/T3 of all sixteen embodiments, and it is clear that the optical imaging lens of the present disclosure satisfy the inequality (1) and/or inequalities (2), (3), (4), (5), (6), (7), (8), (9), (10), (11), (12), (13), (14), (15), (16), (17), (18) and/or (19).

Figure 71:
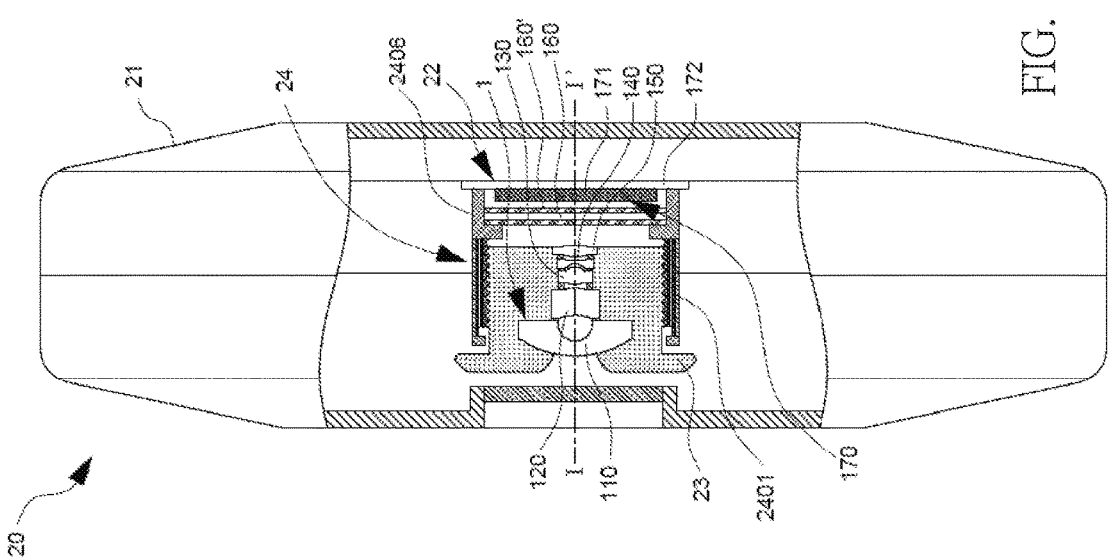
FIG. 71 is a structure of an example embodiment of a mobile device.

Reference is now made to FIG. 71, which illustrates an example structural view of a first embodiment of mobile device 20 applying an optical imaging lens. The mobile device 20 may comprise a housing 21 and a photography module 22 positioned in the housing 21. Examples of the mobile device 20 may be, but are not limited to, a mobile phone, a camera, a tablet computer, a personal digital assistant (PDA), etc.

As shown in FIG. 71, the photography module 22 may comprise an optical imaging lens with five lens elements, which is a prime lens and for example the optical imaging lens 1 of the first embodiment, a lens barrel 23 for positioning the optical imaging lens 1, a module housing unit 24 for positioning the lens barrel 23, a substrate 172 for positioning the module housing unit 24, and an image sensor 171 which may be positioned on the substrate 172 and at an image side of the optical imaging lens 1. The image plane 170 may be formed on the image sensor 171.

In other example embodiments, the structure of the filtering unit 160 may be omitted. In some example embodiments, the housing 21, the lens barrel 23, and/or the module housing unit 24 may be integrated into a single component or assembled by multiple components. In some example embodiments, the image sensor 171 used in the present embodiment may be directly attached to a substrate 172 in the form of a chip on board (COB) package, and such package may be different from traditional chip scale packages (CSP) since COB package does not require a cover glass before the image sensor 171 in the optical imaging lens 1. The described example embodiments are not limited to this package type and could be selectively incorporated in other described embodiments.

The five lens elements 110, 120, 130, 140, 150 are positioned in the lens barrel 23 in the way of separated by an air gap between any two adjacent lens elements but except between the fourth and fifth lens elements 140, 150.

The module housing unit 24 may comprise a lens backseat 2401 for positioning the lens barrel 23 and an image sensor base 2406 positioned between the lens backseat 2401 and the image sensor 171. The lens barrel 23 and the lens backseat 2401 are positioned along a same axis I-I', and the lens backseat 2401 may be close to the outside of the lens barrel 23. The image sensor base 2406 may be exemplarily close to the lens backseat 2401 here. The image sensor base 2406 could be optionally omitted in some other embodiments of the present disclosure.

Because the length of the optical imaging lens 1 may be merely 12.419 mm, the size of the mobile device 20 may be quite small. Therefore, the embodiments described herein meet the market demand for smaller sized product designs.

Figure 72:
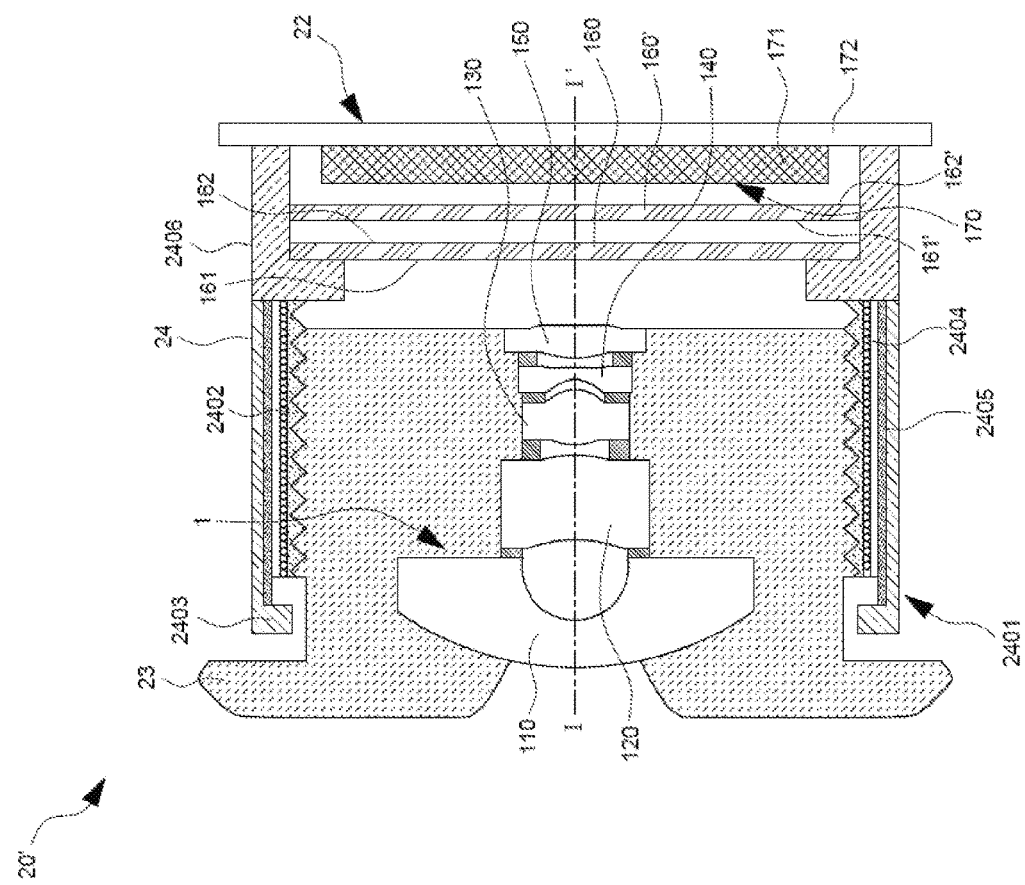
FIG. 72 is a partially enlarged view of the structure of another example embodiment of a mobile device.

Reference is now made to FIG. 72, which shows another structural view of a second embodiment of mobile device 20' applying optical imaging lens 1. One difference between the mobile device 20' and the mobile device 20 may be the lens backseat 2401 comprising a first seat unit 2402, a second seat unit 2403, a coil 2404 and a magnetic unit 2405. The first seat unit 2402 may be close to the outside of the lens barrel 23, and positioned along an axis I-I', and the second seat unit 2403 may be around the outside of the first seat unit 2402 and positioned along with the axis I-I'. The coil 2404 may be positioned between the first seat unit 2402 and the inside of the second seat unit 2403. The magnetic unit 2405 may be positioned between the outside of the coil 2404 and the inside of the second seat unit 2403.

The lens barrel 23 and the optical imaging lens 1 positioned therein are driven by the first seat unit 2402 for moving along the axis I-I'. The rest structure of the mobile device 20' may be similar to the mobile device 20.

Similarly, because the length of the optical imaging lens 1 may be about 12.419 mm, but also may be shortened, the mobile device 20' may be designed with a smaller size and meanwhile good optical performance may still be provided. Therefore, the present embodiment meets the demand of small sized product design and the request of the market.

According to above illustration, the longitudinal spherical aberration, astigmatism aberration both in the sagittal direction and tangential direction and distortion aberration in all embodiments are meet user demands, which may be related to products in the market. The off-axis light with respect to three different wavelengths (470 nm, 555 nm, 650 nm) is focused around an image point and the offset of the off-axis light relative to the image point is well controlled with suppression for the longitudinal spherical aberration, astigmatism aberration both in the sagittal direction and tangential direction and distortion aberration. The curves of different wavelengths are closed to each other, and this represents that the focusing for light having different wavelengths is good to suppress chromatic dispersion. In summary, lens elements are designed and matched for achieving good imaging quality.

While various embodiments in accordance with the disclosed principles have been described above, it should be understood that they are presented by way of example only, and are not limiting. Thus, the breadth and scope of example embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, sequentially from an object side to an image side along an optical axis, comprising first, second, third, fourth and fifth lens elements, each of the first, second, third, fourth and fifth lens elements having refracting power, an object-side surface facing toward the object side and an image-side surface facing toward the image side and a central thickness defined along the optical axis, wherein:

the image-side surface of the first lens element comprises a concave portion in a vicinity of the optical axis;

the image-side surface of the second lens element comprises a concave portion in a vicinity of a periphery of the second lens element;

the object-side surface of the third lens element comprises a concave portion in a vicinity of the optical axis;

the object-side surface of the fourth lens element comprises a convex portion in a vicinity of a periphery of the fourth lens element, and the image-side surface of the fourth lens element a concave portion in a vicinity of the periphery of the fourth lens element;

the fifth lens element is constructed by plastic material;

the optical imaging lens comprises no other lenses having refracting power beyond the five lens elements; and a distance between the object-side surface of the first lens element and an image-side surface of the fifth lens element along the optical axis is represented by TL, an air gap between the second lens element and the third lens element along the optical axis is represented by G2, an air gap between the third lens element and the fourth lens element along the optical axis is represented by G3, an air gap between the fourth lens element and the fifth lens element along the optical axis is represented by G4, and TL, G2, G3 and G4 satisfy the inequality:

$6.4 \leq TL/(G2+G3+G4)$.

2. The optical imaging lens according to claim 1, wherein a sum of the central thicknesses of all five lens elements is represented by ALT, the central thickness of the second lens element is represented by T2, the central thickness of the fourth lens element is represented by T4, and ALT, G3, T2 and T4 satisfy the inequality:

$ALT/(G3+T2+T4) \leq 4.2$.

3. The optical imaging lens according to claim 1, wherein the central thickness of the second lens element is represented by T2, and TL, G3 and T2 satisfy the inequality:

$TL/(G3+T2) \leq 10.1$.

4. The optical imaging lens according to claim 1, wherein a sum of the central thicknesses of all five lens elements is represented by ALT, an air gap between the first lens element and the second lens element along the optical axis is represented by G1, and ALT, G3 and G1 satisfy the inequality:

$ALT/(G3+G1) \leq 5.7$.

5. The optical imaging lens according to claim 1, wherein a sum of all four air gaps from the first lens element to the fifth lens element along the optical axis is represented by AAG, and AAG, G3 and G2 satisfy the inequality:

$AAG/(G3+G2) \leq 2.7$.

6. The optical imaging lens according to claim 1, wherein an air gap between the first lens element and the second lens element along the optical axis is represented by G1, the central thickness of the first lens element is represented by T1, and G1 and T1 satisfy the inequality:

$G1/T1 \leq 1.4$.

7. The optical imaging lens according to claim 1, wherein a distance between the object-side surface of the first lens element and an image plane along the optical axis is represented by TTL, the central thickness of the third lens element is represented by T3, and TTL and T3 satisfy the inequality:

$TTL/T3 \leq 7.8$.

8. The optical imaging lens according to claim 1, wherein a distance between the object-side surface of the first lens element and an image plane along the optical axis is represented by TTL, and TTL and G2 satisfy the inequality:

$TTL/G2 \leq 13$.

9. The optical imaging lens according to claim 1, wherein a distance between the object-side surface of the first lens element and an image plane along the optical axis is represented by TTL, a sum of all four air gaps from the first lens element to the fifth lens element along the optical axis is represented by AAG, and TTL and AAG satisfy the inequality:

$TTL/AAG \leq 4.7$.

10. The optical imaging lens according to claim 1, wherein the central thickness of the fifth lens element is represented by T5, and T5 and G2 satisfy the inequality:

$T5/G2 \leq 4.1$.

11. The optical imaging lens according to claim 1, wherein the central thickness of the fifth lens element is represented by T5, the central thickness of the third lens element is represented by T3, and T5 and T3 satisfy the inequality:

$T5/T3 \leq 1.4$.

12. The optical imaging lens according to claim 1, wherein the central thickness of the fifth lens element is represented by T5, an air gap between the first lens element and the second lens element along the optical axis is represented by G1, and T5 and G1 satisfy the inequality:

$T5/G1 \leq 1.4$.

13. The optical imaging lens according to claim 1, wherein the central thickness of the fifth lens element is represented by T5, a back focal length of the optical imaging lens, which is defined as the distance from the image-side surface of the fifth lens element to the image plane along the optical axis, is represented by BFL, and T5 and BFL satisfy the inequality:

$T5/BFL \leq 1.2$.

14. The optical imaging lens according to claim 1, wherein a back focal length of the optical imaging lens, which is defined as the distance from the image-side surface of the fifth lens element to the image plane along the optical axis, is represented by BFL, and BFL, G3 and G2 satisfy the inequality:

$BFL/(G3+G2) \leq 2$.

15. The optical imaging lens according to claim 1, wherein the central thickness of the fifth lens element is represented by T5, the central thickness of the second lens element is represented by T2, and T5 and T2 satisfy the inequality:

$T5/T2 \leq 2.6$.

16. The optical imaging lens according to claim 1, wherein a sum of the central thicknesses of all five lens elements is represented by ALT, the central thickness of the fourth lens element is represented by T4, and ALT, G3 and T4 satisfy the inequality:

$ALT/(G3+T4) \leq 8.8$.

17. The optical imaging lens according to claim 1, wherein the central thickness of the fifth lens element is represented by T5, the central thickness of the first lens element is represented by T1, and T5 and T1 satisfy the inequality:

$T5/T1 \leq 2.2$.

18. The optical imaging lens according to claim 1, wherein the central thickness of the third lens element is represented by T3, and T3 and G2 satisfy the inequality:

$T3/G2 \leq 3.3$.

19. The optical imaging lens according to claim 1, wherein a back focal length of the optical imaging lens, which is defined as the distance from the image-side surface of the fifth lens element to the image plane along the optical axis, is represented by BFL, the central thickness of the third lens element is represented by T3, and BFL and T3 satisfy the inequality:

$BFL/T3 \leq 1.3$.

20. A mobile device, comprising:
a housing; and
a photography module positioned in the housing and comprising:

an optical imaging lens, sequentially from an object side to an image side along an optical axis, comprising a first lens element, an aperture stop, and second, third, fourth and fifth lens elements, each of the first, second, third, fourth and fifth lens elements having refracting power, an object-side surface facing toward the object side and an image-side surface facing toward the image side and a central thickness defined along the optical axis, wherein:
the image-side surface of the first lens element comprises a concave portion in a vicinity of the optical axis;
the image-side surface of the second lens element comprises a concave portion in a vicinity of a periphery of the second lens element;
the object-side surface of the third lens element comprises a concave portion in a vicinity of the optical axis;
the object-side surface of the fourth lens element comprises a convex portion in a vicinity of a periphery of the fourth lens element, and the image-side surface of the fourth lens element a concave portion in a vicinity of the periphery of the fourth lens element;
the fifth lens element is constructed by plastic material;
the optical imaging lens comprises no other lenses having refracting power beyond the five lens elements; and
a distance between the object-side surface of the first lens element and an image-side surface of the fifth lens element along the optical axis is represented by TL, an air gap between the second lens element and the third lens element along the optical axis is represented by G2, an air gap between the third lens element and the fourth lens element along the optical axis is represented by G3, an air gap between the fourth lens element and the fifth lens element along the optical axis is represented by G4, and TL, G2, G3 and G4 satisfy the inequality:

$$6.4 \leq TL/(G2+G3+G4);$$

a lens barrel for positioning the optical imaging lens; a module housing unit for positioning the lens barrel; and an image sensor positioned at the image side of the optical imaging lens.

* * * * *